(12) United States Patent
Zhang

(10) Patent No.: US 12,707,313 B2
(45) Date of Patent: Aug. 11, 2026

(54) METHOD AND DEVICE USED FOR RELAY WIRELESS COMMUNICATION

(71) Applicant: Apogee 5G Global, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 314 days.

(21) Appl. No.: 18/115,005

(22) Filed: Feb. 28, 2023

(65) Prior Publication Data

US 2023/0209638 A1 Jun. 29, 2023

Related U.S. Application Data

(63) Continuation of application No. PCT/CN2021/115235, filed on Aug. 30, 2021.

(30) Foreign Application Priority Data

Sep. 4, 2020 (CN) ........................ 202010922967.0
Sep. 30, 2020 (CN) ........................ 202011063813.7
Oct. 30, 2020 (CN) ........................ 202011190787.4

(51) Int. Cl.
*H04W 28/02* (2009.01)
*H04W 28/04* (2009.01)
(Continued)

(52) U.S. Cl.
CPC ... *H04W 28/0205* (2013.01); *H04W 28/0278* (2013.01); *H04W 28/04* (2013.01);
(Continued)

(58) Field of Classification Search
CPC ....... H04W 4/30–48; H04W 8/22–245; H04W 16/24–32; H04W 24/02–10;
(Continued)

(56) References Cited

U.S. PATENT DOCUMENTS 11,418,966 B2 8/2022 Wu et al.
11,425,587 B2 8/2022 Zhang et al.
(Continued)

FOREIGN PATENT DOCUMENTS

CN 101346925 A 11/2006
CN 101572913 A 4/2008
(Continued)

OTHER PUBLICATIONS

ISR received in application No. PCT/CN2021/115235 dated Nov. 18, 2021.

(Continued)

*Primary Examiner* — Timothy J Weidner
(74) *Attorney, Agent, or Firm* — Volpe Koenig

(57) ABSTRACT

The present application provides a method and device for sidelink wireless communications. A first node receives a first signaling via an air interface; as a response to receiving the first signaling, transmits a first radio signal, the first radio signal comprises a second signaling; receives a second data unit set via an air interface; herein, the second signaling indicates that a first data unit set is not received, and both the first data unit set and the second data unit set are transmitted through a first radio bearer; the second signaling is used to determine the second data unit set; a transmitter of the first signaling is non-co-located with a receiver of the first radio signal; the first data unit set comprises at least one data unit; the second data unit set comprises the first data unit set. The present application can effectively reduce data retransmission.

20 Claims, 14 Drawing Sheets

(51) Int. Cl.

| | |
|---|---|
| ***H04W 76/20*** | (2018.01) |
| ***H04W 76/23*** | (2018.01) |
| ***H04W 76/25*** | (2018.01) |
| ***H04W 84/02*** | (2009.01) |
| ***H04W 88/02*** | (2009.01) |
| ***H04W 92/18*** | (2009.01) |

(52) U.S. Cl.
CPC .......... *H04W 76/20* (2018.02); *H04W 76/23* (2018.02); *H04W 76/25* (2018.02); *H04W 84/02* (2013.01); *H04W 88/02* (2013.01); *H04W 92/18* (2013.01)

(58) Field of Classification Search
CPC ..... H04W 28/02–26; H04W 76/10–50; H04W 84/02–16; H04W 88/02–12; H04W 92/02–24
See application file for complete search history.

(56) References Cited

U.S. PATENT DOCUMENTS

| | | | | |
|---|---|---|---|---|
| 11,483,863 | B2 | 10/2022 | Zhang | |
| 2009/0219951 | A1 | 9/2009 | Chun et al. | |
| 2010/0135166 | A1 | 6/2010 | Ahluwalia | |
| 2019/0229853 | A1 | 7/2019 | Lee et al. | |
| 2020/0045577 | A1 | 2/2020 | Yu et al. | |
| 2020/0107219 | A1 | 4/2020 | Jang et al. | |
| 2020/0221438 | A1 | 7/2020 | Wu et al. | |
| 2021/0194642 | A1 | 6/2021 | Belleschi et al. | |
| 2022/0045800 | A1* | 2/2022 | Chen ..................... | H04W 28/04 |

FOREIGN PATENT DOCUMENTS

| | | | |
|---|---|---|---|
| CN | 106537813 | A | 6/2015 |
| CN | 108540997 | A | 5/2017 |
| CN | 108540994 | A | 9/2018 |
| CN | 110830182 | A | 2/2019 |
| CN | 111586751 | A | 2/2019 |
| CN | 111294969 | A | 6/2020 |
| JP | 2010178145 | A | 1/2009 |
| KR | 20190127561 | A | 4/2019 |
| WO | 2018030798 | A1 | 8/2017 |
| WO | 2019066427 | A1 | 9/2018 |
| WO | 2018232561 | A1 | 12/2018 |
| WO | 2019212249 | A1 | 5/2019 |
| WO | 2020140970 | A1 | 1/2020 |

OTHER PUBLICATIONS

Sunplus mMobile Inc. Discussion on BSR triggering and reporting 3GPP TSG-RAN WG2 Meeting #61 R2-081205, Feb. 15, 2008.

First Search Report of Chinese patent application No. CN202011063813.7 dated May 17, 2024.

Supplementary Search Report of Chinese patent application No. CN202011190787.4 dated Nov. 20, 2024.

First Office Action of Chinese patent application No. CN202010922967.0 dated Jul. 30, 2024.

First Search Report of Chinese patent application No. CN202010922967.0 dated Jul. 24, 2024.

Notification to Grant Patent Right for Invention of Chinese patent application No. CN202011063813.7 dated May 30, 2024.

Notification to Grant Patent Right for Invention of Chinese patent application No. CN202011190787.4 dated Nov. 22, 2024.

First Office Action of Chinese patent application No. CN202011190787.4 dated Jan. 6, 2024.

Second Office Action of Chinese patent application No. CN202011190787.4 dated Jul. 30, 2024.

First Search Report of Chinese patent application No. CN202011190787.4 dated Jan. 5, 2024.

Supplementary Search Report of Chinese patent application No. CN202011190787.4 dated Jul. 26, 2024.

Third Generation Partnership Project, "Technical Specification Group Radio Access Network; Evolved Universal Terrestrial Radio Access (E-UTRA); Medium Access Control (MAC) protocol specification (Release 16)," 3GPP TS 36.321 V16.1.0 (Jul. 2020).

Third Generation Partnership Project, "Technical Specification Group Radio Access Network; Evolved Universal Terrestrial Radio Access (E-UTRA); Radio Link Control (RLC) protocol specification (Release 16)," 3GPP TS 36.322 V16.0.0 (Jul. 2020).

Third Generation Partnership Project, "Technical Specification Group Radio Access Network; Evolved Universal Terrestrial Radio Access (E-UTRA); Packet Data Convergence Protocol (PDCP) specification (Release 16)," 3GPP TS 36.323 V16.1.0 (Jul. 2020).

Third Generation Partnership Project, "Technical Specification Group Radio Access Network; NR; Multiplexing and channel coding (Release 16)," 3GPP TS 38.212 V16.2.0 (Jun. 2020).

Third Generation Partnership Project, "Technical Specification Group Radio Access Network; NR; Physical layer procedures for data (Release 16)," 3GPP TS 38.214 V16.2.0 (Jun. 2020).

Third Generation Partnership Project, "Technical Specification Group Radio Access Network; NR; NR and NG-RAN Overall Description; Stage 2 (Release 16)," 3GPP TS 38.300 V16.2.0 (Jul. 2020).

Third Generation Partnership Project, "Technical Specification Group Radio Access Network; NR; Medium Access Control (MAC) protocol specification (Release 16)," 3GPP TS 38.321 V16.0.0 (Mar. 2020).

Third Generation Partnership Project, "Technical Specification Group Radio Access Network; NR; Radio Link Control (RLC) protocol specification (Release 16)," 3GPP TS 38.322 V16.1.0 (Jul. 2020).

Third Generation Partnership Project, "Technical Specification Group Radio Access Network; NR; Packet Data Convergence Protocol (PDCP) specification (Release 16)," 3GPP TS 38.323 V16.1.0 (Jul. 2020).

Third Generation Partnership Project, "Technical Specification Group Radio Access Network; NR; Radio Resource Control (RRC) protocol specification (Release 16)," 3GPP TS 38.331 V16.1.0 (Jul. 2020).

* cited by examiner

| Index | BS value | Index | BS value | Index | BS value | Index | BS value |
|---|---|---|---|---|---|---|---|
| 0 | 0 | 8 | ≤ 102 | 16 | ≤ 1446 | 24 | ≤ 20516 |
| 1 | ≤ 10 | 9 | ≤ 142 | 17 | ≤ 2014 | 25 | ≤ 28581 |
| 2 | ≤ 14 | 10 | ≤ 198 | 18 | ≤ 2806 | 26 | ≤ 39818 |
| 3 | ≤ 20 | 11 | ≤ 276 | 19 | ≤ 3909 | 27 | ≤ 55474 |
| 4 | ≤ 28 | 12 | ≤ 384 | 20 | ≤ 5446 | 28 | ≤ 77284 |
| 5 | ≤ 38 | 13 | ≤ 535 | 21 | ≤ 7587 | 29 | ≤ 107669 |
| 6 | ≤ 53 | 14 | ≤ 745 | 22 | ≤ 10570 | 30 | ≤ 150000 |
| 7 | ≤ 74 | 15 | ≤ 1038 | 23 | ≤ 14726 | 31 | > 150000 |

Third node
PDCP
RLC
901A
903A
Fourth node
PDCP
RLC
911A
913A
First node
RLC
923A
SLAP
942A
RLC
943A
RLC
933A
Second node
PDCP
PDCP
951A
961A
SLAP
952A
RLC
953A Case A

| R | F | LCID | Byte 1 |
| --- | --- | --- | --- |
| L | | | Byte 2 |
| Private Extension | | | Byte 3~m |

Case B

| R | R | LCID | Byte 1 |
| --- | --- | --- | --- |

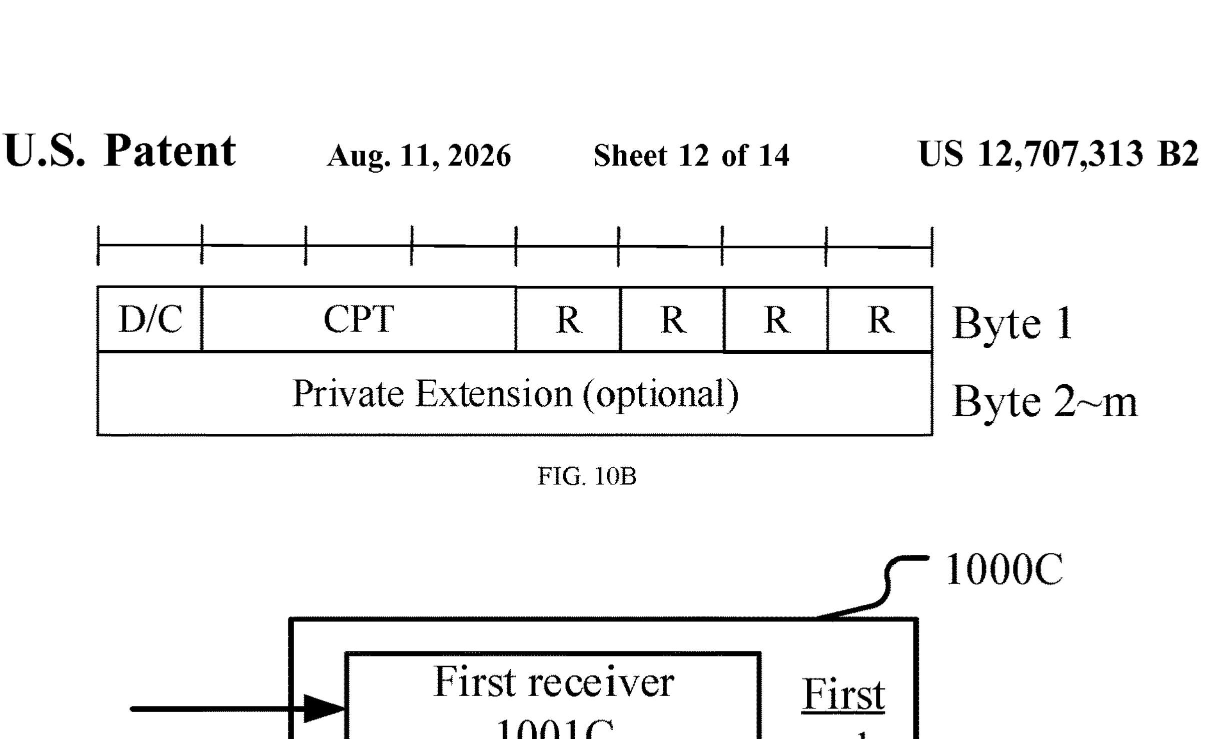
FIG. 10B
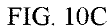
FIG. 10C
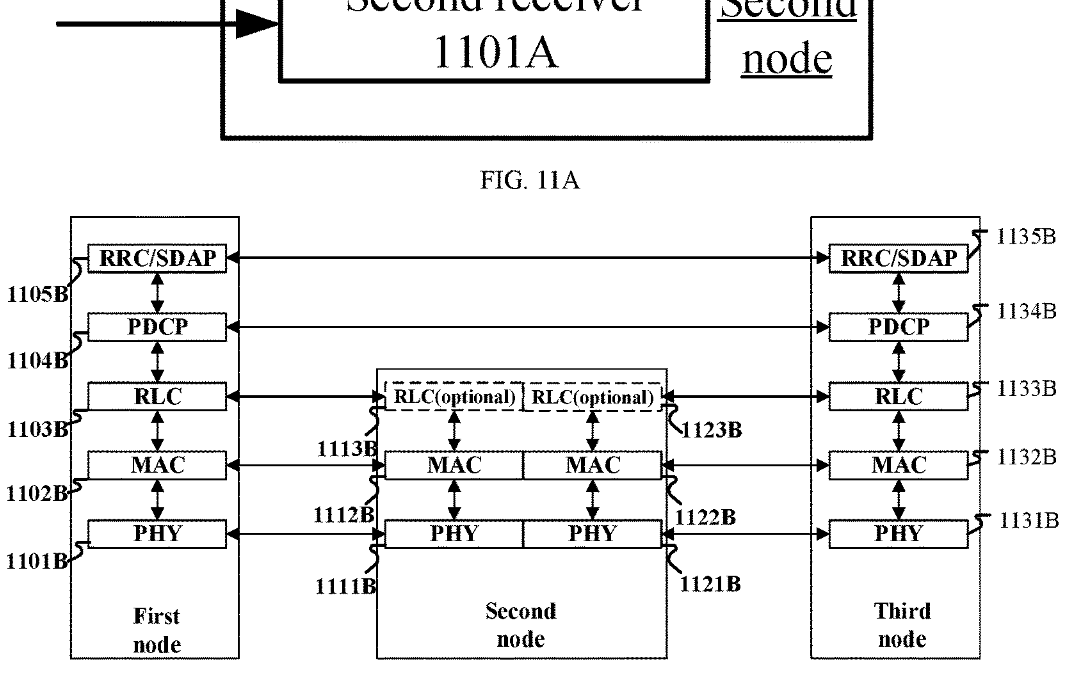
FIG. 11A
FIG. 11B

METHOD AND DEVICE USED FOR RELAY WIRELESS COMMUNICATION

CROSS REFERENCE TO RELATED APPLICATIONS

This application is the continuation of the international patent application No. PCT/CN2021/115235, filed on Aug. 30, 2021, which claims the priority benefit of Chinese Patent Application No. 202010922967.0, filed on Sep. 4, 2020, and claims the priority benefit of Chinese Patent Application No. 202011063813.7, filed on Sep. 30, 2020 and claims the priority benefit of Chinese Patent Application No. 202011190787.4, filed Oct. 30, 2020, the full disclosure of which is incorporated herein by reference.

BACKGROUND

Technical Field

The present application relates to methods and devices in wireless communication systems, and in particular to a method and device for reporting a buffer state in relay wireless communications.

Related Art

As a multi-hop transmission technology, relay can increase throughput and expand coverage. Relay communication is a common method in cellular network communications. Data from a source node is forwarded by a relay node (RN) to a remote node. The source node and the remote node are usually a base station and a User Equipment (UE), or both UEs; the RN may be a network device or a UE. Taking Sidelink (SL) transmission in Long Term Evolution (LTE) system as an example, a transmission from a UE to an RN adopts SL radio technology, and a transmission from an RN to a base station (eNodeB, eNB) adopts LTE radio technology. The RN is used for data forwarding between the UE and the eNB, which can be called Internet Protocol (IP) layer forwarding or layer 3 (L3) relaying.

Dual-Connectivity (DC) is an important technology introduced in 3GPP Rel (version). Through DC technology, a UE can use radio resources provided by two different base stations, the DC can increase the transmission rate and improve the transmission robustness at cell edge. A terminal that supports DC can connect two Long Term Evolution (LTE) base stations, or one LTE base station and one New Radio (NR) base station, or two NR base stations at the same time, and the two base stations are in communications via backhaul X2 or Xn interface. One of the two base stations supporting DC is a master base station, which maintains an RRC connection of the UE; the other secondary base station can be configured without RRC function, or with partial RRC functions.

Application scenarios of future wireless communication systems are becoming increasingly diversified, and different application scenarios have different performance demands on systems. To meet these various performance requirements, the 3rd Generation Partner Project (3GPP) Radio Access Network (RAN) #72 Plenary decided to study New Radio (NR), or what is called the Fifth Generation (5G), and later at the 3GPP RAN #75 Plenary, a Work Item (WI) was approved to standardize NR. Targeting at rapidly developing Vehicle-to-Everything (V2X) traffic, 3GPP also started SL standardization formulation and research work under NR framework. At 3GPP RAN #86 plenary, it was decided to start Study Item (SI) standardization work for NR SL Relay.

SUMMARY

Inventors have found through researches that many source nodes can forward through a same relay node to multiple remote nodes, since the change of a source node and/or a remote node incurred by node mobility/channel change leads to frequent change of radio connection, resulting in significant change in data volume waiting to be scheduled by a base station buffered by the relay node. If the significantly changed volume of buffered data is not notified to the base station in time, it will cause packet loss or radio resource waste. To address the above problem, the present application discloses a solution to trigger a buffer state reporting, which can trigger a relay node to report a buffer state report when buffered data volume of the relay node changes significantly, so as to rapidly update base information, reduce packet loss and improve radio resource utilization.

Inventors have found through researches that the introduction of relay node in SL transmission can improve the transmission quality of the source node and the remote node, thus enhancing the wireless coverage. If failure occurs in radio link between the source node and the relay node, before switching to a new relay node, continuing a transmission using the radio link between the relay node and the remote node can reduce data retransmission of the source node, thus significantly improving the transmission efficiency. To address the above problem, the present application provides a solution.

In DC scenario, if connection failure occurs in a primary cell maintaining a radio connection, and if a secondary cell is not configured with RRC function, at this time, rapidly recovering a radio connection based on layer 1/layer 2 of secondary-cell user plane needs to be researched. To address the above problems, the present application discloses a solution for layer 2-based rapid radio connection recovery through secondary cell when connection failure occurs in primary cell, which uses the user-plane of the secondary cell to connect assistance transmission control-plane message, thus rapidly recovering radio connection and ensuring service continuity.

And the embodiments in the present application and the characteristics in the embodiments can be arbitrarily combined if there is no conflict. Further, although the present application is originally targeted at relay and base station scenarios, it is also applicable to terminal and relay as well as terminal and base station, where similar technical effects can be achieved. Additionally, the adoption of a unified solution for various scenarios, including but not limited to V2X scenarios and communication scenarios between terminals and base stations, contributes to the reduction of hardware complexity and costs. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

as a response to a first condition being satisfied, generating a first BSR; and transmitting a first radio signal, the first radio signal carrying the first BSR;

herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

In one embodiment, the present application is applicable to a scenario where a relay node is located within cell coverage.

In one embodiment, the present application is applicable to that a sidelink transmission from a relay node and a remote node adopts mode-1 resource allocation mode.

In one embodiment, the present application is applicable to a relay transmission from a UE to a base station, or from a UE to a UE, or from a base station to a UE.

In one embodiment, a problem to be solved in the present application is: the change of a source node and/or a remote node incurred by node mobility/channel change results in significant changes in data volume waiting to be scheduled by a base station buffered by a relay node, and if the significantly changed volume of buffered data is not notified to the base station in time, it will cause packet loss or radio resource waste.

In one embodiment, solutions of the present application comprise: when the change in data volume waiting to be scheduled by a base station buffered by a relay node is greater than a setting threshold, a Buffer Status Report (BSR) reporting is triggered.

In one embodiment, beneficial effects of the present application comprise: by updating buffered data volume of the relay node to the base station timely, packet loss due to arrival of large packets can be avoided, or, the waste of radio resources due to excessive scheduling of the base station incurred by a large number of packets being dropped can be avoided.

According to one aspect of the present application, comprising:

receiving a first data unit set through a first channel set, the first data unit set comprising at least one data unit; and transmitting a second data unit set through a second channel set, the second data unit set comprising at least one data unit;

herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s) comprised in the first data unit set, and the second reference data volume is related to a number of byte(s) comprised in the second data unit set.

According to one aspect of the present application, comprising:

the first reference data volume is related to a buffer size for a second logical channel set in the first data unit set;

herein, any logical channel in the second logical channel set is mapped into a logical channel in the first logical channel set.

According to one aspect of the present application, comprising:

the first reference data volume is related to a number of byte(s) comprised in a third data unit set;

herein, the third data unit set comprises a data unit in the first data unit set and also comprised in a first buffer set; any data unit in the third data unit set is mapped into a logical channel in the first logical channel set.

According to one aspect of the present application, comprising:

the first reference buffer size is related to a number of byte(s) comprised in a fourth data unit set, and the fourth data unit set comprises a part being transmitted after triggering the second BSR in the second data unit set.

According to one aspect of the present application, comprising:

determining a first link failure; as a response to the behavior of determining the first link failure, clearing a fifth data unit set, the fifth data unit set comprising at least one data unit;

herein, any bit in the fifth data unit set belongs to the first data unit set and does not belong to the second data unit set; the first reference buffer size is related to a number of byte(s) comprised in the fifth data unit set.

The present application provides a method in a second node for wireless communications, comprising:

receiving a first radio signal, the first radio signal carrying a first BSR;

herein, as a response to a first condition being satisfied, the first BSR is generated; the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

According to one aspect of the present application, comprising:

a first data unit set being received through a first channel set, and the first data unit set comprising at least one data unit; and a second data unit set being transmitted through a second channel set, and the second data unit set comprising at least one data unit;

herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s) comprised in the first data unit set, and the second reference data volume is related to a number of byte(s) comprised in the second data unit set.

According to one aspect of the present application, comprising:

the first reference data volume is related to a buffer size for a second logical channel set in the first data unit set;

herein, any logical channel in the second logical channel set is mapped into a logical channel in the first logical channel set.

According to one aspect of the present application, comprising:

the first reference data volume being related to a number of byte(s) comprised in a third data unit set;

herein, the third data unit set comprises a data unit in the first data unit set and also comprised in a first buffer set; any data unit in the third data unit set is mapped into a logical channel in the first logical channel set.

According to one aspect of the present application, comprising:

the first reference buffer size is related to a number of byte(s) comprised in a fourth data unit set, and the fourth data unit set comprises a part being transmitted after triggering the second BSR in the second data unit set.

According to one aspect of the present application, comprising:

a first link being determined failed; as a response to the behavior of the first link being determined failed, a fifth data unit set being cleared, the fifth data unit set comprising at least one data unit;

herein, any bit in the fifth data unit set belongs to the first data unit set and does not belong to the second data unit set; the first reference buffer size is related to a number of byte(s) comprised in the fifth data unit set.

The present application provides a first node for wireless communications, comprising:

a first processor, as a response to a first condition being satisfied, generating a first BSR; and a first transmitter, transmitting a first radio signal, the first radio signal carrying the first BSR;

herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

The present application provides a second node for wireless communications, comprising:

a second receiver, receiving a first radio signal, the first radio signal carrying a first BSR;

herein, as a response to a first condition being satisfied, the first BSR is generated; the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

The present application provides a method in a first node for wireless communications, comprising:

receiving a first signaling via an air interface;

as a response to receiving the first signaling, transmitting a first radio signal, the first radio signal comprising a second signaling; and receiving a second data unit set via an air interface;

herein, the second signaling indicates that a first data unit set is not received, and both the first data unit set and the second data unit set are transmitted through a first radio bearer; the second signaling is used to determine the second data unit set; a transmitter of the first signaling is non-co-located with a receiver of the first radio signal; the first data unit set comprises at least one data unit; the second data unit set comprises the first data unit set.

In one embodiment, the present application is applicable to a scenario where a relay node is supported in sidelink radio transmission.

In one embodiment, a problem to be solved in the present application is: retransmission after failure occurs in a radio link between a transmitting node and a relay node.

In one embodiment, solutions of the present application comprise: when failure occurs in a radio link between a transmitting node and a relay node, the relay node transmits an ending identity after transmitting buffered data to trigger a receiving node to feed back a receiving status report; the receiving node does not re-configure or re-establish a radio bearer.

In one embodiment, beneficial effects of the present application comprise: reducing data retransmission.

According to one aspect of the present application, comprising:

as a response to receiving the first signaling, clearing a first identity from a first identity list; monitoring a physical-layer signaling through sidelink, when a detected physical-layer signaling comprises partial bits in any identity in the first identity list, performing channel decoding on a physical-layer channel scheduled by the detected physical-layer signaling, when the detected physical-layer signaling does not comprise partial bits in any identity in the first identity list, dropping performing channel decoding on a physical-layer channel scheduled by the detected physical-layer signaling;

herein, the first identity identifies a transmitter of the first signaling; a number of bit(s) comprised in the partial bits is a positive integral multiple of 8.

According to one aspect of the present application, comprising:

transmitting first information via an air interface;

herein, the first information indicates first radio link failure; a receiver of the first information comprises a node identified by the first identity.

According to one aspect of the present application, comprising:

receiving a third data unit set via an air interface;

herein, the third data unit set is used to determine the first data unit set; a time for receiving the first signaling is not earlier than a time for receiving any data unit in the third data unit set.

According to one aspect of the present application, comprising:

receiving second information via an air interface;

herein, the second information comprises the first identity list and a first configuration; the first identity list comprises Q identity(identities), Q being a positive integer; the first configuration comprises a first parameter set, and the first parameter set is used to configure the first radio bearer; the first parameter set is applicable to the first data unit set and the second data unit set.

According to one aspect of the present application, comprising:

receiving third information via an air interface;

herein, the third information indicates a second identity list; the second identity list does not comprise the first identity; an identity in the second identity list is used to identify the receiver of the first radio signal.

The present application provides a method in a second node for wireless communications, comprising:

transmitting a first signaling via an air interface;

herein, a first radio signal is received, the first signaling is used to trigger transmitting the first radio signal, the first radio signal comprises a second signaling, and the second signaling is used to generate a second radio signal; the second radio signal is transmitted; a second data unit set is received via an air interface; the second signaling indicates that a first data unit set is not received, and both the first data unit set and the second data unit set are transmitted through a first radio bearer; the second signaling is used to determine the second data unit set; the second node is non-co-located with a receiver of the first radio signal; the first data unit set comprises at least one data unit; the second data unit set comprises the first data unit set.

According to one aspect of the present application, comprising:

the first signaling being used to trigger a first identity being cleared from a first identity list; a physical-layer signaling being monitored through sidelink, when a detected physical-layer signaling comprises partial bits in any identity in the first identity list, channel decoding being executed on a physical-layer channel scheduled by the detected physical-layer signaling, when the detected physical-layer signaling does not comprise partial bits in any identity in the first identity list, channel decoding being dropped to be executed on a physical-layer channel scheduled by the detected physical-layer signaling;

herein, the first identity identifies the second node; a number of bit(s) comprised in the partial bits is a positive integral multiple of 8.

According to one aspect of the present application, comprising:

receiving first information via an air interface;

herein, the first information indicates first radio link failure.

According to one aspect of the present application, comprising:

receiving a third radio signal set; and transmitting a fourth radio signal set;

herein, a fourth data unit set is recovered from the third radio signal set, and the fourth data unit set is used to generate the fourth radio signal set; the fourth data unit set comprises a third data unit set; the third data unit set is used to determine the first data unit set; a time for transmitting the first signaling is not earlier than a time for transmitting any radio signal in the fourth radio signal set.

According to one aspect of the present application, comprising:

receiving a fifth radio signal; and transmitting a sixth radio signal;

herein, second information is recovered from the fifth radio signal, and the second information is used to generate the sixth radio signal; the second information comprises the first identity list and a first configuration; the first identity list comprises Q identity(identities), Q being a positive integer; the first configuration comprises a first parameter set, and the first parameter set is used to configure the first radio bearer; the first parameter set is applicable to the first data unit set and the second data unit set.

According to one aspect of the present application, comprising:

third information being received; the third information indicates a second identity list; the second identity list does not comprise the first identity; an identity in the second identity list is used to identify the receiver of the first radio signal.

The present application provides a method in a third node for wireless communications, comprising:

receiving a second radio signal, the second radio signal comprising a second signaling; and transmitting a second data unit set via an air interface;

herein, the second signaling indicates that a first data unit set is not received, and both the first data unit set and the second data unit set are transmitted through a first radio bearer; the second signaling is used to determine the second data unit set; a first signaling is transmitted, the first signaling is used to trigger transmitting the second radio signal; a transmitter of the first signaling is non-co-located with a transmitter of the second radio signal; the first data unit set comprises at least one data unit; the second data unit set comprises the first data unit set.

According to one aspect of the present application, comprising:

the first signaling being used to trigger a first identity being cleared from a first identity list; a physical-layer signaling being monitored through sidelink, when a detected physical-layer signaling comprises partial bits in any identity in the first identity list, channel decoding being executed on a physical-layer channel scheduled by the detected physical-layer signaling, when the detected physical-layer signaling does not comprise partial bits in any identity in the first identity list, channel decoding being dropped to be executed on a physical-layer channel scheduled by the detected physical-layer signaling;

herein, the first identity identifies a transmitter of the first signaling; a number of bit(s) comprised in the partial bits is a positive integral multiple of 8.

According to one aspect of the present application, comprising:

first information being transmitted; herein, the first information indicates first radio link failure; a receiver of the first information comprises a node identified by the first identity.

According to one aspect of the present application, comprising:

transmitting a fifth data unit set via an air interface; the fifth data unit set comprises a third data unit set;

herein, the third data unit set is used to determine the first data unit set; a time for receiving the first signaling is not earlier than a time for receiving any data unit in the third data unit set.

According to one aspect of the present application, comprising:

transmitting second information via an air interface;

herein, the second information comprises the first identity list and a first configuration; the first identity list comprises Q identity(identities), Q being a positive integer; the first configuration comprises a first parameter set, and the first parameter set is used to configure the first radio bearer; the first parameter set is applicable to the first data unit set and the second data unit set.

According to one aspect of the present application, comprising:

transmitting third information via an air interface;

herein, the third information indicates a second identity list; the second identity list does not comprise the first identity; an identity in the second identity list is used to identify the transmitter of the first radio signal.

The present application provides a first node for wireless communications, comprising:

a first receiver, receiving a first signaling via an air interface;

a first transmitter, as a response to receiving the first signaling, transmitting a first radio signal, the first radio signal comprising a second signaling; and a first receiver, receiving a second data unit set via an air interface;

herein, the second signaling indicates that a first data unit set is not received, and both the first data unit set and the second data unit set are transmitted through a first radio bearer; the second signaling is used to determine the second data unit set; a transmitter of the first signaling is non-co-located with a receiver of the first radio signal; the first data unit set comprises at least one data unit; the second data unit set comprises the first data unit set.

The present application provides a second node for wireless communications, comprising:

a second transmitter, transmitting a first signaling via an air interface;

herein, a first radio signal is received, the first signaling is used to trigger transmitting the first radio signal, the first radio signal comprises a second signaling, and the second signaling is used to generate a second radio signal; the second radio signal is transmitted; a second data unit set is received via an air interface; the second signaling indicates that a first data unit set is not received, and both the first data unit set and the second data unit set are transmitted through a first radio bearer; the second signaling is used to determine the second data unit set; the second node is non-co-located with a receiver of the first radio signal; the first data unit set comprises at least one data unit; the second data unit set comprises the first data unit set.

The present application provides a third node for wireless communications, comprising:

a third receiver, receiving a second radio signal, the second radio signal comprising a second signaling; and a third transmitter, transmitting a second data unit set via an air interface;

herein, the second signaling indicates that a first data unit set is not received, and both the first data unit set and the second data unit set are transmitted through a first radio bearer; the second signaling is used to determine the second data unit set; a first signaling is transmitted, the first signaling is used to trigger transmitting the second radio signal; a transmitter of the first signaling is non-co-located with a transmitter of the second radio signal; the first data unit set comprises at least one data unit; the second data unit set comprises the first data unit set.

The present application provides a method in a first node for wireless communications, comprising:

receiving a first data unit set through a first radio bearer; determining a first connection failure; monitoring a third data unit set via an air interface, and the third data unit set carrying a second message; and as a response to the behavior of determining a first connection failure, transmitting a second data unit set via an air interface, the second data unit set carrying a first message;

herein, the first message is used to trigger the second message; the first radio bearer comprises a first PDCP entity and a first RLC bearer; a transmission of the second message is through a second PDCP entity and the first RLC bearer; the first message is used to trigger associating the first RLC bearer to the second PDCP entity; the second message comprises an RRC signaling, the first data unit set comprises at least one data unit, the second data unit set comprises at least one data unit, and the third data unit set comprises at least one data unit.

In one embodiment, the present application is applicable to a DC scenario.

In one embodiment, a problem to be solved in the present application is: rapidly recovering a radio connection when a connection failure occurs in a primary cell and the secondary cell is not configured with RRC function.

In one embodiment, solutions of the present application comprise: using the user plane of the secondary cell to connect the secondary transmission control-plane message.

In one embodiment, beneficial effects of the present application comprise: rapidly recovering radio connection, ensuring service continuity, and significantly reducing signaling overhead at the same time.

According to one aspect of the present application, comprising: the second data unit set indicating a first reference value set, and the first reference value set being used to indicate the second message.

According to one aspect of the present application, comprising: after transmitting the first message and before the second message is received, receiving at least one data unit through the first radio bearer; herein, a transmission of the at least one data unit is through the first RLC bearer.

According to one aspect of the present application, comprising: as a response to the behavior of determining a first connection failure, starting a first timer; when the second message is received, stopping the first timer; when the first timer expires, stopping monitoring the third data unit set.

According to one aspect of the present application, comprising: after receiving the second message, establishing a second connection according to the second message; herein, the second connection is used to transmit control-plane information.

The present application provides a method in a second node for wireless communications, comprising:

receiving a first data unit set via a backhaul link; receiving a second data unit set via an air interface, the second data unit set carrying a first message; and transmitting the first data unit set through a first RLC bearer; transmitting a third data unit set via the air interface, and the third data unit set carrying a second message;

herein, the first message is used to trigger the second message; the first RLC bearer belongs to a first radio bearer, and the first radio bearer comprises a first PDCP entity; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

According to one aspect of the present application, comprising: receiving the second message via the backhaul link.

According to one aspect of the present application, comprising: transmitting the first message via the backhaul link.

According to one aspect of the present application, comprising: the second data unit set indicating a first reference value set, and the first reference value set being used to indicate the second message.

According to one aspect of the present application, comprising: after the first message is received and before transmitting the second message, transmitting at least one data unit through the first RLC bearer.

According to one aspect of the present application, comprising: determining a first connection failure being used to start a first timer; when the second message is received, the first timer is stopped; when the first timer expires, the third data unit set is stopped to be monitored.

According to one aspect of the present application, comprising: after the second message is received, the second message is used to establish a second connection; herein, the second connection is used to transmit control-plane information.

The present application provides a method in a third node for wireless communications, comprising:

transmitting a first data unit set via a backhaul link; transmitting a second message via the backhaul link; and receiving a first message via the backhaul link.

herein, the first data unit set is transmitted through a first radio bearer, and the first radio bearer comprises a first PDCP entity and a first RLC bearer; the first message is used to trigger the second message; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

According to one aspect of the present application, comprising: a second data unit set indicating a first reference value set, and the first reference value set being used to indicate the second message; herein, the second data unit set carries the first message.

According to one aspect of the present application, comprising: after the first message is transmitted and before the second message is received, at least one data unit is received through the first radio bearer; herein, a transmission of the at least one data unit is through the first RLC bearer.

According to one aspect of the present application, comprising: determining a first connection failure being used to start a first timer; when the second message is received, the first timer is stopped; when the first timer expires, the third data unit set is stopped to be monitored.

According to one aspect of the present application, comprising: after the second message is received, the second message is used to establish a second connection; herein, the second connection is used to transmit control-plane information.

The present application provides a first node for wireless communications, comprising:

a first receiver, receiving a first data unit set through a first radio bearer; determining a first connection failure; monitoring a third data unit set via an air interface, and the third data unit set carrying a second message; and a first transmitter, as a response to the behavior of determining a first connection failure, transmitting a second data unit set via an air interface, the second data unit set carrying a first message;

herein, the first message is used to trigger the second message; the first radio bearer comprises a first PDCP entity and a first RLC bearer; a transmission of the second message is through a second PDCP entity and the first RLC bearer; the first message is used to trigger associating the first RLC bearer to the second PDCP entity; the second message comprises an RRC signaling, the first data unit set comprises at least one data unit, the second data unit set comprises at least one data unit, and the third data unit set comprises at least one data unit.

The present application provides a second node for wireless communications, comprising:

a second receiver, receiving a first data unit set via a backhaul link; receiving a second data unit set via an air interface, the second data unit set carrying a first message; and a second transmitter, transmitting the first data unit set through a first RLC bearer; transmitting a third data unit set via the air interface, and the third data unit set carrying a second message;

herein, the first message is used to trigger the second message; the first RLC bearer belongs to a first radio bearer, and the first radio bearer comprises a first PDCP entity; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

The present application provides a third node for wireless communications, comprising:

a third transmitter, transmitting a first data unit set via a backhaul link; transmitting a second message via the backhaul link; and a third receiver, receiving a first message via the backhaul link.

herein, the first data unit set is transmitted through a first radio bearer, and the first radio bearer comprises a first PDCP entity and a first RLC bearer; the first message is used to trigger the second message; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

BRIEF DESCRIPTION OF THE DRAWINGS

Other features, objects and advantages of the present application will become more apparent from the detailed description of non-restrictive embodiments taken in conjunction with the following drawings:

FIG. 10B illustrates a schematic diagram of another first signaling format according to one embodiment of the present application;

FIG. 10C illustrates a structure block diagram of a processor in a first node according to one embodiment of the present application;

FIG. 11A illustrates a structure block diagram of a processor in a second node according to one embodiment of the present application;

FIG. 11B illustrates a schematic diagram of a radio protocol architecture of relay transmission according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
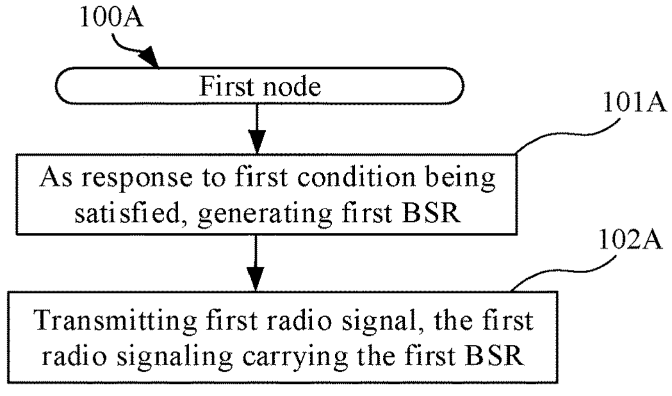
FIG. 1A illustrates a flowchart of transmission of a first node according to one embodiment of the present application.

Embodiment 1A illustrates a flowchart of transmission of a first node according to one embodiment of the present application, as shown in FIG. 1A.

In embodiment 1A, a first node 100A in step 101A, as a response to a first condition being satisfied, generates a first BSR; transmits a first radio signal in step 102A, the first radio signal carries the first BSR; herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

In one embodiment, the first BSR is generated for the first logical channel set.

In one embodiment, the behavior of generating a first BSR comprises generating a first BSR Media Access Control (MAC) Control Element (CE); the first BSR MAC CE comprises a buffer size field; the buffer size field comprised in the first BSR MAC CE indicates data volume of available data determined by a MAC entity.

In one embodiment, the behavior of generating a first BSR comprises triggering a BSR to generate a first buffer size; the first buffer size comprises data volume of available data determined by a MAC entity.

In one embodiment, the first buffer size is not greater than a maximum value indicated by the buffer size field comprised in the first BSR MAC CE, and the first buffer size is not less than a minimum value indicated by the buffer size field comprised in the first BSR MAC CE.

In one embodiment, the behavior of triggering the BSR refers to: providing data volume information at a MAC entity to a serving base station.

In one subembodiment of the above embodiment, the data volume information comprises uplink data volume information.

In one subembodiment of the above embodiment, the data volume information comprises sidelink data volume information.

In one embodiment, the behavior of triggering the BSR refers to: data volume of available data of a logical channel is determined by a MAC entity.

In one embodiment, the BSR is a Relay BSR.

In one embodiment, the BSR is a ToAddRelease BSR.

In one embodiment, the BSR procedure is executed at MAC sublayer.

In one embodiment, a first MAC Protocol Data Unit (PDU) comprises a first MAC sub-header and a first BSR; the first MAC sub-header indicates the first BSR.

In one subembodiment of the above embodiment, all or partial bits comprised in the first MAC PDU are used to generate the first radio signal.

In one subembodiment of the above embodiment, all or partial bits comprised in the first MAC PDU and a reference signal are used to generate the first radio signal.

In one subembodiment of the above embodiment, all or partial bits comprised in the first MAC PDU acquires the first radio signal sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, Modulation and Up conversion.

In one embodiment, the first radio signal is transmitted through a Physical Uplink Shared Channel (PUSCH).

In one embodiment, the first radio signal is transmitted via an air interface.

In one embodiment, the first radio signal is transmitted via a radio interface.

In one embodiment, the first radio signal is transmitted via a Uu interface.

In one embodiment, time-frequency resources occupied by the first radio signal belong to uplink time-frequency resources.

In one embodiment, the first logical channel set comprises at least one logical channel.

In one embodiment, the first logical channel set is identified by a first Logical Channel Group (LCG) identity.

In one embodiment, the first logical channel set comprises at least two logical channels; Quality of Service (QoS) parameters of the at least two logical channels comprised in the first logical channel set belong to a same type.

In one embodiment, the first BSR indicates the first logical channel group identity.

In one embodiment, the first BSR indicates the buffer size for the first logical channel set.

In one embodiment, the buffer size for the first logical channel set comprises data volume of available data for the first logical channel set.

In one embodiment, the first threshold is greater than 0.

In one embodiment, the first threshold is a fixed constant.

In one embodiment, the first threshold is configured by a downlink signaling.

In one embodiment, the first threshold is reported by an uplink signaling.

In one embodiment, the uplink signaling indicates UE capability of the first node.

In one embodiment, the uplink signaling is an RRC signaling.

In one embodiment, the buffer size for the first logical channel set is greater than the first reference buffer size, and the difference value between the buffer size for the first logical channel set and the first reference buffer size is a difference value of the buffer size for the first logical channel set minus the first reference buffer size, and the first threshold is greater than 0.

In one embodiment, the buffer size for the first logical channel set is less than the first parameter buffer size, and the difference value between the buffer size for the first logical channel set and the first reference buffer size is an absolute value of a difference value of the buffer size for the first logical channel set minus the first reference buffer size, and the first threshold is greater than 0.

In one embodiment, the second BSR is a second BSR MAC CE; the second BSR MAC CE comprises a buffer size field; the buffer size field comprised in the second BSR MAC CE indicates data volume of available data determined by a MAC entity.

In one subembodiment of the above embodiment, the first reference buffer size is related to a buffer size comprised in the second BSR.

In one embodiment, the second BSR is a second buffer size generated for triggering a BSR.

In one embodiment, the second buffer size is not greater than a maximum value indicated by the buffer size field comprised in the second BSR MAC CE, and the second buffer size is not less than a minimum value indicated by the buffer size field comprised in the second BSR MAC CE.

In one embodiment, the first reference buffer size is the second buffer size.

In one embodiment, the first reference buffer size is a maximum value of a buffer size indicated by the second BSR.

In one embodiment, the first reference buffer size is a minimum value of a buffer size indicated by the second BSR.

In one embodiment, the first reference buffer size is an average value of a maximum value of a buffer size indicated by the second BSR and a minimum value of a buffer size indicated by the second BSR.

In one embodiment, the second BSR is a latest BSR reported for the first logical channel set from the generation of a first BSR In one embodiment, reporting a BSR is transmitting a BSR MAC CE.

In one embodiment, after transmitting the second BSR MAC CE and before transmitting the first BSR MAC CE, a BSR MAC CE is not transmitted for the first logical channel set.

In one embodiment, after transmitting the second BSR MAC CE and before generating the first BSR MAC CE, a BSR MAC CE is not transmitted for the first logical channel set.

In one embodiment, the second BSR is a latest BSR triggered for the first logical channel set from the generation of a first BSR In one subembodiment of the above embodiment, the BSR triggered for the first logical channel set comprises triggering a BSR to determine the second buffer size.

In one embodiment, after triggering the second BSR and before transmitting the first BSR, a BSR is not triggered for the first logical channel set.

In one embodiment, after triggering the second BSR and before generating the first BSR, a BSR is not triggered for the first logical channel set.

Embodiment 1B

Figure 1B:
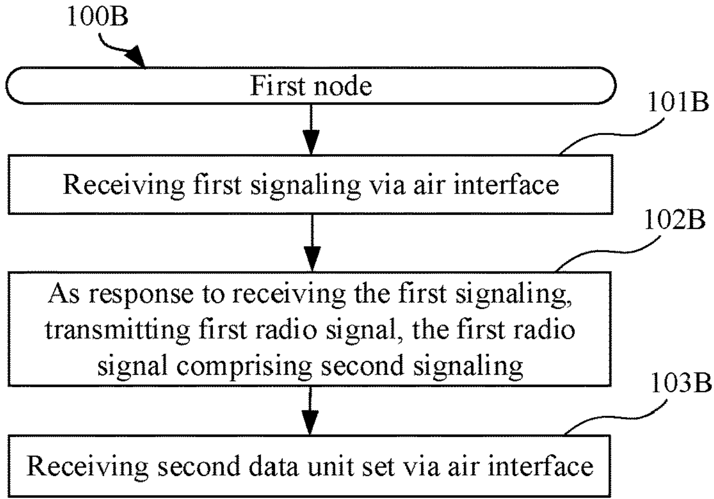
FIG. 1B illustrates a flowchart of transmission of a first node according to one embodiment of the present application.

Embodiment 1B illustrates a flowchart of transmission of a first node according to one embodiment of the present application, as shown in FIG. 1B.

In embodiment 1B, a first node 100B receives a first signaling via an air interface in step 101B; as a response to receiving the first signaling in step 102B, transmits a first radio signal, the first radio signal comprises a second signaling; receives a second data unit set via an air interface in step 103B; herein, the second signaling indicates that a first data unit set is not received, and both the first data unit set and the second data unit set are transmitted through a first radio bearer; the second signaling is used to determine the second data unit set; a transmitter of the first signaling is non-co-located with a receiver of the first radio signal; the first data unit set comprises at least one data unit; the second data unit set comprises the first data unit set.

In one embodiment, the air interface comprises an interface of radio signal transmission.

In one embodiment, the air interface comprises an interface of radio signaling transmission.

In one embodiment, the radio interface comprises a PC5 interface.

In one embodiment, the air interface comprises a Uu interface.

In one embodiment, transmitting via the air interface comprises: receiving via the air interface and transmitting via the air interface.

In one embodiment, transmitting via the air interface comprises: transmitting through SL.

In one embodiment, transmitting via the air interface comprises: transmitting through DL.

In one embodiment, transmitting via the air interface comprises: transmitting through UL.

In one embodiment, transmitting via the air interface comprises: a physical transmission channel is a Physical Sidelink Shared Channel (PSSCH).

In one embodiment, transmitting via the air interface comprises: a physical transmission channel is a Physical Downlink Shared Channel (PDSCH).

In one embodiment, transmitting via the air interface comprises: a logical transport channel is a Sidelink Traffic CHannel (STCH).

In one embodiment, transmitting via the air interface comprises: a logical transport channel is a Dedicated Traffic Channel (DTCH).

In one embodiment, transmitting via the air interface comprises: a logical transport channel is a Sidelink Control Channel (SCCH).

In one embodiment, transmitting via the air interface comprises: a logical transport channel is a Dedicated Control CHannel (DCCH).

In one embodiment, transmitting via the air interface comprises: a radio bearer is a Signaling Radio Bear (SRB).

In one embodiment, transmitting via the air interface comprises: a radio bearer is a Data Radio Bearer (DRB).

In one embodiment, transmitting via the air interface comprises: a radio bearer is an SL-SRB.

In one embodiment, time-frequency resources of the air interface belong to a V2X resource pool.

In one embodiment, time-frequency resources of the air interface are reserved for sidelink transmission.

In one embodiment, time-frequency resources of the air interface are reserved for downlink transmission.

In one embodiment, time-frequency resources of the air interface are reserved for uplink transmission.

In one embodiment, transmissions of the first radio signal, the second radio signal, the third radio signal set, the fourth radio signal set, the fifth radio signal, and the sixth radio signal in the present application are respectively via the air interface.

In one embodiment, transmissions of the first signaling, the second signaling, the first information, the second information and the third information in the present application are respectively via the air interface.

In one embodiment, a transmitter of the first signaling is the second node.

In one embodiment, the first signaling indicates that the second node has no subsequent packet to be transmitted for the first radio bearer.

In one embodiment, the first signaling indicates a transmission of a last packet of the second node for the first radio bearer.

In one embodiment, the first signaling comprises an End Marker message.

In one embodiment, the first signaling is generated at Radio Link Control (RLC) sublayer.

In one embodiment, the first signaling is generated at Media Access Control (MAC) sublayer.

In one embodiment, higher layer of the second node indicates generating the first signaling.

In one subembodiment of the above embodiment, the higher layer is an adaptation sublayer.

In one subembodiment of the above embodiment, the higher layer is an RLC sublayer.

In one embodiment, as a response to receiving the first signaling, a first radio signal is transmitted, the first radio signal comprises a second signaling.

In one embodiment, an RLC entity of the first node receives the first signaling, and the first signaling triggers the RLC entity to generate the second signaling.

In one embodiment, an RLC entity of the first node receives the first signaling, the first signaling is used to indicate that a PDCP entity of the first node generates the second signaling.

In one embodiment, a MAC entity of the first node receives the first signaling, and the first signaling is used to indicate that an RLC entity of the first node generates the second signaling.

In one embodiment, a MAC entity of the first node receives the first signaling, and the first signaling is used to indicate that a PDCP entity of the first node generates the second signaling.

In one embodiment, the first radio signal comprises the second signaling; a target receiver of the second signaling is a third node.

In one embodiment, a target receiver of a signaling refers to: the signaling is received via an air interface, and the signaling is not forwarded via an air interface.

In one embodiment, a target receiver of a signaling refers to: the signaling is received via an air interface, and the signaling ends at the receiver.

In one embodiment, a target receiver of a signaling refers to: the signaling is received via an air interface, and data carried in the signaling is transferred to RLC sublayer.

In one embodiment, a target receiver of a signaling refers to: the signaling is received via an air interface, and data carried in the signaling is transferred to PDCP sublayer.

In one embodiment, a target receiver of a signaling refers to: the signaling is received via an air interface, and data carried in the first signaling is transferred to Non-Access Stratum (NAS).

In one embodiment, the second signaling is transmitted through a PSSCH.

In one embodiment, the second signaling is transmitted through a DRB.

In one embodiment, a receiver of the first radio signal is a fourth node.

In one embodiment, the fourth node receives the first radio signal, the second signaling is recovered from the first radio signal, and the second signaling is used to generate the second radio signal for a transmission; a receiver of the second radio signal is the third node.

In one embodiment, the transmitter of the first signaling and a receiver of the first radio signal are not a same communication device.

In one embodiment, the transmitter of the first signaling is different from an identity of a receiver of the first radio signal.

In one embodiment, a MAC PDU comprising the first signaling comprises partial bits of an identity of the transmitter of the first signaling; Sidelink Control Information (SCI) scheduling the first signaling comprises remaining partial bits of the identity of the transmitter of the first signaling.

In one subembodiment of the above embodiment, the partial bits comprise higher 16 bits of the identity of the transmitter of the first signaling; the remaining partial bits comprise lower 8 bits of the identity of the transmitter of the first signaling.

In one embodiment, a MAC PDU comprising the first radio signal comprises partial bits of an identity of a receiver of the first radio signal; an SCI scheduling the first radio signal comprises remaining partial bits of the identity of the receiver of the first radio signal.

In one subembodiment of the above embodiment, the partial bits comprise higher 8 bits of the identity of the receiver of the first radio signal; the remaining partial bits comprise lower 16 bits of the identity of the receiver of the first radio signal.

In one embodiment, the SCI comprises a first-stage SCI format and a second-stage SCI format.

In one embodiment, the SCI indicates at least one of time-domain resources or frequency-domain resources of a physical-layer channel occupied by a MAC PDU comprising the first signaling.

In one embodiment, the SCI comprises at least one of a Modulation and Coding Status (MCS), a Redundancy Version (RV), a New Data Indicator (NDI) or a HARQ process number.

In one embodiment, the phrase of the second signaling indicating that a first data unit set is not received comprises: the first data unit set is lost.

In one embodiment, the second signaling is used to indicate a retransmission of the first data unit set.

In one embodiment, the first data unit set comprises at least one data unit.

In one embodiment, the second signaling is used by the third node to determine the second data unit set; the second data unit set comprises the first data unit set.

In one embodiment, the first data unit set and the second data unit set respectively comprises RLC Service Data Unit(s) (SDU(s)).

In one embodiment, the first data unit set and the second data unit set respectively comprise PDCP SDU(s).

In one embodiment, the first data unit set and the second data unit set respectively comprise RLC SDU segment(s).

In one embodiment, the first data unit set and the second data unit set respectively comprise RLC PDU(s).

In one embodiment, the first data unit set and the second data unit set respectively comprise PDCP PDU(s).

In one embodiment, the second data unit set is transmitted through a PSSCH.

In one embodiment, the second data unit set is transmitted through a DRB.

In one embodiment, the second data unit set comprises at least one data unit.

In one embodiment, the second data unit set is generated at the third node and is received at the fourth node after being transmitted via an air interface, the fourth node forwards the second data unit set and is received at the first node via an air interface.

In one embodiment, both the first data unit set and the second data unit set are transmitted through a first radio bearer.

In one embodiment, the first radio bearer is used to transmit services to which the first data unit set and the second data unit set belong.

In one embodiment, the first radio bearer is used to transmit PC5 Quality of Service (QoS) flow to which the first data unit set and the second data unit set belong.

In one embodiment, the first radio bearer is a DRB.

In one embodiment, the first radio bearer is an SL-SRB.

In one embodiment, the first radio bearer is an RLC bearer.

In one embodiment, the first node and the third node respectively maintains a PDCP entity of the first radio bearer.

In one embodiment, the first node and the third node respectively maintains an RLC entity of the first radio bearer.

In one embodiment, the first radio bearer is an Acknowledged Mode (AM) DRB.

In one embodiment, an RLC entity of the first radio bearer is an AM RLC entity.

In one embodiment, a Logical Channel Identifier (LCID) corresponding to any data unit in the first data unit set is the same as an LCID corresponding any data unit in the second data unit set.

Embodiment 1C

Figure 1C:
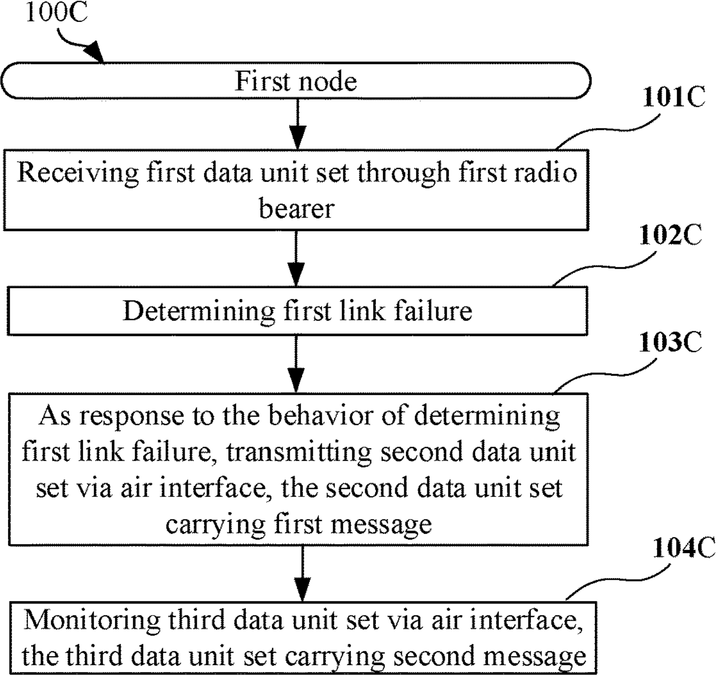
FIG. 1C illustrates a flowchart of transmission of a first node according to one embodiment of the present application.

Embodiment 1C illustrates a flowchart of transmission of a first node according to one embodiment of the present application, as shown in FIG. 1C.

In embodiment 1C, a first node 100C receives a first data unit set through a first radio bearer in step 101C; determines a first connection failure in step 102C; in step 103C as a response to the behavior of determining a first connection failure, transmits a second data unit set via an air interface, the second data unit set carries a first message; in step 104C monitors a third data unit set via an air interface, and the third data unit set carries a second message; herein, the first message is used to trigger the second message; the first radio bearer comprises a first PDCP entity and a first RLC bearer; a transmission of the second message is through a second PDCP entity and the first RLC bearer; the first message is used to trigger associating the first RLC bearer to the second PDCP entity; the second message comprises an RRC signaling, the first data unit set comprises at least one data unit, the second data unit set comprises at least one data unit, and the third data unit set comprises at least one data unit.

In one embodiment, the first radio bearer is a bi-directional radio bearer.

In one embodiment, the first radio bearer is a uni-directional radio bearer.

In one embodiment, the first radio bearer belongs to a Data Radio Bearer (DRB).

In one embodiment, the first radio bearer is used to transmit services to which the first data unit set belong.

In one embodiment, the first radio bearer is used to transmit a QoS flow to which the first data unit set belongs.

In one embodiment, the first data unit set comprises at least one data unit.

In one embodiment, each data unit in the first data unit set comprises an Internet Protocol (IP) Service Data Unit (SDU).

In one embodiment, each data unit in the first data unit set comprises an Address Resolution Protocol (ARP) SDU.

In one embodiment, each data unit in the first data unit set comprises a Non-IP SDU.

In one embodiment, each data unit in the first data unit set comprises a Radio Link Control (RLC) SDU.

In one embodiment, each data unit in the first data unit comprises an RLC SDU segment.

In one embodiment, each data unit in the first data unit comprises an RLC PDU.

In one embodiment, each data unit in the first data unit set comprises a Packet Data Convergence Protocol (PDCP) PDU.

In one embodiment, each data unit in the first data unit set comprises a PDCP SDU.

In one embodiment, each data unit in the first data unit set comprises a Medium Access Control (MAC) SDU.

In one embodiment, a MAC SDU comprised in each data unit in the first data unit set is identified by a same LCID.

In one embodiment, each data unit in the first data unit set is transmitted through a same PDCP entity and an RLC entity.

In one embodiment, the first connection comprises an RRC connection.

In one embodiment, the first connection comprises a radio link with a first cell.

In one embodiment, the first connection comprises a beam link with a first cell.

In one embodiment, the behavior of determining a first connection failure comprises: determining a Radio Link Failure (RLF) of a first cell according to channel measurement, and the first PDCP entity and the second PDCP entity are maintained by the first cell.

In one embodiment, the behavior of determining a first connection failure comprises: determining an RLF with a first cell according to expiration of maintained timer 310, and the first PDCP entity and the second PDCP entity are maintained by the first cell.

In one embodiment, the behavior of determining a first connection failure comprises: determining an RLF with a first cell according to expiration of maintained timer 312, and the first PDCP entity and the second PDCP entity are maintained by the first cell.

In one embodiment, the behavior of determining a first connection failure comprises: determining an RLF with a first cell according to a random access procedure failure, and the first PDCP entity and the second PDCP entity are maintained by the first cell.

In one embodiment, the behavior of determining a first connection failure comprises: determining an RLF with a first cell according to RLC reaching a maximum number of retransmissions, and the first PDCP entity and the second PDCP entity are maintained by the first cell.

In one embodiment, the behavior of determining a first connection failure comprises: determining an RLF with a first cell according to a Listen Before Talk (LBT) monitoring failure, and the first PDCP entity and the second PDCP entity are maintained by the first cell.

In one embodiment, the behavior of determining a first connection failure comprises: determining a Beam Link Failure (BLF) of a first cell according to a measurement performed on a downlink reference signal resource set, and the first PDCP entity and the second PDCP entity are maintained by the first cell.

In one embodiment, the behavior of determining a first connection failure comprises: determining an RLF with a first cell according to a Beam Failure Recovery Failure, and the first PDCP entity and the second PDCP entity are maintained by the first cell.

In one embodiment, the phrase being maintained by the first cell comprises: being maintained by a serving base station of the first cell.

In one embodiment, the phrase being maintained by the second cell comprises: being maintained by a serving base station of the second cell.

In one embodiment, the first radio bearer comprises a first PDCP entity and a first RLC bearer.

In one embodiment, the first RLC entity is maintained by a second cell.

In one embodiment, the second cell is a serving cell other than the first cell.

In one embodiment, there is an overlapping between frequency-domain resources of the first cell and frequency-domain-domain resources of the second cell.

In one embodiment, there is no overlapping between the frequency-domain resources of the first cell and the frequency-domain resources of the second cell.

In one embodiment, the first cell and the second cell belong to intra-frequency cells.

In one embodiment, the first cell and the second cell belong to inter-frequency cells.

In one embodiment, a backhaul link between the first cell and the second cell is non-ideal (that is, delay cannot be ignored).

In one embodiment, the first RLC bearer comprises a first RLC entity.

In one embodiment, the first RLC entity is maintained by the second cell.

In one embodiment, the first PDCP entity is maintained by the first cell.

In one embodiment, the first PDCP entity is associated with the first RLC bearer.

In one embodiment, configuration information configuring the first radio bearer comprises a first radio bearer identity; the first radio bearer identity is used to identify the first radio bearer.

In one embodiment, the configuration message of the first radio bearer comprises an RRCSetup message.

In one embodiment, the configuration message of the first radio bearer comprises an RRCConnectionSetup message.

In one embodiment, the configuration message of the first radio bearer comprises an RRCResume message.

In one embodiment, the configuration message of the first radio bearer comprises an RRCReconfiguration message.

In one embodiment, the configuration message of the first radio bearer comprises an RRCConnectionReconfiguration message.

In one embodiment, the configuration message of the first radio bearer comprises a RadioBearerConfig Information Element (IE).

In one embodiment, the configuration message of the first radio bearer comprises a radioResourceConfigDedicated IE.

In one embodiment, the first radio bearer identity comprises an Evolved Packet System (eps)-bearerIdentity.

In one embodiment, the first radio bearer identity comprises a drb-Identity.

In one embodiment, the configuration message of the first radio bearer comprises configuration information of the first PDCP entity.

In one embodiment, the configuration message configuring the first radio bearer comprises a configuration message of the first PDCP entity; the first radio bearer identity is used to identify the first PDCP entity.

In one embodiment, the configuration message of the first PDCP entity comprises a pdcd-Config IE.

In one embodiment, a configuration message configuring the first RLC bearer comprises the first radio bearer identity; the first radio bearer identity is used to identify the first RLC bearer.

In one embodiment, the first radio bearer identity is used to associated the first PDCP entity with the first RLC bearer.

In one embodiment, the first RLC bearer comprises the first RLC entity.

In one embodiment, the configuration message of the first RLC bearer comprises a configuration message of the first RLC entity.

In one embodiment, the configuration message of the first RLC bearer comprises a first logical channel identity.

In one embodiment, the first logical channel identity indicates the first RLC entity.

In one embodiment, in a transfer of a data unit from an RLC entity to a MAC entity, a first logical channel identity is used to indicate transferring an RLC PDU from the first RLC entity to a MAC entity.

In one embodiment, in a transfer of a data unit from a MAC entity to an RLC entity, a first logical channel identity is used to indicate that a MAC SDU is transferred to a first RLC entity.

In one embodiment, the MAC entity implements the MAC sub-layer protocol stack function.

In one embodiment, the configuration message of the first RLC bearer comprises a cell identity indicating the second cell.

In one embodiment, the cell identity of the second cell is used to indicate a cell maintaining the first RLC bearer.

In one embodiment, the cell identity comprises a physical cell ID.

In one embodiment, the cell identity comprises a cell index.

In one embodiment, the cell identity comprises a global cell ID.

In one embodiment, the configuration message of the first RLC bearer comprises an RRCSetup message.

In one embodiment, the configuration message of the first RLC bearer comprises an RRCConnectionSetup message.

In one embodiment, the configuration message of the first RLC bearer comprises an RRCResume message.

In one embodiment, the configuration message of the first RLC bearer comprises an RRCReconfiguration message.

In one embodiment, the configuration message of the first RLC bearer comprises an RRCConnectionReconfiguration message.

In one embodiment, the configuration message of the first RLC bearer comprises a masterCellGroup IE.

In one embodiment, the configuration message of the first RLC bearer comprises a secondaryCellGroup IE.

In one embodiment, the configuration message of the first RLC bearer comprises a CellGroupConfig IE.

In one embodiment, the configuration message of the first RLC bearer comprises a RLC-bearerConfig IE.

In one embodiment, the configuration message of the first radio bearer comprises the configuration message of the first RLC bearer.

In one embodiment, the first radio bearer and the first RLC bearer are respectively configured by the third node.

In one embodiment, as a response to the behavior of determining a first connection failure, a second data unit set is transmitted via an air interface.

In one embodiment, after the first message is encapsulated into a second data unit set by a transmitter, it is transmitted via an air interface.

In one embodiment, a second data unit set carrying the first message is received by a receiver of the first message via an air interface.

In one embodiment, the air interface comprises an interface of radio signal transmission.

In one embodiment, the air interface comprises an interface of radio signaling transmission.

In one embodiment, the air interface comprises a Uu.

In one embodiment, the radio interface comprises a PC5.

In one embodiment, the second data unit set comprises at least one data unit.

In one embodiment, each data unit in the second data unit set comprises a Transport Block (TB).

In one embodiment, each data unit in the second data unit set comprises a MAC PDU.

In one embodiment, the second data unit set only comprises a data unit, the data unit in the second data unit set comprises a MAC CE, and the MAC CE carries the first message.

In one embodiment, the MAC CE carrying the first message and a data unit belonging to the first radio bearer are multiplexed into a MAC PDU for transmission.

In one embodiment, the second data unit set comprises a MAC SDU.

In one embodiment, each data unit in the second data unit set comprises a MAC SDU segment of the MAC SDU comprised in the second data unit set.

In one embodiment, the MAC CE comprised in the second data unit set carries the first message.

In one embodiment, the second data unit set carries the first message.

In one embodiment, the MAC SDU segment comprised in each data unit in the second data unit set consists of the first message.

In one embodiment, the first message comprises control information.

In one embodiment, the first message comprises an RRC signaling.

In one embodiment, the first message comprises an RRC-SetupRequest.

In one embodiment, the first message comprises an RRCReestablishmentRequest.

In one embodiment, the first message comprises an RRCReestab-initiated.

In one embodiment, the first message comprises an RRC-Setup-initiated.

In one embodiment, the first message comprises a UE RLF Report Container IE.

In one embodiment, the first message comprises a cause of the first connection failure.

In one embodiment, the cause of the first connection failure is carried in an establishmentCause field.

In one embodiment, the cause of the first connection failure is carried in a ReestablishmentCause field.

In one embodiment, the cause of the first connection failure comprises an RLF.

In one embodiment, the cause of the first connection failure comprises a BLF.

In one embodiment, the cause of the first connection failure comprises reconfigurationFailure.

In one embodiment, the cause of the first connection failure comprises handoverFailure.

In one embodiment, the cause of the first connection failure comprises otherFailure.

In one embodiment, the first message comprises frequency of a Synchronization Signal Block (SSB) of the first cell.

In one embodiment, the first message comprises the cell identity of the first cell.

In one embodiment, the first message comprises the cell identity of a re-established cell; the re-established cell is a cell other than the first cell.

In one embodiment, the first message comprises a first user identity.

In one embodiment, the first user identity comprises a first Cell-Radio Network Temporary Identifier (C-RNTI).

In one embodiment, the first user identity comprises a UE-identity.

In one embodiment, the first user identity comprises a random value.

In one embodiment, the first user identity uniquely identifies the first node in the first cell.

In one embodiment, a serving node of the first cell allocates the first user identity for the first node.

In one embodiment, the second data unit set carries a first extended message.

In one embodiment, the first extended message is not transmitted via backhaul link.

In one embodiment, the first message is used to trigger a re-establishment of the first RLC entity.

In one embodiment, the first message is used to trigger a generation of the second message.

In one embodiment, a target receiver of the first message is the third node.

In one embodiment, the first message is forwarded from the second node to the third node.

In one embodiment, the second message is generated at the third node.

In one embodiment, the second message is forwarded through the second node to the first node.

In one embodiment, the behavior of monitoring a third data unit set comprises receiving a third data unit set.

In one embodiment, the behavior of monitoring a third data unit set comprises monitoring a first signaling set, and each signaling in the first signaling set is a physical-layer signaling.

In one embodiment, each signaling in the first signaling set comprises Downlink Control Information (DCI) of a Downlink Grant.

In one embodiment, each signaling in the first signaling set is transmitted through a Physical Downlink Control Channel (PDCCH).

In one embodiment, each signaling in the first signaling set is identified by a second C-RNTI.

In one embodiment, the second C-RNTI is configured by the second cell.

In one embodiment, each signaling in the first signaling set comprises modulation information of a physical-layer channel occupied by a data unit corresponding to the third data unit set.

In one subembodiment of the above embodiment, a first signaling in the first signaling set corresponds to modulation information of a physical-layer channel occupied by a first data unit in the third data unit set; a second signaling in the first signaling set corresponds to modulation information of a physical-layer channel occupied by a second data unit in the third data unit set, and so on, without further ado.

In one embodiment, a physical-layer channel occupied by each data unit in the third data unit set is a Physical Downlink Shared CHannel (PDSCH).

In one embodiment, the modulation information of the physical-layer channel comprises at least one of time-frequency resources used by the physical-layer channel, a Modulation and Coding Scheme (MCS), or a Hybrid Automatic Repeat reQuest (HARQ) process identity.

In one embodiment, the behavior of monitoring a first signaling set comprises executing an energy detection for each signaling in the first signaling set.

In one embodiment, the behavior of monitoring a first signaling set comprises executing a coherent detection of a characteristic sequence for each signaling in the first signaling set.

In one embodiment, the behavior of monitoring a first signaling set comprises executing a Cyclic Redundancy Check (CRC) for each signaling in the first signaling set.

In one embodiment, the behavior of monitoring a first signaling set comprises executing a blindly decoding for each signaling in the first signaling set.

In one embodiment, the behavior of monitoring a third data unit set comprises monitoring a first signaling set, and executing decoding on the physical channel indicated by scheduling information of a physical-layer channel comprised in each signaling in the first signaling set to acquire a data unit in the third data unit set.

In one embodiment, the third data unit set comprises at least one data unit.

In one embodiment, each data unit in the third data unit set comprises a TB.

In one embodiment, each data unit in the third data unit set comprises a MAC PDU.

In one embodiment, each data unit in the third data unit set comprises an RLC PDU.

In one embodiment, the third data unit set comprises a MAC SDU.

In one embodiment, each data unit in the third data unit set comprises a MAC SDU segment of the MAC SDU comprised in the third data unit set.

In one embodiment, the MAC SDU segment comprised in each data unit in the third data unit set is identified by a same LCID.

In one embodiment, an LCID of the MAC SDU segment comprised in the third data unit set comprised in each data unit in the third data unit set is the same as an LCID of the MAC SDU comprised in each data unit in the first data unit set.

In one embodiment, the third data unit set carries the second message.

In one embodiment, the MAC SDU segment comprised in each data unit in the third data unit set consists of the second message.

In one embodiment, after the second message is encapsulated by a transmitter into a third data unit set, it is transmitted via an air interface.

In one embodiment, a third data unit set carrying the second message is received by a receiver of the second message via an air interface.

In one embodiment, the second message is used to reconfigure the first radio bearer.

In one embodiment, the second message comprises an RRC signaling.

In one embodiment, the second message is used for a reconfiguration of an RRC connection.

In one embodiment, the second message is used for a setup of an RRC connection.

In one embodiment, the second message is used for a re-establishment of an RRC connection.

In one embodiment, the second message comprises an RRCReconfiguration message.

In one embodiment, the second message comprises an RRCConnectionReconfiguration message.

In one embodiment, the second message comprises an RRCSetup message.

In one embodiment, the second message comprises an RRCConnectionSetup.

In one embodiment, the second message comprises an RRCReestablishment message.

In one embodiment, the second message comprises a RRCConnectionReestablishment message.

In one embodiment, the second message comprises a RadioBearerConfig IE.

In one embodiment, the second message comprises an RadioResourceConfigDedicated IE.

In one embodiment, the second message comprises a masterCellGroup message.

In one embodiment, the second message comprises a secondaryCellGroup message.

In one embodiment, the second message comprises an RLC-bearerConfig message.

In one embodiment, the second PDCP entity is maintained by the first cell.

In one embodiment, a transmission of the second message is through the second PDCP entity and the first RLC entity.

In one embodiment, the first message is used to trigger associating the first RLC bearer to the second PDCP entity.

In one embodiment, the first message is used to trigger associating the first RLC bearer to the first PDCP entity and the second PDCP entity at the same time.

In one embodiment, as a response to receiving the first message, the first RLC bearer is identified by the first radio bearer identity and a second radio bearer identity at the same time.

In one embodiment, the second radio bearer identity is used to identify a second radio bearer.

In one embodiment, the second radio bearer is a Signaling Radio Bearer (SRB).

In one embodiment, the second radio bearer identity comprises an sib-Identity.

In one embodiment, the srb-Identity comprised in the second radio bearer identity is 1.

In one embodiment, the srb-Identity comprised in the second radio bearer identity is 2.

In one embodiment, the srb-Identity comprised in the second radio bearer identity is 3.

In one embodiment, the second radio bearer comprises the second PDCP entity.

In one embodiment, the second radio bearer identity is used to associated with the second PDCP entity and the first RLC bearer.

Embodiment 2

Figure 2:
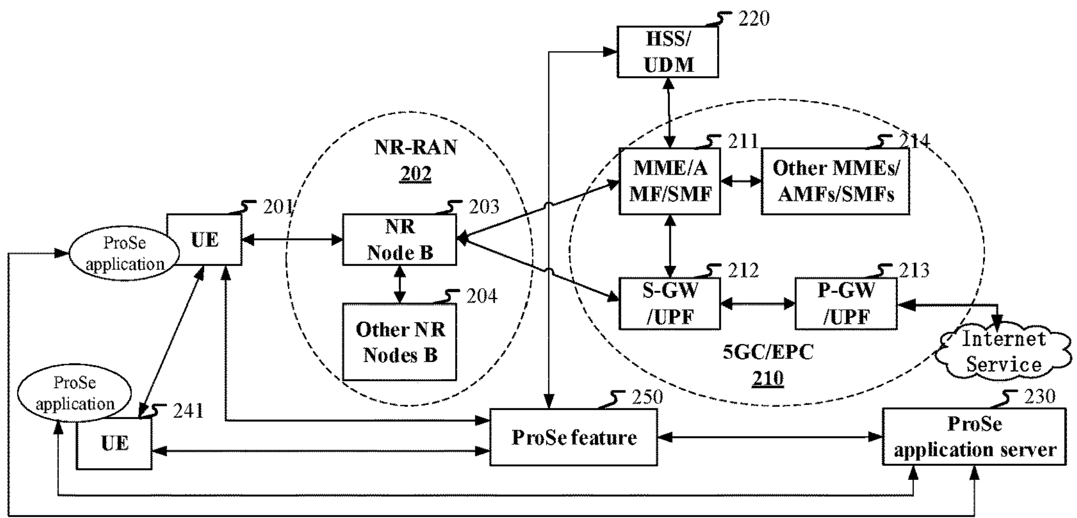
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE), and Long-Term Evolution Advanced (LTE-A) systems. The NR 5G, LTE or LTE-A network architecture 200 may be called a 5G System (5GS)/Evolved Packet System (EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server (HSS)/Unified Data Management (UDM) 220 and an Internet Service 230. To support V2X or D2D transmission, 5GS/EPS 200 can also comprise ProSe function 250 and ProSe application server 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). XnAP protocol of Xn interface is used to transmit control plane messages of wireless networks, and user plane protocol of Xn interface is used to transmit user plane data. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms, and in Non Terrestrial Networks (NTNs), the gNB 203 can be a satellite, an aircraft or a terrestrial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 corresponds to the first node in the present application.

In one embodiment, the NR node B 203 corresponds to a second node in the present application.

In one embodiment, the other NR nodes B correspond to the third node in the present application.

In one embodiment, the NR node B, the UE 201 and the UE 241 respectively correspond to the first node, the second node and the third node in the present application.

In one embodiment, the UE 201 corresponds to the first node in the present application, and the UE 241 corresponds to the second node in the present application.

In one embodiment, the UE 201 corresponds to the second node in the present application, and the UE 241 corresponds to the third node in the present application.

In one embodiment, the UE 201 and the UE 241 respectively support transmission in SL.

In one embodiment, the UE 201 and the UE 241 respectively support PC5 interface.

In one embodiment, the UE 201 and the UE 241 respectively support Internet of Vehicles (IoV).

In one embodiment, the UE 201 and the UE 241 respectively support V2X services.

In one embodiment, the UE 201 and the UE 241 respectively support D2D services.

In one embodiment, the UE 201 and the UE 241 respectively support public safety services.

In one embodiment, the UE 201 supports relay transmission.

In one embodiment, the UE 241 supports relay transmission.

In one embodiment, the gNB 203 supports Internet of Vehicles.

In one embodiment, the gNB 203 supports V2X services.

In one embodiment, the gNB 203 supports D2D services.

In one embodiment, the gNB 203 supports public safety services.

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, the gNB 203 is a base station that supports large delay differences.

In one embodiment, the gNB 203 is a test device (e.g., a transceiver device simulating partial functions of a base station, a signaling tester).

In one embodiment, a radio link from the UE 201 to the gNB 203 is an uplink, and the uplink is used for executing an uplink transmission.

In one embodiment, a radio link from the gNB 203 to the UE 201 is a downlink, and the downlink is used for executing a downlink transmission.

In one embodiment, a radio link between the UE 201 and the UE 241 is a sidelink, and the sidelink is used for executing a sidelink transmission.

In one embodiment, the UE 201 and the gNB 203 are connected via a Uu interface.

In one embodiment, the UE 201 and the UE241 are connected via a PC5 interface.

In one embodiment, the ProSe feature 250 is connected with the UE 201 and the UE 241 respectively via a PC3 Reference Point.

In one embodiment, the ProSe feature 250 is connected with the ProSe application server 230 via a PC2 Reference Point.

In one embodiment, the ProSe application server 230 is connected with the ProSe application of the UE 201 and the ProSe application of the UE 241 respectively via a PCI Reference Point.

Embodiment 3

Figure 3:
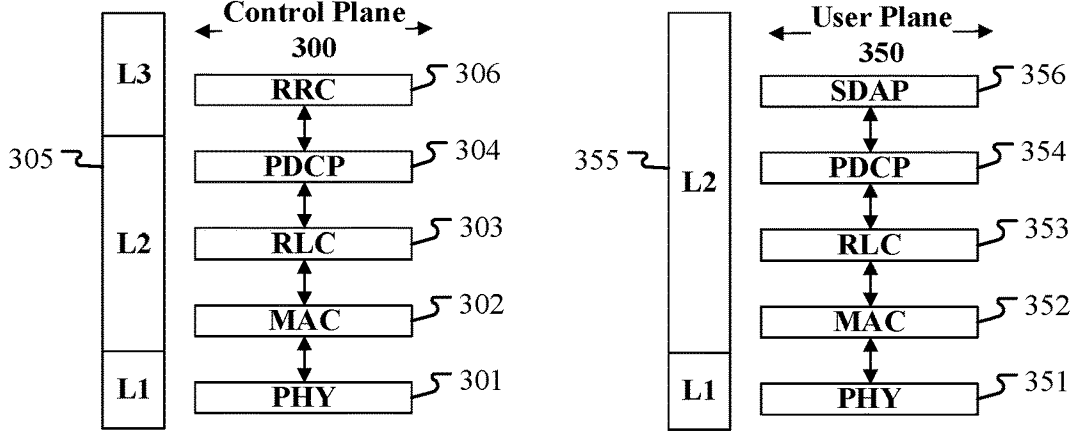
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 of a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the UE and the gNB via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection and also provides support for a UE handover between gNBs. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel ID. The MAC sublayer 302 is also responsible for allocating between UEs various radio resources (i.e., resources block) in a cell. The MAC sublayer 302 is also responsible for Hybrid Automatic Repeat Request (HARQ) operation. The Radio Resource Control (RRC) sublayer 306 in layer 3 (L3) of the control plane 300 is responsible for acquiring radio resources (i.e., radio bearer) and configuring the lower layer with an RRC signaling between the gNB and the UE. Although not shown, the RRC sublayer 306 in the control plane 300 of the UE may also have a V2X layer, and the V2X layer is responsible for generating a PC5 QoS parameter group and QoS rules according to received service data or service requests, a PC5 QoS flow is generated corresponding to a PC5 QoS parameter group, and a PC5 QoS flow ID and the corresponding PC5 QoS parameter group are transmitted to an Access Stratum (AS) Layer for QoS processing of a packet belonging to the PC5 QoS flow ID by the AS layer; the V2X layer also comprises a PC5-Signaling Protocol sublayer, and the V2X layer is responsible for indicating whether each transmission of the AS layer is a PC5-S transmission or a V2X service data transmission. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. The radio protocol architecture of the UE in the user plane 350 may comprises part or all of protocol sublayers of the SDAP sublayer 356, the PDCP sublayer 354, the RLC sublayer 353 and the MAC sublayer 352 at L2 layer. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the RLC channel comprises a Service Access Point (SAP) between the RLC 303 and the PDCP 304.

In one embodiment, the RLC channel comprises an SAP between the RLC 353 and the PDCP 354.

In one embodiment, a logical channel comprises an SAP between the RLC 303 and the MAC 302.

In one embodiment, a logical channel comprises an SAP between the RLC 353 and the MAC 352.

In one embodiment, a transport channel comprises an SAP between the MAC 302 and the PHY 301.

In one embodiment, a transport channel comprises an SAP between the MAC 352 and the PHY 351.

In one embodiment, entities of multiple sublayers of the control plane in FIG. 3 form a Signaling Radio Bear (SRB) in the vertical direction.

In one embodiment, entities of multiple sublayers of the user plane in FIG. 3 form a Data Radio Bear (DRB) in the vertical direction.

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first BSR in the present application is generated by the MAC 302.

In one embodiment, the first BSR in the present application is generated by the MAC 352.

In one embodiment, the second BSR in the present application is generated by the MAC 302.

In one embodiment, the second BSR in the present application is generated by the MAC 352.

In one embodiment, the first radio signal in the present application is generated by the PHY 351.

In one embodiment, the first signaling in the present application is generated by the RLC 303 or the RLC 353.

In one embodiment, the first signaling in the present application is generated by the PDCP 304 or the PDCP 354.

In one embodiment, the second signaling in the present application is generated by the RLC 303 or the RLC 353.

In one embodiment, the second signaling in the present application is generated by the PDCP 304 or the PDCP 354.

In one embodiment, the first radio signal in the present application is generated by the PHY 301 or the PHY 351.

In one embodiment, the second radio signal in the present application is generated by the PHY 301 or the PHY 351.

In one embodiment, the second data unit set in the present application is generated at the RLC 303 or the RLC 353.

In one embodiment, the second data unit set in the present application is generated at the PDCP 304 or the PDCP 354.

In one embodiment, the fifth data unit set in the present application is generated at the RLC 303 or the RLC 353.

In one embodiment, the fifth data unit set in the present application is generated at the PDCP 304 or the PDCP 354.

In one embodiment, the first information in the present application is generated by the RRC 306.

In one embodiment, the third radio signal set in the present application is generated by the PHY 301 or the PHY 351.

In one embodiment, the fourth radio signal set in the present application is generated by the PHY 301 or the PHY 351.

In one embodiment, the second information in the present application is generated by the RRC 306.

In one embodiment, the second information in the present application is generated by the PC5-S.

In one embodiment, the third information in the present application is generated by the RRC 306.

In one embodiment, the third information in the present application is generated by the PC5-S.

In one embodiment, a data plane between the first node in the present application and the second node in the present application only needs to maintain a connection between the PHY layer and the MAC sublayer.

In one embodiment, a data plane between the second node in the present application and the third node in the present application only needs to maintain a connection between the PHY layer and the MAC sublayer.

In one embodiment, a data plane between the first node in the present application and the second node in the present application only needs to maintain a connection among the PHY layer, the MAC sublayer and the RLC sublayer.

In one embodiment, a data plane between the second node in the present application and the third node in the present application only needs to maintain a connection among the PHY layer, the MAC sublayer and the RLC sublayer.

In one embodiment, the first data unit set in the present application is generated by the SDAP 356.

In one embodiment, the first data unit set in the present application is generated by the PDCP 356.

In one embodiment, the first data unit set in the present application is generated by the RLC 353.

In one embodiment, the first data unit set in the present application is generated by the MAC 352.

In one embodiment, the second data unit set in the present application is generated by the MAC 352.

In one embodiment, the third data unit set in the present application is generated by the RLC 353.

In one embodiment, the first message in the present application is generated by the RRC 306.

In one embodiment, the second message in the present application is generated by the RRC 306.

In one embodiment, the L2 layer 305 or 355 belongs to a higher layer.

In one embodiment, the RRC sublayer 306 in the L3 layer belongs to a higher layer.

In one embodiment, the V2X layer belongs to Non-Access Stratum (NAS).

Embodiment 4

Figure 4:
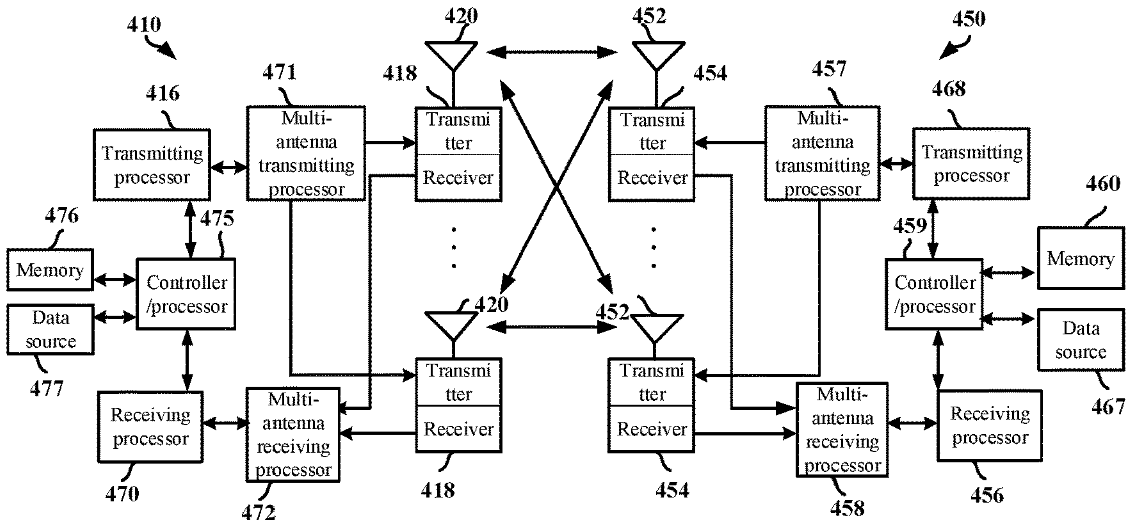
FIG. 4 illustrates a schematic diagram of hardware modules of a communication device according to one embodiment of the present application.

Embodiment 4 illustrates a schematic diagram of hardware modules of a communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from the core network or a higher layer packet from the data source 477 is provided to the controller/processor 475. The core network and the data source 477 represents all protocol layers above the L2 layer. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission from the second communication device 410 to the first communication device 450, the controller/processor 459 provides multiplexing between a transport channel and a logical channel, packet reassembling, decryption, header decompression, control signal processing so as to recover a higher-layer packet from the second communication device 410. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the first communication device 450. The higher layer packet from the controller/processor 475 can be provided to all protocol layers above the core network or the L2 layer, and various control signals can also be provided to the core network or L3 layer for L3 layer processing.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: as a response to a first condition being satisfied, generates a first BSR; transmits a first radio signal, the first radio signal carries the first BSR; herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

In one embodiment, the first communication device 450 comprises: a memory that stores a computer readable instruction program. The computer readable instruction program generates an action when executed by at least one processor. The action includes: as a response to a first condition being satisfied, generating a first BSR; transmitting a first radio signal, the first radio signal carrying the first BSR; herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first signaling via an air interface; as a response to receiving the first signaling, transmits a first radio signal, the first radio signal comprises a second signaling; receives a second data unit set via an air interface; herein, the second signaling indicates that a first data unit set is not received, and both the first data unit set and the second data unit set are transmitted through a first radio bearer; the second signaling is used to determine the second data unit set; a transmitter of the first signaling is non-co-located with a receiver of the first radio signal; the first data unit set comprises at least one data unit; the second data unit set comprises the first data unit set.

In one embodiment, the first communication device 450 comprises: a memory that stores a computer readable instruction program. The computer readable instruction program generates an action when executed by at least one processor. The action includes: receiving a first signaling via an air interface; as a response to receiving the first signaling, transmitting a first radio signal, the first radio signal comprising a second signaling; receiving a second data unit set via an air interface; herein, the second signaling indicates that a first data unit set is not received, and both the first data unit set and the second data unit set are transmitted through a first radio bearer; the second signaling is used to determine the second data unit set; a transmitter of the first signaling is non-co-located with a receiver of the first radio signal; the first data unit set comprises at least one data unit; the second data unit set comprises the first data unit set.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first data unit set through a first radio bearer; determines a first connection failure; monitors a third data unit set via an air interface, and the third data unit set carries a second message; as a response to the behavior of determining a first connection failure, transmits a second data unit set via an air interface, the second data unit set carries a first message; herein, the first message is used to trigger the second message; the first radio bearer comprises a first PDCP entity and a first RLC bearer; a transmission of the second message is through a second PDCP entity and the first RLC bearer; the first message is used to trigger associating the first RLC bearer to the second PDCP entity; the second message comprises an RRC signaling, the first data unit set comprises at least one data unit, the second data unit set comprises at least one data unit, and the third data unit set comprises at least one data unit.

In one embodiment, the first communication device 450 comprises: a memory that stores a computer readable instruction program. The computer readable instruction program generates an action when executed by at least one processor. The action includes: receiving a first data unit set through a first radio bearer; determining a first connection failure; monitoring a third data unit set via an air interface, and the third data unit set carrying a second message; as a response to the behavior of determining a first connection failure, transmitting a second data unit set via an air interface, the second data unit set carrying a first message; herein, the first message is used to trigger the second message; the first radio bearer comprises a first PDCP entity and a first RLC bearer; a transmission of the second message is through a second PDCP entity and the first RLC bearer; the first message is used to trigger associating the first RLC bearer to the second PDCP entity; the second message comprises an RRC signaling, the first data unit set comprises at least one data unit, the second data unit set comprises at least one data unit, and the third data unit set comprises at least one data unit.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: receives a first radio signal, the first radio signal carrying the first BSR; as a response to a first condition being satisfied, a first BSR is generated; herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

In one embodiment, the second communication device 410 comprises a memory that stores a computer readable instruction program. The computer readable instruction program generates an action when executed by at least one processor. The action includes: receiving a first radio signal, the first radio signal carrying the first BSR; as a response to a first condition being satisfied, a first BSR is generated; herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first signaling via an air interface; herein, a first radio signal is received, the first radio signal comprises a second signaling, and the second signaling is used to generate a second radio signal; the second radio signal is transmitted; a second data unit set is received via an air interface; the second signaling indicates that a first data unit set is not received, and both the first data unit set and the second data unit set are transmitted through a first radio bearer; the second signaling is used to determine the second data unit set; the second node is non-co-located with a receiver of the first radio signal; the first data unit set comprises at least one data unit; the second data unit set comprises the first data unit set.

In one embodiment, the second communication device 410 comprises a memory that stores a computer readable instruction program. The computer readable instruction program generates an action when executed by at least one processor. The action includes: transmitting a first signaling via an air interface; herein, a first radio signal is received, the first radio signal comprises a second signaling, and the second signaling is used to generate a second radio signal; the second radio signal is transmitted; a second data unit set is received via an air interface; the second signaling indicates that a first data unit set is not received, and both the first data unit set and the second data unit set are transmitted through a first radio bearer; the second signaling is used to determine the second data unit set; the second node is non-co-located with a receiver of the first radio signal; the first data unit set comprises at least one data unit; the second data unit set comprises the first data units set.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: receives a second radio signal, the second radio signal comprises a second signaling; transmits a second data unit set via an air interface; herein, the second signaling indicates that a first data unit set is not received, and both the first data unit set and the second data unit set are transmitted through a first radio bearer; the second signaling is used to determine the second data unit set; a first signaling is transmitted; a transmitter of the first signaling is non-co-located with a transmitter of the second radio signal; the first data unit set comprises at least one data unit; the second data unit set comprises the first data unit set.

In one embodiment, the second communication device 410 comprises a memory that stores a computer readable instruction program. The computer readable instruction program generates an action when executed by at least one processor. The action includes: receiving a second radio signal, the second radio signal comprising a second signaling; transmitting a second data unit set via an air interface; herein, the second signaling indicates that a first data unit set is not received, and both the first data unit set and the second data unit set are transmitted through a first radio bearer; the second signaling is used to determine the second data unit set; a first signaling is transmitted; a transmitter of the first signaling is non-co-located with a transmitter of the second radio signal; the first data unit set comprises at least one data unit; the second data unit set comprises the first data unit set.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: receives a first data unit set via a backhaul link; receives a second data unit set via an air interface, the second data unit set carries a first message; transmits the first data unit set through a first RLC bearer; transmits a third data unit set via the air interface, and the third data unit set carries a second message; herein, the first message is used to trigger the second message; the first RLC bearer belongs to a first radio bearer, and the first radio bearer comprises a first PDCP entity; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

In one embodiment, the second communication device 410 comprises a memory that stores a computer readable instruction program. The computer readable instruction program generates an action when executed by at least one processor. The action includes: receiving a first data unit set via a backhaul link; receiving a second data unit set via an air interface, the second data unit set carrying a first message; transmitting the first data unit set through a first RLC bearer; transmitting a third data unit set via the air interface, and the third data unit set carrying a second message; herein, the first message is used to trigger the second message; the first RLC bearer belongs to a first radio bearer, and the first radio bearer comprises a first PDCP entity; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first data unit set via a backhaul link; transmits a second message via the backhaul link; receives a first message via the backhaul link; herein, the first data unit set is transmitted through a first radio bearer, and the first radio bearer comprises a first PDCP entity and a first RLC bearer; the first message is used to trigger the second message; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

In one embodiment, the second communication device 410 comprises a memory that stores a computer readable instruction program. The computer readable instruction program generates an action when executed by at least one processor. The action includes: transmitting a first data unit set via a backhaul link; transmitting a second message via the backhaul link; receiving a first message via the backhaul link; herein, the first data unit set is transmitted through a first radio bearer, and the first radio bearer comprises a first PDCP entity and a first RLC bearer; the first message is used to trigger the second message; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

In one embodiment, the first communication device 450 corresponds to a first node in the present application, and the second communication device 410 corresponds to a second node in the present application.

In one embodiment, the first communication device 450 corresponds to a first node in the present application, and the second communication device 410 corresponds to a third node in the present application.

In one embodiment, the first communication device 450 corresponds to a second node in the present application; the second communication device 410 corresponds to a third node in the present application.

In one embodiment, the first communication device 450 is a UE.

In one embodiment, the first communication device 450 is a relay node.

In one embodiment, the first communication device 450 is a base station.

In one embodiment, the first communication device 450 is a UE that supports V2X.

In one embodiment, the first communication device 450 is a UE that supports D2D.

In one embodiment, the first communication device 450 is a vehicle equipment.

In one embodiment, the second communication device 410 is a base station.

In one embodiment, the second communication device 410 is a relay node.

In one embodiment, the second communication device 410 is a UE.

In one embodiment, the second communication device 410 is a UE that supports V2X.

In one embodiment, the second communication device 410 is a UE that supports D2D.

In one embodiment, the second communication device 410 is a vehicle-mounted device.

In one embodiment, at least one of the antenna 452, the transmitter 454, the multi-antenna transmitting processor 457, the transmitting processor 468 or the controller/processor 459 is used to transmit a first radio signal in the present application.

In one embodiment, at least one of the antenna 420, the receiver 418, the multi-antenna receiving processor 472, the receiving processor 470 or the controller/processor 475 is used to receive a first radio signal in the present application.

In one embodiment, at least one of the antenna 452, the receiver 454, the multi-antenna receiving processor 458, the receiving processor 456 or the controller/processor 459 is used to receive a first data unit set in the present application.

In one embodiment, at least one of the antenna 452, the transmitter 454, the multi-antenna transmitting processor 457, the transmitting processor 468 or the controller/processor 459 is used to transmit a second data unit set in the present application.

In one embodiment, at least one of the antenna 420, the receiver 418, the multi-antenna receiving processor 472, the receiving processor 470 or the controller/processor 475 is used to receive a second data unit set in the present application.

In one embodiment, the controller/processor 459 is used to judge that a first condition is satisfied.

In one embodiment, the data source 467 is used to determine a first link failure.

In one embodiment, at least one of the antenna 420, the transmitter 418, the multi-antenna transmitting processor 471, the transmitting processor 416 or the controller/processor 475 is used to transmit a first signaling in the present application.

In one embodiment, at least one of the antenna 452, the receiver 454, the multi-antenna receiving processor 458, the receiving processor 456 or the controller/processor 459 is used to receive a first signaling in the present application.

In one embodiment, at least one of the antenna 452, the transmitter 454, the multi-antenna transmitting processor 457, the transmitting processor 468 or the controller/processor 459 is used to transmit a second signaling in the present application.

In one embodiment, at least one of the antenna 420, the receiver 418, the multi-antenna receiving processor 472, the receiving processor 470 or the controller/processor 475 is used to receive a second signaling in the present application.

In one embodiment, at least one of the antenna 420, the transmitter 418, the multi-antenna transmitting processor 471, the transmitting processor 416 or the controller/processor 475 is used to transmit a second data unit set in the present application.

In one embodiment, at least one of the antenna 452, the receiver 454, the multi-antenna receiving processor 458, the receiving processor 456 or the controller/processor 459 is used to receive a second data unit set in the present application.

In one embodiment, at least one of the antenna 452, the transmitter 454, the multi-antenna transmitting processor 457, the transmitting processor 468 or the controller/processor 459 is used to transmit first information in the present application.

In one embodiment, at least one of the antenna 420, the receiver 418, the multi-antenna receiving processor 472, the receiving processor 470 or the controller/processor 475 is used to receive first information in the present application.

In one embodiment, at least one of the antenna 420, the transmitter 418, the multi-antenna transmitting processor 471, the transmitting processor 416 or the controller/processor 475 is used to transmit a third data unit set in the present application.

In one embodiment, at least one of the antenna 452, the receiver 454, the multi-antenna receiving processor 458, the receiving processor 456 or the controller/processor 459 is used to receive a third data unit set in the present application.

In one embodiment, at least one of the antenna 420, the transmitter 418, the multi-antenna transmitting processor 471, the transmitting processor 416 or the controller/processor 475 is used to transmit second information in the present application.

In one embodiment, at least one of the antenna 452, the receiver 454, the multi-antenna receiving processor 458, the receiving processor 456 or the controller/processor 459 is used to receive second information in the present application.

In one embodiment, at least one of the antenna 420, the transmitter 418, the multi-antenna transmitting processor 471, the transmitting processor 416 or the controller/processor 475 is used to transmit third information in the present application.

In one embodiment, at least one of the antenna 452, the receiver 454, the multi-antenna receiving processor 458, the receiving processor 456 or the controller/processor 459 is used to receive third message in the present application.

In one embodiment, at least one of the antenna 420, the transmitter 418, the multi-antenna transmitting processor 471, the transmitting processor 416 or the controller/processor 475 is used to transmit a first data unit set in the present application.

In one embodiment, at least one of the antenna 452, the receiver 454, the multi-antenna receiving processor 458, the receiving processor 456 or the controller/processor 459 is used to receive a first data unit set in the present application.

In one embodiment, at least one of the antenna 452, the transmitter 454, the multi-antenna transmitting processor 457, the transmitting processor 468 or the controller/processor 459 is used to transmit a second data unit set in the present application.

In one embodiment, at least one of the antenna 420, the receiver 418, the multi-antenna receiving processor 472, the receiving processor 470 or the controller/processor 475 is used to receive a second data unit set in the present application.

In one embodiment, at least one of the antenna 420, the transmitter 418, the multi-antenna transmitting processor 471, the transmitting processor 416 or the controller/processor 475 is used to transmit a third data unit set in the present application.

In one embodiment, at least one of the antenna 452, the receiver 454, the multi-antenna receiving processor 458, the receiving processor 456 or the controller/processor 459 is used to receive a third data unit set in the present application.

In one embodiment, at least one of the antenna 452, the transmitter 454, the multi-antenna transmitting processor 457, the transmitting processor 468 or the controller/processor 459 is used to transmit a first message in the present application.

In one embodiment, at least one of the antenna 420, the receiver 418, the multi-antenna receiving processor 472, the receiving processor 470 or the controller/processor 475 is used to receive a first message in the present application.

In one embodiment, at least one of the antenna 420, the transmitter 418, the multi-antenna transmitting processor 471, the transmitting processor 416 or the controller/processor 475 is used to transmit a second message in the present application.

In one embodiment, at least one of the antenna 452, the receiver 454, the multi-antenna receiving processor 458, the receiving processor 456 or the controller/processor 459 is used to receive second message in the present application.

In one embodiment, at least one of the antenna 452, the receiver 454, the multi-antenna receiving processor 458, the receiving processor 456 or the controller/processor 459 is used to determine a first connection failure.

Embodiment 5A

Figure 5A:
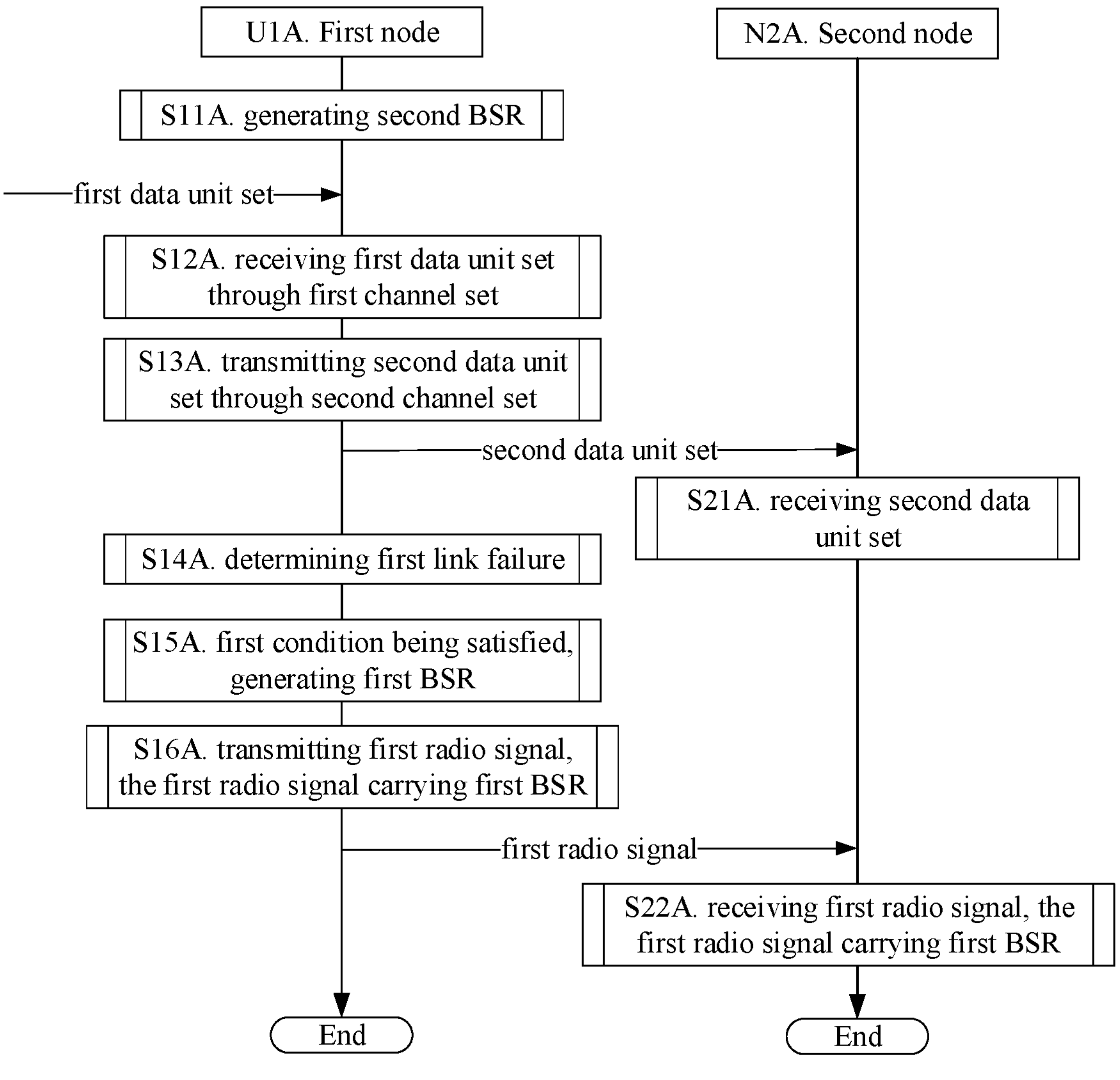
FIG. 5A illustrates a flowchart of radio signal transmission according to one embodiment of the present application.

Embodiment 5A illustrates a flowchart of radio signal transmission according to one embodiment in the present application, as shown in FIG. 5. In FIG. 5A, a first node UTA and a second node N2A are in communications via a radio interface. It is particularly underlined that the order illustrated in the embodiment does not put constraints over sequences of signal transmissions and implementations.

The first node U1A generates a second BSR in step S11A; receives a first data unit set through a first channel set in step S12A; transmits a second data unit set through a second channel set in step S13A; determines a first link failure in step S14A; judges that a first condition is satisfied in step S15A, and generates a first BSR; transmits a first radio signal in step S16A, and the first radio signal carries a first BSR. In particular, the step S12A can also be executed before the step S11A; and the step S13A can also be executed after step S14A.

The second node N2A receives a second data unit set through a second channel set in step S21A; receives a first radio signal in step S22A, and the first radio signal carries a first BSR.

In one embodiment, generating the second BSR comprises reporting a BSR, or, triggering a BSR.

In one embodiment, generating the second BSR comprises generating a second BSR MAC CE and reporting the second BSR MAC CE, or triggering a BSR to generate the second buffer size.

In one embodiment, a transmitter of the first data unit set comprises at least one node other than the first node.

In one embodiment, the first data unit set comprises at least one data unit.

In one embodiment, each data unit in the first data unit set comprises an Internet Protocol (IP) Service Data Unit (SDU).

In one embodiment, each data unit in the first data unit set comprises an Address Resolution Protocol (ARP) SDU.

In one embodiment, each data unit in the first data unit set comprises a Non-IP SDU.

In one embodiment, each data unit in the first data unit set comprises a Packet Data Convergence Protocol (PDCP) SDU.

In one embodiment, each data unit in the first data unit set comprises a PDCP PDU.

In one embodiment, each data unit in the first data unit set comprises an RLC SDU.

In one embodiment, the first channel set comprises at least one channel.

In one embodiment, each channel in the first channel set corresponds to a logical channel.

In one embodiment, each channel in the first channel set corresponds to an RLC channel.

In one embodiment, each channel in the first channel set corresponds to an RLC entity.

In one embodiment, each channel in the first channel set corresponds to an Ingress RLC channel.

In one embodiment, the first data unit set comprises at least two data units; the at least two data units are respectively received through at least two channels in the first channel set; transmitters of the at least two data units are a same node other than the first node.

In one embodiment, the first data unit set comprises at least two data units; the at least two data units are respectively received through at least two channels in the first channel set; transmitters of the at least two data units are non-co-located; transmitters of the at least two data units are respectively a node other than the first node.

In one embodiment, a receiver of the second data unit set is the second node.

In one embodiment, a receiver of the second data unit set comprises a node other than the second node.

In one embodiment, the second data unit set comprises at least one data unit.

In one embodiment, each data unit in the second data unit set comprises an IP SDU.

In one embodiment, each data unit in the second data unit set comprises an ARP SDU.

In one embodiment, each data unit in the second data unit set comprises a Non-IP SDU.

In one embodiment, each data unit in the second data unit set comprises a PDCP SDU.

In one embodiment, each data unit in the second data unit set comprises a PDCP PDU.

In one embodiment, each data unit in the second data unit set comprises an RLC SDU.

In one embodiment, the second channel set comprises the first logical channel set.

In one embodiment, the second channel set comprises at least one channel.

In one embodiment, each channel in the second channel set corresponds to a logical channel.

In one embodiment, each channel in the second channel set corresponds to an RLC channel.

In one embodiment, each channel in the second channel set corresponds to an RLC entity.

In one embodiment, each channel in the second channel set corresponds to an Egress RLC channel.

In one embodiment, the second data unit set comprises at least two data units; the at least two data units are respectively transmitted through at least two channels in the second channel set; a receiver of the at least two data units is the second node.

In one embodiment, the second data unit set comprises at least two data units; the at least two data units are respectively transmitted through at least two channels in the second channel set; a receiver of the at least two data units are non-co-located; receivers of the at least two data units are respectively a node other than the first node.

In one embodiment, any bit in the second data unit set belongs to the first data unit set.

In one embodiment, each data unit comprised in the second data unit set belongs to the first data unit set.

In one embodiment, any data unit in the second data unit set is transmitted through a logical channel in the first logical channel set.

In one embodiment, the first reference data volume and the second reference data volume are used together to determine the buffer size for the first logical channel set.

In one embodiment, the first reference data volume is related to a number of byte(s) comprised in the first data unit set.

In one embodiment, the second reference data volume is related to a number of byte(s) comprised in the second data unit set.

In one embodiment, the first reference data volume is not less than the second reference data volume.

In one embodiment, the second reference data volume is linearly related to a fourth offset value, and the fourth offset value is the buffer size corresponding to the second data unit set.

In one embodiment, a linear correlated coefficient from the second reference data volume to the fourth offset value is greater than 0.

In one embodiment, a linear correlated coefficient from the second reference data volume to the fourth offset value is configurable.

In one embodiment, a linear correlated coefficient from the second reference data volume to the fourth offset value is 1.

In one embodiment, the fourth offset value is data volume of the second data unit set after establishing a MAC PDU.

In one embodiment, the fourth offset value does not comprise an RLC header and a MAC sub-header.

In one embodiment, for the calculation of the data volume, refer to TS38.322 and TS38.323 of 3GPP specification; the data volume is represented by byte.

In one embodiment, the first reference data volume is linearly correlated with a fifth offset value, and the fifth offset value is the buffer size corresponding to the first data unit set.

In one embodiment, a linear correlated coefficient from the first reference data volume to the fifth offset value is greater than 0.

In one embodiment, a linear correlated coefficient from the first reference data volume to the fifth offset value is configurable.

In one embodiment, a linear correlated coefficient from the first reference data volume to the fifth offset value is 1.

In one embodiment, the fifth offset value is data volume of the first data unit set after establishing a MAC PDU.

In one embodiment, the fifth offset value does not comprise an RLC header and a MAC sub-header.

In one embodiment, for the calculation of the data volume, refer to TS38.322 and TS38.323 of 3GPP specification; the data volume is represented by byte.

In one embodiment, the buffer size for the first logical channel set is a difference value of the first reference data volume minus the second reference data volume.

In one embodiment, the first reference data volume not being less than a buffer size for the second logical channel set in the first data unit set.

In one embodiment, any channel in the first channel set is mapped into a logical channel in the second logical channel set.

In one embodiment, a buffer size for the second logical channel set is data volume of available data comprised in an RLC entity corresponding to the second logical channel set; the available data belongs to the first data unit set; for the calculation of the data volume, refer to TS38.322 and TS38.323 of 3GPP specification.

In one embodiment, available data comprised in an RLC entity corresponding to the second logical channel set comprises an RLC SDU.

In one embodiment, available data comprised in an RLC entity corresponding to the second logical channel set comprises an RLC data PDU.

In one embodiment, available data comprised in an RLC entity corresponding to the second logical channel set does not comprise an RLC control PDU.

In one embodiment, the first reference data volume does not comprise an RLC header of the RLC data PDU comprised in an RLC entity corresponding to the second logical channel set.

In one embodiment, a buffer size for the second logical channel set is represented by byte.

In one embodiment, any logical channel in the second logical channel set is mapped into a logical channel in the first logical channel set.

In one embodiment, M logical channels in the second logical channel set are mapped into N logical channels in the first logical channel set; M and N are respectively positive integers not greater than 512.

In one embodiment, at least one logical channel comprised in the second logical channel set is mapped into a logical channel in the first logical channel set.

In one embodiment, a logical channel comprised in the second logical channel set is mapped into at least one logical channel in the first logical channel set.

In one embodiment, the first reference data volume is related to a number of byte(s) comprised in a third data unit set.

In one embodiment, any data unit in the third data unit set belongs to the first data unit set.

In one embodiment, the third data unit set comprises a non-negative integer number of data unit(s).

In one embodiment, each data unit in the third data unit set comprises an IP SDU.

In one embodiment, each data unit in the third data unit set comprises an ARP SDU.

In one embodiment, each data unit in the third data unit set comprises a Non-IP SDU.

In one embodiment, each data unit in the third data unit set comprises a PDCP SDU.

In one embodiment, each data unit in the third data unit set comprises a PDCP PDU.

In one embodiment, each data unit in the third data unit set comprises an RLC SDU.

In one embodiment, the first buffer set comprises the third data unit set.

In one embodiment, the first buffer set comprises at least one buffer.

In one embodiment, the first buffer set is located at a SideLink Adaptation Protocol (SLAP) sublayer.

In one embodiment, a buffer size corresponding to the third data unit set is data volume of the third data unit set after establishing an SLAP PDU.

In one embodiment, the SLAP PDU comprises an SLAP SDU plus an SLAP header of the SLAP SDU.

In one embodiment, the SLAP SDU is an RLC SDU.

In one embodiment, the SLAP SDU is a PDCP PDU.

In one embodiment, a third buffer size is linearly related to a second offset value, and the second offset value is the buffer size for the third data unit set.

In one embodiment, a linear correlated coefficient from the third buffer size to the second offset value is greater than 0.

In one embodiment, a linear correlated coefficient from the third buffer size to the second offset value is configurable.

In one embodiment, a linear correlated coefficient from the third buffer size to the second offset value is 1.

In one embodiment, the third buffer size is represented by byte.

In one embodiment, the first reference data volume is not less than the third buffer size.

In one embodiment, the first reference data volume is not less than data volume of available data comprised in an RLC entity corresponding to the first logical channel set.

In one embodiment, available data comprised in an RLC entity corresponding to the first logical channel set comprises an RLC data PDU.

In one embodiment, available data comprised in an RLC entity corresponding to the first logical channel set comprises an RLC SDU.

In one embodiment, available data comprised in an RLC entity corresponding to the first logical channel set comprises an RLC control PDU.

In one embodiment, the first reference data volume does not comprise RLC headers of the RLC data PDU and an RLC Control PDU comprised in an RLC entity corresponding to the first logical channel set.

In one embodiment, the first reference data volume is a sum of data volume of available data comprised in an RLC entity corresponding to the second logical channel set, the third buffer size, data volume of available data comprised in an RLC entity corresponding to the first logical channel set and the buffer size corresponding to the second data unit set.

In one embodiment, any data unit in the third data unit set is mapped into a logical channel in the first logical channel set.

In one embodiment, any data unit in the third data unit set is transmitted through a channel in the second channel set.

In one embodiment, the first reference buffer size is linearly correlated to a first offset value, and the first offset value is the buffer size corresponding to the fourth data unit set.

In one embodiment, the fourth data unit set comprises a part being transmitted after triggering the second BSR in the second data unit set.

In one embodiment, a linear correlated coefficient from the first reference buffer size to the first offset value is greater than 0.

In one embodiment, a linear correlated coefficient from the first reference buffer size to the first offset value is configurable.

In one embodiment, a linear correlated coefficient from the first reference buffer size to the first offset value is 1.

In one embodiment, the first offset value is data volume of the fourth data unit set after establishing a MAC PDU.

In one embodiment, the first offset value does not comprise an RLC header and a MAC sub-header.

In one embodiment, for the calculation of the data volume, refer to TS38.322 and TS38.323 of 3GPP specification.

In one embodiment, the first reference buffer size is equal to a sum of a maximum value of a buffer value indicated by the second BSR plus the first offset value.

In one embodiment, the first reference buffer size is equal to a sum of a minimum value of a buffer value indicated by the second BSR plus the first offset value.

In one embodiment, the first reference buffer size is equal to a sum of an average value of a maximum value of a buffer value indicated by the second BSR and a minimum value of a buffer value indicated by the second BSR plus the first offset value.

In one embodiment, at least one channel in the first channel set is transmitted through the first link at air interface.

In one embodiment, at least one channel in the second channel set is transmitted through the first link at air interface.

In one embodiment, the first link belongs to a PC5 interface.

In one embodiment, the behavior of determining a first link failure comprises: determining the first link failure according to channel measurement.

In one embodiment, the behavior of determining a first link failure comprises: determining the first link failure according to an expiration of a maintained timer T400.

In one embodiment, the behavior of determining a first link failure comprises: determining the first link failure according to RLC reaching a maximum number of retransmissions.

In one embodiment, the behavior of determining a first link failure comprises: determining the first link failure according to a Listen Before Talk (LBT) monitoring failure.

In one embodiment, the behavior of determining a first link failure comprises: determining a Beam Link Failure (BLF) according to a measurement performed on a reference signal resource set.

In one embodiment, the behavior of determining a first link failure comprises: determining the first link failure according to a Beam Failure Recovery Failure.

In one embodiment, the behavior of determining a first link failure comprises: determining the first link failure according to integrity check failure indicated by PDCP entities of Sidelink-Signaling Radio Bearer 2 (SL-SRB2) and SL-SRB3 in sidelink.

In one embodiment, the behavior of determining a first link failure comprises: determining the first link failure according to continuous HARQ DTXs to a specific target node reaching a maximum value indicated by a MAC entity.

In one embodiment, as a response to the behavior of determining the first link failure, clear the fifth data unit set.

In one embodiment, the fifth data unit set is received through a third channel set; the third channel set is transmitted through the first link at air interface; the third channel set comprises at least one channel; any channel in the third channel set belongs to the first channel set.

In one embodiment, the third channel set is mapped to a fourth channel set; the fourth channel set comprises at least one channel; any channel in the fourth channel set belongs to the second channel set; any channel in the fourth channel set corresponds to a logical channel in the first logical channel set.

In one embodiment, any data unit in the fifth data unit set is mapped into a logical channel in the first logical channel set.

In one embodiment, the third channel set corresponds to a third logical channel set; the fourth channel set corresponds to a fourth logical channel set.

In one embodiment, the third channel set is used to transmit a radio signaling.

In one embodiment, the fourth channel set is used to transmit a radio signaling.

In one embodiment, the third channel set is used to transmit data transmitted through S0 SRB.

In one embodiment, the third channel set is used to transmit data transmitted through S3 SRB.

In one embodiment, the third channel set is used to transmit data transmitted through S1 SRB.

In one embodiment, the third channel set is used to transmit data transmitted through S2 SRB.

In one embodiment, the third channel set is used to transmit radio data.

In one embodiment, the third channel set is used to transmit data transmitted through DRB.

In one embodiment, the fifth data unit set comprises at least one data unit.

In one embodiment, any bit in the fifth data unit set belongs to the first data unit set and does not belong to the second data unit set.

In one embodiment, each data unit comprised in the fifth data unit set belongs to the first data unit set and does not belong to the second data unit set.

In one embodiment, the fifth data unit set is buffered in the RLC entity corresponding to the fourth logical channel set.

In one embodiment, the fifth data unit set is buffered in a second buffer set; any buffer in the second buffer set belongs to the first buffer set.

In one embodiment, the fifth data unit set is buffered in the RLC entity corresponding to the third logical channel set.

In one embodiment, a first part of data unit(s) in the fifth data unit set is buffered in the RLC entity corresponding to the fourth logical channel set; a second part in the fifth data unit set is buffered in the second buffer set; the first part of data unit(s) in the fifth data unit set and the second part of data unit(s) in the fifth data unit set respectively comprise at least one data unit; the first part of data unit(s) in the fifth data unit set and the second part of data unit(s) in the fifth data unit set consist the fifth data unit set.

In one embodiment, a first part of data unit(s) in the fifth data unit set is buffered in the RLC entity corresponding to the fourth logical channel set; a second part in the fifth data unit set is buffered in the RLC entity corresponding to the third logical channel set; the first part of data unit(s) in the fifth data unit set and the second part of data unit(s) in the fifth data unit set respectively comprise at least one data unit; the first part of data unit(s) in the fifth data unit set and the second part of data unit(s) in the fifth data unit set consist the fifth data unit set.

In one embodiment, a first part of data unit(s) in the fifth data unit set is buffered in the second buffer set; a second part in the fifth data unit set is buffered in the RLC entity corresponding to the third logical channel set; the first part of data unit(s) in the fifth data unit set and the second part of data unit(s) in the fifth data unit set respectively comprise at least one data unit; the first part of data unit(s) in the fifth data unit set and the second part of data unit(s) in the fifth data unit set consist the fifth data unit set.

In one embodiment, a first part of data unit(s) in the fifth data unit set is buffered in the RLC entity corresponding to the fourth logical channel set; a second part of data unit(s) in the fifth data unit set is buffered in the second buffer set; a third part in the fifth data unit set is buffered in the RLC entity corresponding to the third logical channel set; the first part of data unit(s) in the fifth data unit set, the second part of data unit(s) in the fifth data unit set and the third part of data unit(s) in the fifth data unit set respectively comprise at least one data unit; the first part of data unit(s) in the fifth data unit set, the second part of data unit(s) in the fifth data unit set and the third part of data unit(s) in the fifth data unit set consist the fifth data unit set.

In one embodiment, the first reference buffer size is linearly correlated to a third offset value, and the third offset value is a buffer size corresponding to the fifth data unit set.

In one embodiment, a buffer size corresponding to the fifth data unit set is a sum of data volume of available data comprised in an RLC entity corresponding to the third logical channel set, data volume of available data comprised in the second buffer set and data volume of available data comprised in an RLC entity corresponding to the fourth logical channel set.

In one embodiment, a linear correlated coefficient from the first reference buffer size to the third offset value is not less than 0.

In one embodiment, a linear correlated coefficient from the first reference buffer size to the first offset value is configurable.

In one embodiment, a linear correlated coefficient from the first reference buffer size to the third offset value is −1.

In one embodiment, the first reference buffer size is equal to a difference value of a maximum buffer value indicated by the second BSR minus the third offset value.

In one embodiment, the first reference buffer size is equal to a difference value of a minimum buffer value indicated by the second BSR minus the third offset value.

In one embodiment, the first reference buffer size is equal to a result acquired after a maximum buffer value indicated by the second BSR plus the first offset value and minus the third offset value.

In one embodiment, the first reference buffer size is equal to a result acquired after a minimum buffer value indicated by the second BSR plus the first offset value and minus the third offset value.

In one embodiment, the first reference buffer size is equal to an average value of a maximum buffer value indicated by the second BSR and a minimum buffer value indicated by the second BSR minus the third offset value.

In one embodiment, the first reference buffer size is equal to a result of an average value of a maximum buffer value indicated by the second BSR and a minimum buffer value indicated by the second BSR plus the first offset value and minus the third offset value.

Embodiment 5B

Figure 5B:
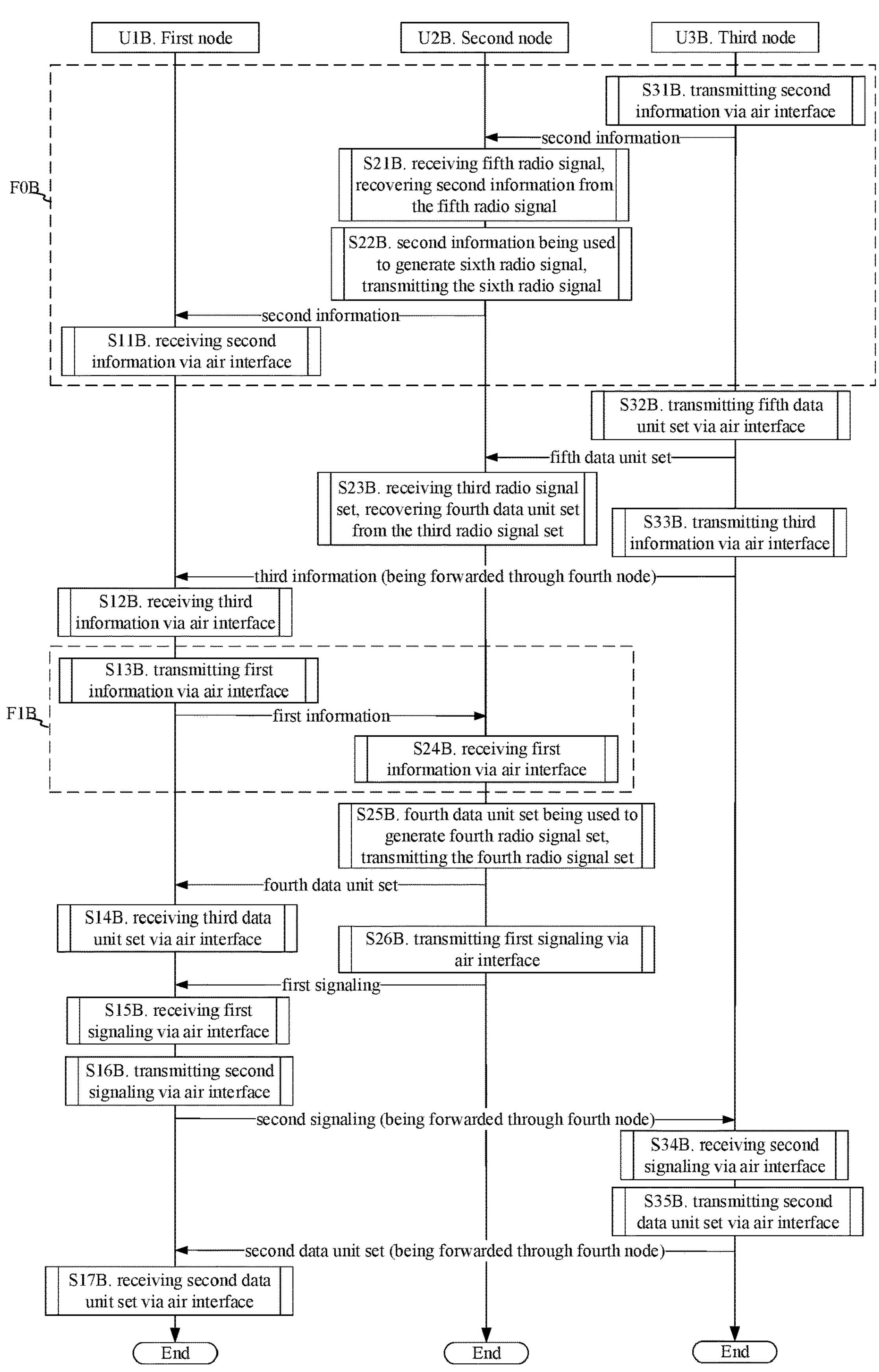
FIG. 5B illustrates a flowchart of radio signal transmission according to one embodiment of the present application.

Embodiment 5B illustrates a flowchart of radio signal transmission according to one embodiment in the present application, as shown in FIG. 5. In FIG. 5B, a first node U1B and a second node U2B are in communications via sidelink, and a second node U2B and a third node U3B are in communications via sidelink. It is particularly underlined that the order illustrated in the embodiment does not put constraints over sequences of signal transmissions and implementations. As shown in the figure, steps in dotted boxes F0B and F1B are optional.

The first node U1B receives second information via an air interface in step S11B; receives third information via an air interface in step S12B; transmits first information via an air interface in step S13B; receives a third data unit set via an air interface in step S14B; receives a first signaling via an air interface in step S15B; transmits a second signaling via an air interface in step S16B; receives a second data unit set via an air interface in step S17B.

The second node U2B receives a fifth radio signal in step S21B, and recovers second information from the fifth radio signal; transmits second information to generate a sixth radio signal in step S22B, and transmits the sixth radio signal; receives a third radio signal set in step S23B, and recovers a fourth data unit set from the third radio signal set; receives first information via an air interface in step S24B; a fourth data unit set is used to generate a fourth radio signal set in step S25B, and transmits a fourth radio signal; transmits a first signaling via an air interface in step S26B.

The third node U3B transmits second information via an air interface in step S31B; transmits a fifth data unit set via an air interface in step S32B; transmits third information via an air interface in step S33B; receives a second signaling via an air interface in step S34B; transmits a second data unit set via an air interface in step S35B.

It should be noted that although the fourth node is not shown in FIG. 5B, the third information, the second signaling and the second data unit set are respectively forwarded through the fourth node.

In one embodiment, the third node transmits a fifth radio signal, and the fifth radio signal comprises the second information; the second node receives the fifth radio signal, the second information is recovered from the fifth radio signal, and the second information is used to generate the sixth radio signal for a transmission; the first node receives the sixth radio signal, and the second information is recovered from the sixth radio signal.

In one embodiment, the second information comprises RRC information.

In one embodiment, the second information comprises PC5-RRC information.

In one embodiment, the second information comprises all or partial IEs in RRC information.

In one embodiment, the second information comprises all or partial fields in an IE in RRC information.

In one embodiment, the second information comprises RRCReconfigurationSidelink.

In one embodiment, the second information comprises SL-ConfigDedicatedNR.

In one embodiment, the second information comprises PC5-S information.

In one embodiment, as a response to receiving the second information, the first node transmits fourth information via an air interface, and the fourth information comprises RRCReconfigurationCompleteSidelink; the third node receives the fourth information via an air interface.

In one embodiment, RRC information comprised in the second information comprises a first identity list and a first configuration.

In one embodiment, the first identity list is a RelayList field in RRC information comprised in the second information.

In one embodiment, the first identity list is an SL-RelayList field in RRC information comprised in the second information.

In one embodiment, the first identity list comprises Q identity(identities), Q being not greater than 64.

In one embodiment, a number of bit(s) comprised in any of the Q identity(identities) is a positive integral number of 8.

In one embodiment, a number of bit(s) comprised in any of the Q identity(identities) is 8.

In one embodiment, a number of bit(s) comprised in any of the Q identity(identities) is 24.

In one embodiment, any of the Q identity(identities) is a link-layer identity.

In one embodiment, any of the Q identity(identities) is a layer-2 identity.

In one embodiment, the Q identity(identities) indicates (respectively indicate) Q relay node(s).

In one embodiment, any of the Q identity(identities) indicates a node.

In one embodiment, a receiver of the fifth radio signal comprises a node identified by one of the Q identity(identities); the fifth radio signal comprises partial bits of the identity; scheduling information of the fifth radio signal comprises remaining partial bits of the identity.

In one embodiment, the scheduling information of the fifth radio signal is comprised in a physical-layer signaling.

In one embodiment, the scheduling information of the fifth radio signal comprises SCI.

In one embodiment, the first configuration is a field in the second information.

In one embodiment, the first configuration is an SLRB-Config field in the second information.

In one embodiment, the first configuration is an slrb-ConfigToAddModList field in the second information.

In one embodiment, the first parameter set comprises at least one of Service Data Adaptation Protocol (SDAP) configuration parameters, Packet Data Convergence Protocol (PDCP) configuration parameters, Radio Link Control (RLC) configuration parameters or Medium Access Control (MAC) configuration parameters.

In one embodiment, the first parameter set is used to configure the first radio bearer.

In one embodiment, the first parameter set comprises an LCID corresponding to the first radio bearer.

In one embodiment, the first parameter set comprises a first radio bearer ID, and the first radio bearer ID indicates the first radio bearer.

In one embodiment, the first bearer identity indicates a Peer-to-Peer radio bearer.

In one embodiment, the first radio bearer is bi-directional.

In one embodiment, the LCID corresponding to the first radio bearer is used to determine processing a higher-layer entity of a data unit belonging to the first radio bearer.

In one embodiment, the LCID corresponding to the first radio bearer is used to determine processing an RLC entity of a data unit belonging to the first radio bearer.

In one embodiment, the first parameter set is used to configure a higher-layer entity corresponding to the first radio bearer.

In one embodiment, the higher-layer entity corresponding to the first radio bearer comprises at least one of an SDAP entity, a PDCP entity, an RLC entity or a MAC entity.

In one embodiment, the first data unit set and the second data unit set are processed at the higher layer corresponding to the first radio bearer.

In one embodiment, the third node transmits a third radio signal set, and the third radio signal set comprises the fifth data unit set; the second node receives the third radio signal set, a fourth data unit set is recovered from the third radio signal set, and the fourth data unit set is used to generate the fourth radio signal set for a transmission.

In one embodiment, the fourth data unit set at least comprises a data unit.

In one embodiment, the fifth data unit set comprises the fourth data unit set.

In one embodiment, a transmitter of the fourth radio signal set is identified by one of the Q identities.

In one embodiment, a transmitter of the fourth radio signal set is co-located with a transmitter of the sixth radio signal.

In one embodiment, the transmitter of the fourth radio signal set is non-co-located with a receiver of the first radio signal.

In one embodiment, the third node transmits the third information via an air interface; the third information is forwarded by the fourth node at an air interface and then is received by the first node.

In one embodiment, the fourth node and the transmitter of the first signaling are non-co-located.

In one embodiment, the third information comprises RRC information.

In one embodiment, the third information comprises PC5-RRC information.

In one embodiment, the third information comprises all or partial IEs in RRC information.

In one embodiment, the third information comprises all or partial fields in an IE in RRC information.

In one embodiment, the third information comprises an RRCReconfigurationSidelink.

In one embodiment, the third information comprises PC5-Signaling (PC5-S) information.

In one embodiment, as a response to receiving the third information, the first node transmits fifth information, and the fifth information comprises RRCReconfiguration-CompleteSidelink.

In one embodiment, RRC information comprised in the third information comprises a RelayList field; the RelayList comprises at least one identity; the RelayList does not comprise the first identity;

In one subembodiment of the above embodiment, the second identity list comprises an identity comprised in the RelayList.

In one embodiment, RRC information comprised in the third information comprises a FailRelayList field; the Fail-RelayList at least comprises the first identity.

In one subembodiment of the above embodiment, the second identity list comprises an identity other than identities comprised in the FailRelayList in the first identity list.

In one embodiment, the second identity list comprises a positive integer number of identity(identities) not greater than 64.

In one embodiment, as a response to receiving the third information, the first node updates the first identity list as identities comprised in the second identity list and the first identity.

In one embodiment, the third information indicates the first radio link failure; one of two nodes connecting the first radio link is identified by the first identity.

In one embodiment, the third information does not trigger a generation of the second signaling.

In one embodiment, an identity in the second identity list is used to identify the receiver of the first radio signal.

In one embodiment, the first node transmits first information, and the first information indicates the first link failure.

In one embodiment, a receiver of the first information comprises a node identified by the first identity.

In one embodiment, the first information comprises RRC information.

In one embodiment, the first information comprises PC5-RRC information.

In one embodiment, the first information comprises all or partial IEs in RRC information.

In one embodiment, the first information comprises all or partial fields in an IE in RRC information.

In one embodiment, the first information comprises an RRCReconfigurationSidelink.

In one embodiment, the first information comprises a slrb-ConfigToReleaseList field in PC5-RRC information.

In one embodiment, as a response to receiving the first information, a node identified by the first identity transmits sixth information, and the sixth information comprises RRCReconfigurationCompleteSidelink.

In one embodiment, the first node receives the fourth radio signal set, and a third data unit set is recovered from the fourth radio signal set.

In one embodiment, the third data unit set comprises 0 data unit.

In one embodiment, the third data unit set comprises at least one data unit, and any data unit in the third data unit set belongs to the fourth data unit set.

In one embodiment, the third data unit set is different from the fifth data unit set.

In one embodiment, a number of data unit(s) in the third data unit set is less than a number of data unit(s) in the fifth data unit set.

In one embodiment, the fifth data unit set comprises at least one data unit; at least one data unit in the fifth data unit set does not belong to the third data unit set.

In one embodiment, the fourth radio signal set comprises at least two radio signals, and any two radio signals in the fourth radio signal set comprise different MAC SDUs.

In one embodiment, the fourth radio signal set comprises at least two radio signals, and at least two radio signals in the fourth radio signal set comprise a same MAC SDU.

In one embodiment, the first data unit set comprises a data unit set other than the third data unit set in the fifth data unit set.

In one embodiment, any data unit in the third data unit set does not belong to the first data unit set.

In one embodiment, the first data unit set comprises a data unit not successfully received by an RLC sub-layer of the first node in a first window.

In one embodiment, the first data unit set comprises a data unit not successfully received by a PDCP sub-layer of the first node in a first window.

In one embodiment, a data unit set buffered in the first window comprises the third data unit; a data unit whose sequence number is not carried by any data unit in the data unit set buffered in the first window consists of the first data unit set.

In one embodiment, 5 data units are buffered in the first window, and the carried sequence numbers are respectively 3, 5, 6, 7 and 9; the first data unit set comprises data units with sequence numbers of 4 and 8 respectively.

In one embodiment, the sequence number identifies a PDCP SDU at PDCP sublayer.

In one embodiment, the sequence number identifies an RLC SDU at RLC sublayer.

In one embodiment, a PDCP entity of the first node determines the first data unit set according to the method described in section 5.2 and section 5.4 in protocol 38.323 of 3GPP standard.

In one embodiment, the PDCP entity of the first node determines the first data unit set according to the method described in section 5.1 and section 5.3 in protocol 36.323 of 3GPP standard.

In one embodiment, an RLC entity of the first node determines the first data unit set according to the method described in section 5.2.3.2 and section 5.3.4 in protocol 38.322 of 3GPP standard.

In one embodiment, an RLC entity of the first node determines the first data unit set according to the method described in section 5.1.3.2 and section 5.2.3 in protocol 36.322 of 3GPP standard.

In one embodiment, the first window size is configured by network.

In one embodiment, the first window size indicates a size of a reordering window.

In one embodiment, the first window size indicates a size of a receiving window.

In one embodiment, the first signaling and a data unit with a largest sequence number in the fourth data unit set are multiplexed to a MAC PDU for a transmission; the third data unit set comprises the data unit with the largest sequence number in the fourth data unit set.

In one embodiment, the first signaling is transmitted after the data unit with the largest sequence number in the fourth data unit set is transmitted.

In one subembodiment of the above embodiment, the phrase of completing a transmission comprises: a data unit is successfully received.

In one subembodiment of the above embodiment, the phrase of completing a transmission comprises: a data unit reaches a number of maximum retransmissions.

In one embodiment, a time for receiving the first signaling is later than a time for receiving any data unit in the third data unit set.

In one embodiment, the second node transmits the first signaling; as a response to transmitting the first signaling, the second node releases storage space of the fourth data unit set.

In one embodiment, the first signaling is received via an air interface; as a response to receiving the first signaling, the first clears the first identity from the first identity list.

In one embodiment, a physical-layer signaling is monitored through sidelink, the physical-layer signaling comprises a physical-layer signaling corresponding to each identity in the first identity list.

In one embodiment, the physical-layer signaling indicates time-frequency resources occupied by a scheduled physical-layer channel and an MCS adopted by a radio signal transmitted on the physical-layer channel.

In one embodiment, the above phrase of monitoring a physical-layer signaling through sidelink comprises: executing an energy detection for the physical-layer signaling through sidelink.

In one embodiment, the above phrase of monitoring a physical-layer signaling through sidelink comprises: executing a blind decoding for the physical-layer signaling through sidelink.

In one embodiment, the above phrase of monitoring a physical-layer signaling through sidelink comprises: executing a blind decoding for the physical-layer signaling and executing an energy detection for the physical-layer signaling through sidelink.

In one embodiment, the above phrase of monitoring a physical-layer signaling through sidelink comprises: executing a blind decoding for the physical-layer signaling and executing an energy detection for a reference signal comprised in the physical-layer signaling through sidelink.

In one embodiment, the above phrase of monitoring a physical-layer signaling through sidelink comprises: executing a blind decoding for the physical-layer signaling through sidelink, and executing an energy detection for a reference signal comprised in the physical-layer channel and executing a decoding for the physical-layer channel.

In one embodiment, the above phrase of monitoring a physical-layer signaling through sidelink comprises: executing a Cyclic Redundancy Check (CRC) for the physical-layer signaling through sidelink.

In one embodiment, when the physical-layer signaling is successfully decoded, the physical-layer signaling is detected.

In one embodiment, when the physical-layer signaling pass a CRC, the physical-layer signaling is detected.

In one embodiment, when a detected physical-layer signaling comprises partial bits in any identity in the first identity list, channel decoding is performed on a physical-layer channel scheduled for the detected physical-layer signaling.

In one embodiment, when a detected physical-layer signaling does not comprise partial bits in any identity in the first identity list, channel decoding is dropped to be performed on a physical-layer channel scheduled for the detected physical-layer signaling.

In one subembodiment of the above two embodiments, the partial bits comprise lower 8 bits of any identity.

In one embodiment, the behavior of dropping performing channel decoding for a physical-layer channel scheduled for the detected physical-layer signaling comprises: dropping the detected physical-layer signaling.

In one embodiment, the behavior of dropping performing channel decoding for a physical-layer channel scheduled for the detected physical-layer signaling comprises: monitoring Reference Signal Received Power (RSRP) of the physical-layer channel.

In one embodiment, the behavior of dropping performing channel decoding for a physical-layer channel scheduled for the detected physical-layer signaling comprises: executing the operation of sensing for the physical-layer channel for a transmission resource selection of subsequent data unit transmission.

In one embodiment, the first identity identifies the transmitter of the first signaling.

In one embodiment, the partial bits comprise 8 bits.

In one embodiment, the partial bits comprise 16 bits.

Embodiment 5C

Figure 5C:
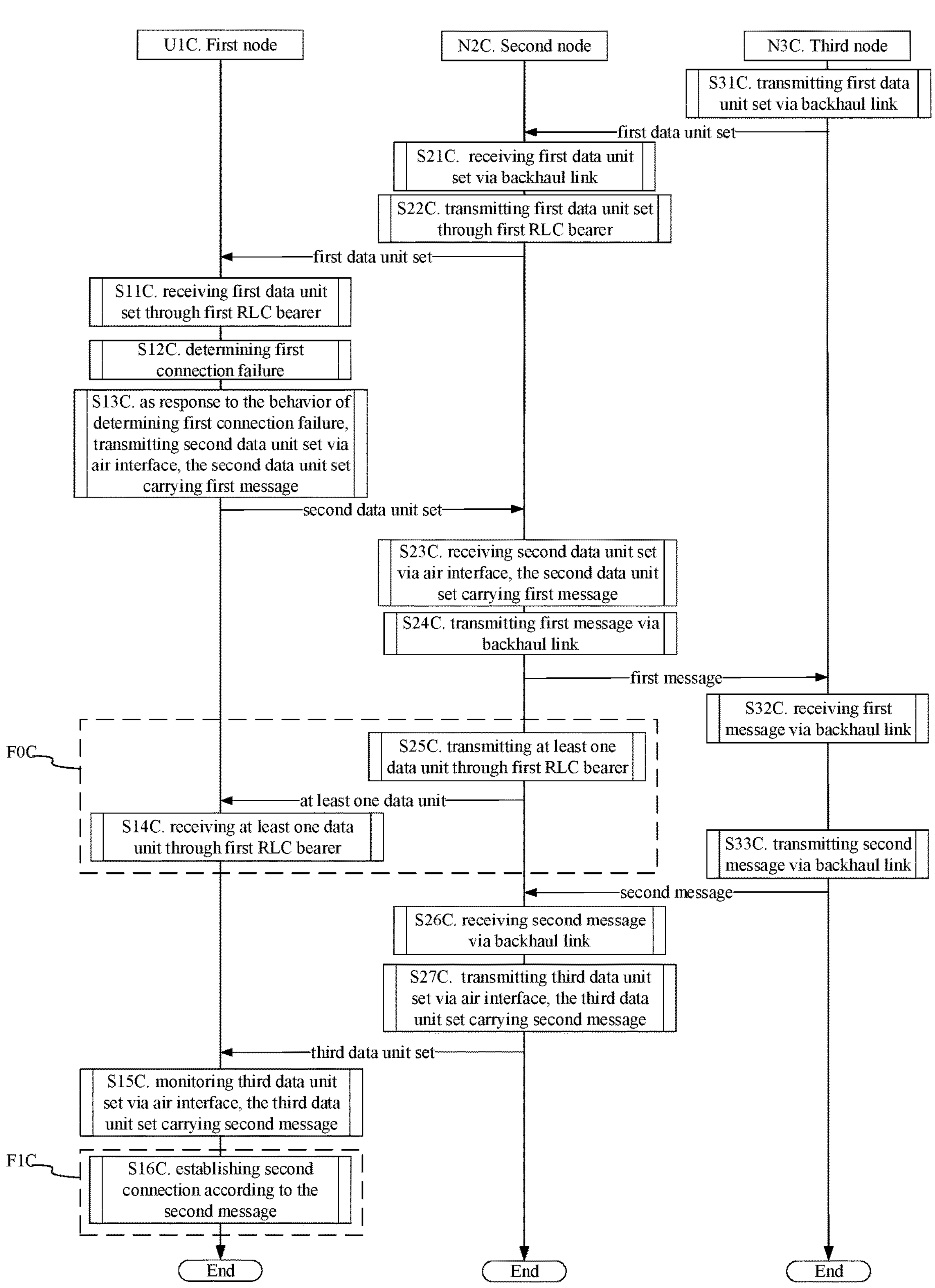
FIG. 5C illustrates a flowchart of radio signal transmission according to one embodiment of the present application.

Embodiment 5C illustrates a flowchart of radio signal transmission according to one embodiment in the present application, as shown in FIG. 5. In FIG. 5C, a first node U1C and a second node N2C are in communications via a radio interface, and a second node N2C and a third node N3C are in communications via a backhaul link. It is particularly underlined that the order illustrated in the embodiment does not put constraints over sequences of signal transmissions and implementations. In FIG. 5, steps in dotted boxes F0C and F1C are optional.

The first node U1C receives a first data unit set through a first radio bearer in step S11C; determines a first connection failure in step S12C; in step S13C as a response to the behavior of determining a first connection failure, transmits a second data unit set via an air interface, the second data unit set carries a first message; in step S14C receives at least one data unit through a first radio bearer; in step S15C monitors a third data unit set via an air interface, and the third data unit set carries a second message; in step S16C establishes a second connection according to the second message.

The second node N2C receives a first data unit via a backhaul link in step S21C; in step S22C transmits a first data unit set through a first RLC bearer; in step S23C receives a second data unit set via an air interface, and the second data unit set carries a first message; in step S24C transmits the first message via a backhaul link; in step S25C transmits at least one data unit through a first RLC bearer; in step S26C receives a second message via a backhaul link; in step S27C transmits a third data unit set via an air interface, and the third data unit set carries a second message.

The third node N3C transmits a first data unit via a backhaul link in step S31C; in step S32C receives a first message via a backhaul link; in step S33C transmits a second message via a backhaul link.

In one embodiment, the second node is a serving base station of the second cell.

In one embodiment, the third node is a serving base station of the first cell.

In one embodiment, the backhaul link is a link connecting base stations.

In one embodiment, the backhaul comprises an Xn interface.

In one embodiment, the backhaul comprises an X2 interface.

In one embodiment, the backhaul link connects the second node and the third node.

In one embodiment, the backhaul link comprises a link transmitting a radio signal.

In one embodiment, the backhaul link comprises a link transmitting a radio signaling.

In one embodiment, the backhaul link comprises a link transmitting a wired signal.

In one embodiment, the backhaul link comprises a link transmitting a wired signaling.

In one embodiment, the backhaul link comprises one-hop.

In one embodiment, the backhaul link comprises multiple-hops.

In one embodiment, the backhaul link comprises a Radio Network Control Plane and a user plane.

In one embodiment, the third node transmits the first data unit set to the second node through the user plane of the backhaul link.

In one embodiment, the first data unit set is transmitted at the third node through the first PDCP entity.

In one embodiment, the first data unit set is transmitted at the second node through the first RLC bearer.

In one embodiment, the first data unit set is transmitted at the second node through the first RLC entity.

In one embodiment, the first data unit set is received at the first node through the first radio bearer, the first radio bearer comprises a peer PDCP entity of the first PDCP entity maintained by the third node at the first node and a peer RLC entity of the first RLC entity maintained by the second node at the first node.

In one embodiment, the first extended message comprised in the second data unit set indicates the first reference value set.

In one embodiment, the first reference value set comprises at least one reference value.

In one embodiment, the reference value is an RLC sequence number.

In one embodiment, the second data unit set indicates a first RLC sequence number, and an RLC PDU comprising the second message comprises the first RLC sequence number.

In one embodiment, the second data unit set indicates a first RLC sequence number set, and the first RLC sequence number set comprises at least one RLC sequence number.

In one embodiment, an RLC sequence number comprising an RLC PDU of the second message belongs to the first RLC sequence number set.

In one embodiment, RLC sequence numbers in the first RLC sequence number set are continuous.

In one embodiment, RLC sequence numbers in the first RLC sequence number set are cyclic continuous.

In one embodiment, the second data unit set indicates an RLC sequence number in the first RLC sequence number set and a number of RLC sequence number(s) in the first RLC sequence number set.

In one embodiment, the second data unit set indicates an RLC sequence number in the first RLC sequence number set, and a number of RLC sequence number(s) in the first RLC sequence number set is pre-defined or fixed.

In one embodiment, an RLC sequence number in the first RLC sequence number set is a value after a sum of an RLC sequence number maintained by a second RLC entity before transmitting a first data unit in the second data unit set plus a first offset takes modulo of a maximum value of a sequence number of the second RLC entity; herein, the RLC sequence number maintained by the second RLC entity before transmitting the first data unit in the second data unit set is recorded as SN_0, the first offset is recorded as SN_offset, and a maximum value of the sequence number of the second RLC entity is recorded as SN_max.

In one embodiment, the second RLC entity is a peer RLC entity of the first RLC entity maintained by the second node, which is maintained by the first node.

In one embodiment, an RLC sequence number in the first RLC sequence number set is a value of (SN_0+SN_offset) mod(SN_max).

In one embodiment, the first offset is ½ of a maximum value of the sequence number of the second RLC entity.

In one embodiment, the first offset is [SN_max/2], where the [·] is an upward rounding operation.

In one embodiment, the first offset is [SN_max/2], where the [·] is a downward rounding operation.

In one embodiment, when the sequence number of the second RLC entity comprises 6 bits, a maximum number of the RLC sequence number of the second RLC entity is $2^6$.

In one embodiment, when the sequence number of the second RLC entity comprises 12 bits, a maximum number of the RLC sequence number of the second RLC entity is $2^{12}$.

In one embodiment, when the sequence number of the second RLC entity comprises 18 bits, a maximum number of the RLC sequence number of the second RLC entity is $2^{18}$.

In one embodiment, the reference value is a type of an RLC control PDU.

In one embodiment, the second data unit set indicates a first RLC control PDU type.

In one embodiment, a value of the first RLC control PDU type is one of 001 to 111.

In one embodiment, an RLC PDU comprising the second message comprises the first RLC control PDU type.

In one embodiment, the first reference value set is not transmitted via a backhaul link.

In one embodiment, the first reference value set is used to indicate that the second message is transferred from the second RLC entity of the first node to a third PDCP entity of the first node.

In one embodiment, the third PDCP entity is a peer PDCP entity of the second PDCP entity maintained by the third node, which is maintained by the first node.

In one embodiment, the second node acquires the first message and transmits the first message to the third node via the backhaul link.

In one embodiment, the first message is transmitted by the radio network control plane to the third node via the backhaul link.

In one embodiment, the first message is transmitted by the second node to the third node through FAILURE INDICATION procedure.

In one embodiment, the second node determines the third node through the second C-RNTI of a transmitter of the second data unit set.

In one embodiment, the third node receives the first message through the backhaul link.

In one embodiment, the third node generates the second message according to the first message.

In one embodiment, the second message is generated at a first RRC entity, and the first RRC entity is maintained by the third node.

In one embodiment, the third node transmits the second message to the second node through the radio network control plane of the backhaul link.

In one embodiment, the third node transmits an RRC Transfer message via the backhaul link, and an RRC message carried by the RRC Transfer is forwarded to the first node, and the RRC Transfer message comprises the second message.

In one embodiment, a name of an IE that encapsulates the second message comprises a DRB.

In one embodiment, a name of an IE that encapsulates the second message comprises RRCReconfig.

In one embodiment, a name of an IE that encapsulates the second message comprises recovery.

In one embodiment, a name of an IE that encapsulates the second message comprises Fast RRCReconfig via DRB from MN to SN.

In one embodiment, a container encapsulating the second message comprises an RRC Container IE.

In one embodiment, the second message is transmitted through the second PDCP entity at the third node.

In one embodiment, the second message is used to generate the third data unit set at the second node, the second node transmits the third data unit set through the first RLC bearer, and the third data unit set carries the second message.

In one embodiment, the second message is encapsulated into a third data unit set by a transmitter and then is transmitted via an air interface.

In one embodiment, a third data unit set carrying the second message is received by a receiver of the second message via an air interface.

In one embodiment, after transmitting the first message and before the second message is received, the at least one data unit buffered at the first RLC entity is transmitted through the first RLC bearer to the first node.

In one embodiment, after transmitting the first message and before the second message is received, the at least one data unit set is transmitted through the first radio bearer.

In one subembodiment of the above embodiment, the behavior of transmitting through the first radio bearer comprises a downlink transmission.

In one subembodiment of the above embodiment, the behavior of transmitting through the first radio bearer comprises an uplink transmission.

In one embodiment, after transmitting the first message and before the second message is received, the uplink transmission is suspended through the first radio bearer.

In one embodiment, after receiving the second message, a second connection is established according to the second message.

In one embodiment, the second connection comprises an RRC connection.

In one embodiment, the second connection comprises a radio link with the first cell.

In one embodiment, the second connection comprises a radio link with the second cell.

In one embodiment, the second connection comprises a radio link with a third cell, and the third cell is a cell other than the first cell and the second cell.

In one embodiment, the second connection is used to transmit a control signaling.

In one embodiment, the second connection is used to transmit an RRC signaling.

In one embodiment, the second connection is used to transmit measurement information.

In one embodiment, the first PDCP entity and the second PDCP entity respectively implement PDCP sublayer protocol stack function.

In one embodiment, the first RLC entity and the second RLC entity respectively implement RLC sublayer protocol stack function.

Embodiment 6A

Figure 6A:
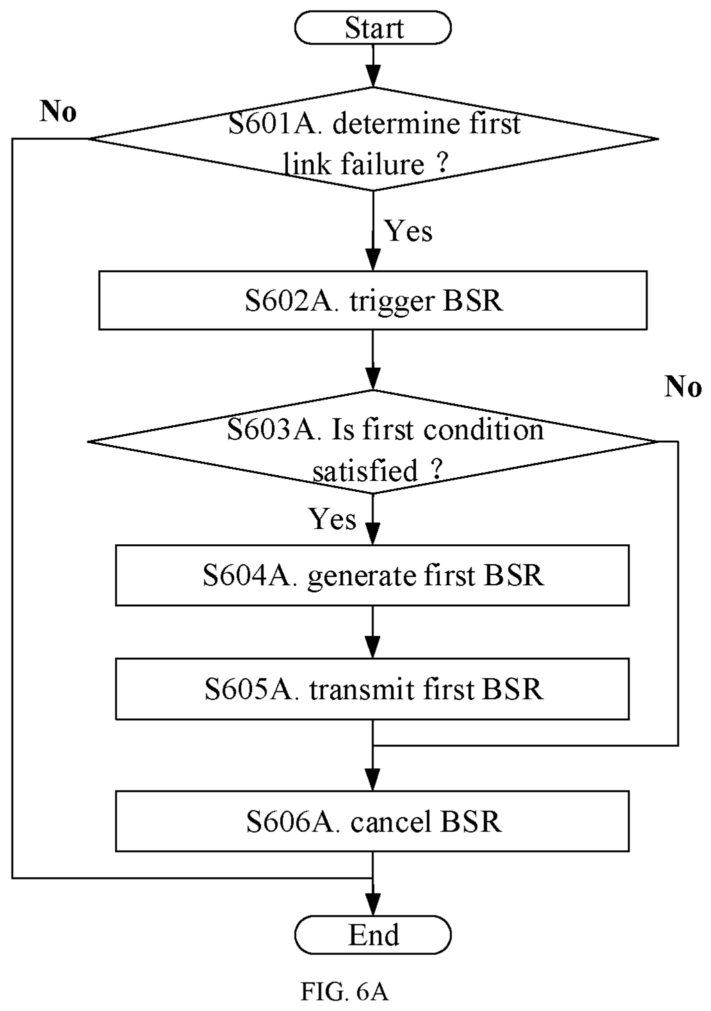
FIG. 6A illustrates a flowchart of the processing of a first node according to one embodiment of the present application.

Embodiment 6A illustrates a flowchart of the processing of a first node according to one embodiment of the present application, as shown in FIG. 6A. Steps in FIG. 6A are executed in a first node.

in step S601A determine whether a first link is failed, if yes, execute step S602A, if no, end; in step S602A trigger a BSR; in step S603A judge whether a first condition is satisfied, if yes, execute step S604A, if no, execute step S606A; in step S604A generate a first BSR; in step S605A transmit a first BSR; in step S606A cancel a BSR.

In one embodiment, as a response to the behavior of determining the first link failure, clear a fifth data unit set, and trigger a BSR.

In one subembodiment of the above embodiment, clearing the fifth data unit set is executed before triggering the BSR.

In one subembodiment of the above embodiment, the BSR is triggered for a logical channel set corresponding to the first link in the first logical channel set.

In one subembodiment of the above embodiment, the BSR is triggered for the fourth logical channel set.

In one embodiment, determine a second link establishment; as a response to the behavior of the second link establishment, trigger a BSR.

In one subembodiment of the above embodiment, the BSR is triggered for a logical channel set corresponding to the second link in the first logical channel set.

In one embodiment, at least one channel in the first channel set is transmitted through the second link at an air interface.

In one embodiment, at least one channel in the second channel set is transmitted through the second link at an air interface.

In one embodiment, at least one data unit in the first data unit set is received through the second link.

In one embodiment, when a triggering event of a BSR is link failure, only when the first condition is satisfied, generate a first BSR, and after the first BSR is transmitted, cancel the BSR; when the first condition is not satisfied, cancel the BSR.

In one embodiment, when a triggering event of a BSR is link establishment, only when the first condition is satisfied, generate a first BSR, and after the first BSR is transmitted, cancel the BSR; when the first condition is not satisfied, cancel the BSR.

In one embodiment, the behavior of canceling the BSR refers to: a BSR MAC CE is not generated.

In one embodiment, the behavior of canceling the BSR refers to: when there are Uplink-Shared CHannel (UL-SCH) resources being available to transmit new data, a BSR MAC CE is not carried.

Embodiment 6B

Figure 6B:
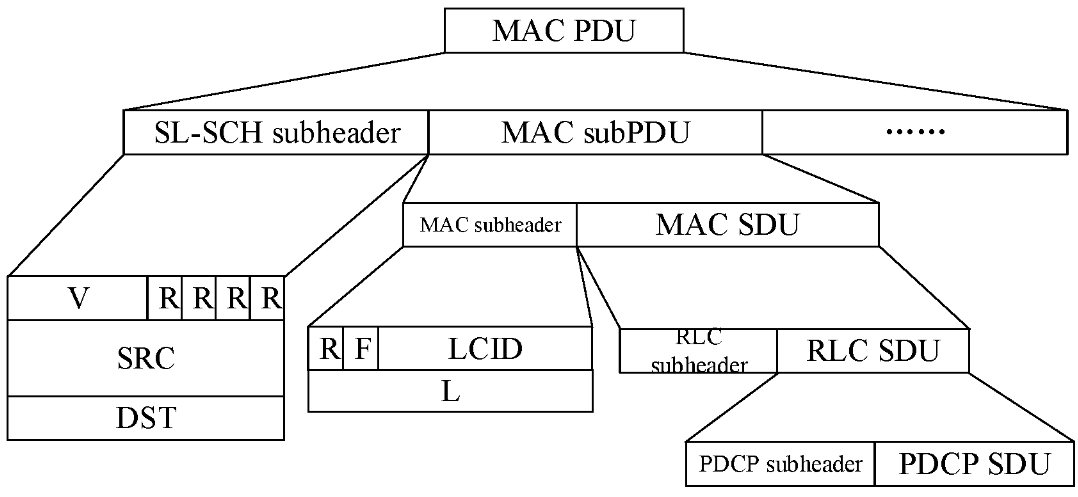
FIG. 6B illustrates a format diagram of a MAC PDU according to one embodiment of the present application.

Embodiment 6B illustrates a format diagram of a MAC PDU according to one aspect of the present application, as shown in FIG. 6B.

In one embodiment, the MAC PDU comprises a Sidelink Shared Channel (SL-SCH) subheader and at least one MAC subPDU, and the MAC subPDU comprises a MAC subheader and a MAC SDU; the MAC SDU comprises an RLC subheader and at least one RLC SDU; the RLC SDU comprises a PDCP subheader and a PDCP SDU; a V field comprised in the SL-SCH subheader is used to indicate a version number; an R field comprised in the SL-SCH subheader is reserve; an SRC field comprised in the SL-SCH comprises 16 bits, which indicates higher 16 bits of an identity of a transmitter of the MAC PDU; a DST field comprised in the SL-SCH subheader comprises 8 bits, which indicates higher 8 bits of an identity of a receiver of the MAC PDU; an R field comprised in the MAC subheader is reserve; an F field comprised in the MAC subheader indicates a length of an L field comprised in the MAC subheader; an L field comprised in the MAC subheader indicates a number of byte(s) comprised in the MAC SDU.

In one embodiment, the MAC PDU comprises partial bits in an identity of a transmitter of the MAC PDU; an SCI scheduling the MAC PDU comprises remaining partial bits in the identity of the transmitter of the MAC PDU.

In one subembodiment of the above embodiment, the partial bits comprise higher 16 bits in the identity of the transmitter of the MAC PDU; the remaining partial bits comprises lower 8 bits in the identity of the transmitter of the MAC PDU; the higher 16 bits and the lower 8 bits consist an identity.

In one embodiment, the MAC PDU comprises partial bits in an identity of a receiver of the MAC PDU; an SCI scheduling the MAC PDU comprises remaining partial bits in the identity of the receiver of the MAC PDU.

In one subembodiment of the above embodiment, the partial bits comprise higher 8 bits in the identity of the receiver of the MAC PDU; the remaining partial bits comprises lower 16 bits in the identity of the receiver of the MAC PDU; the higher 8 bits and the lower 16 bits consist an identity.

In one embodiment, the MAC PDU comprises the first signaling.

In one embodiment, the MAC PDU comprises the second signaling.

In one embodiment, the MAC PDU comprises the first information.

In one embodiment, the MAC PDU comprises the second information.

In one embodiment, the MAC PDU comprises the third information.

In one embodiment, the MAC PDU comprises any data unit in the first data unit set.

In one embodiment, the MAC PDU comprises any data unit in the second data unit set.

In one embodiment, the MAC PDU comprises any data unit in the third data unit set.

In one embodiment, the MAC subheader comprises an LCID, and the LCID is used to indicate a radio bearer to which the MAC SDU belongs.

In one embodiment, the MAC SDU is distributed to a target RLC entity according to the LCID of the MAC SDU.

Embodiment 6C

Figure 6C:
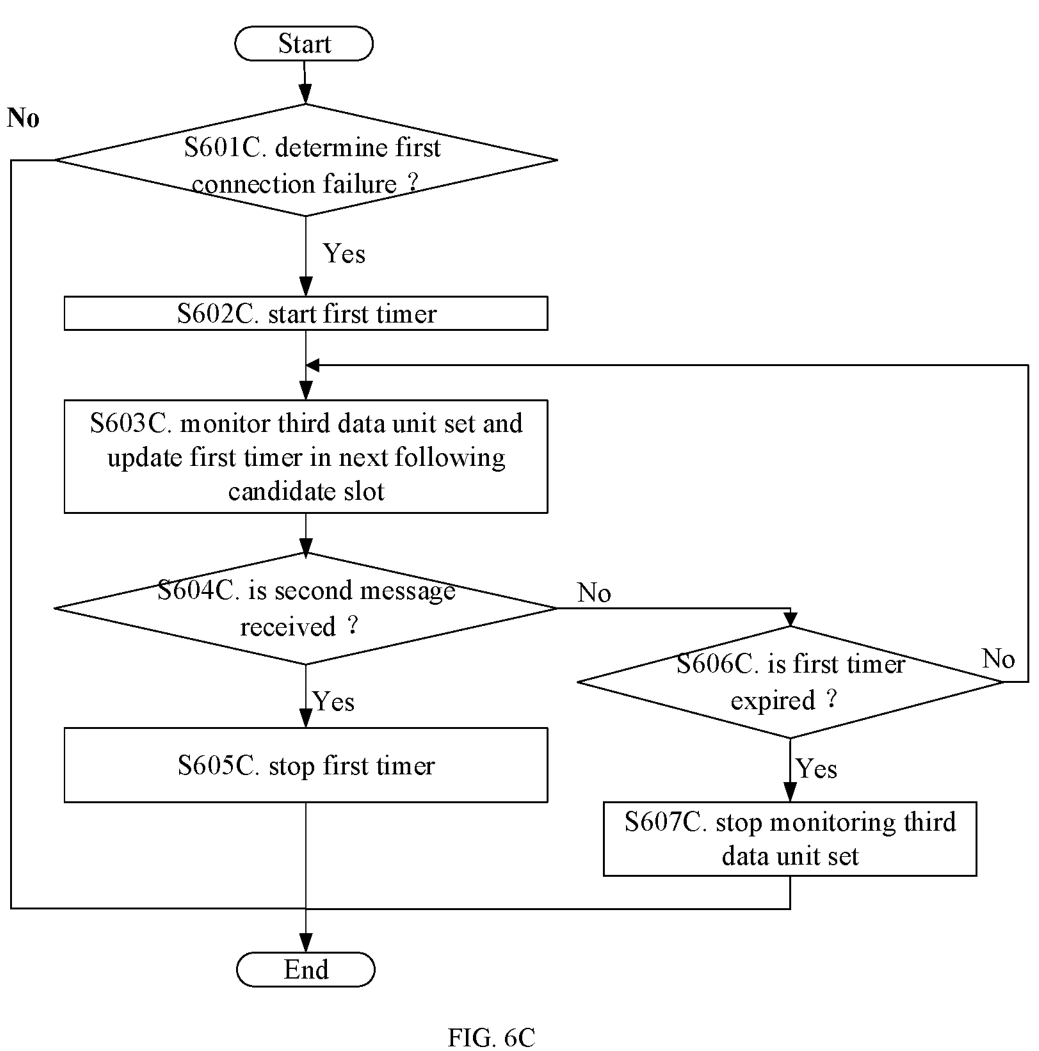
FIG. 6C illustrates a schematic diagram of a flowchart of maintaining a first timer according to one embodiment of the present application.

Embodiment 6C illustrates a flowchart schematic diagram of maintaining a first timer according to one embodiment of the present application, as shown in FIG. 6C. Steps in FIG. 6C are executed in a first node.

In step S601C determine whether first connection is failed, if yes, execute step S602C, if no, end; in step S602C start a first timer; in step S603C monitor a third data unit set in a next candidate slot, and update a first timer; in step S604C judge whether a second message is received, if yes, execute step S605C, if no, execute step S606C; in step S605C stop a first timer; in step S606C judge whether a first timer is expired, if yes, execute step S607C, if no, skip back to step S603C; in step S607 stop monitoring a third data unit set.

In one embodiment, as a response to the behavior of determining a first connection failure, the second RLC entity is re-established.

In one embodiment, the first receiver maintains the first timer.

In one embodiment, at a start time of a slot where a first data unit in the second data unit set is located, the first receiver starts a first timer.

In one embodiment, at an end time of a slot where a first data unit in the second data unit set is located, the first receiver starts a first timer.

In one embodiment, the starting a first timer is to set a value of the first timer as 0; the updating the first timer is to increase a value of the first timer by 1; if a value of the first timer is equal to a first expiration value, the first timer is expired, otherwise the first timer is not expired.

In one embodiment, the starting the first timer is to set a value of the first timer as a first expiration value; the updating the first timer is to decrease a value of the first timer by 1; if a value of the first timer is equal to 0, the first timer is expired, otherwise the first timer is not expired.

In one embodiment, the first expiration value is configurable.

In one embodiment, the first expiration value is a positive integer greater than 1.

In one embodiment, the first expiration value is a fixed value.

In one embodiment, the behavior of maintaining the first timer comprises updating the first timer in each passing slot.

In one embodiment, the slot is one ms.

In one embodiment, the slot comprises 14 Orthogonal Frequency Division Multiplexing (OFDM) symbols.

In one embodiment, the slot comprises 12 OFDM symbols.

In one embodiment, when the first timer expires, the first receiver stops the first timer.

In one embodiment, when the second message is received, the first receiver stops the first timer.

In one embodiment, the next candidate slot is a nearest upcoming slot.

In one embodiment, the next candidate slot is a nearest upcoming slot reserved for Uu.

In one embodiment, the next candidate slot is a nearest upcoming slot reserved for PC5.

In one embodiment, in the step S601C (that is, when the first node does not determine the first connection failure), maintain a stopping state of a first timer; in the step S602C (that is, when the first node determines the first connection failure), start the first timer.

In one embodiment, in the step S601C (that is, when the first node does not determine the first connection failure), maintain a counting of a first timer (that is, the first timer is running); in the step S602C (that is, when the first node determines the first connection failure), re-start the first timer.

In one embodiment, the behavior of stopping monitoring the third data unit set comprises: executing a cell re-selection.

In one embodiment, the behavior of stopping monitoring the third data unit set comprises: releasing the first radio bearer.

In one embodiment, the behavior of stopping monitoring the third data unit set comprises: releasing the second radio bearer.

In one embodiment, the second data unit set indicates a first RLC sequence number set, and the first RLC sequence number set comprises at least one RLC sequence number; when the first timer is running, and if an RLC sequence number comprised in a received RLC PDU belongs to the first RLC sequence number set, it is judged that the received RLC PDU carries at least partial information in the second message.

In one embodiment, the behavior of judging that the received RLC PDU carries at least partial information in the second message comprises: an RLC SDU comprised in the received RLC PDU is transferred to a peer PDCP entity of the second PDCP entity maintained by the first node.

In one embodiment, the first PDCP entity and the second PDCP entity are maintained at the base station side.

In one embodiment, when the first timer is running, if an RLC sequence number comprised in a received RLC PDU does not belong to the first RLC sequence number set, it is judged that the received RLC PDU does not carry the second message.

In one embodiment, when the first timer is running, if an RLC sequence number comprised in a received RLC PDU does not belong to the first RLC sequence number set, an RLC SDU comprised in the received RLC PDU is transferred to a peer PDCP entity of the first PDCP entity maintained by the first node.

In one embodiment, when the first timer stops or expires, if an RLC sequence number comprised in a received RLC PDU belongs to the first RLC sequence number set, it is judged that the received RLC PDU does not carry the second message.

In one embodiment, when the first timer stops or expires, if an RLC sequence number comprised in a received RLC PDU belongs to the first RLC sequence number set, it is judged that the received RLC PDU belongs to a user plane.

In one embodiment, when the first timer stops or expires, and if an RLC sequence number comprised in a received RLC PDU belongs to the first RLC sequence number set, drop the received RLC PDU.

In one embodiment, the second message is transmitted to a second RRC entity for processing after being processed by a peer PDCP entity of the second PDCP entity maintained by the first node, and the second RRC entity is maintained by the first node.

In one embodiment, the second RRC entity maintained by the first node is a peer RRC entity of the first RRC entity maintained by the third node.

In one embodiment, the first RRC entity and the second RRC entity respectively implement the RRC sublayer protocol stack function.

Embodiment 7A

Figure 7A:
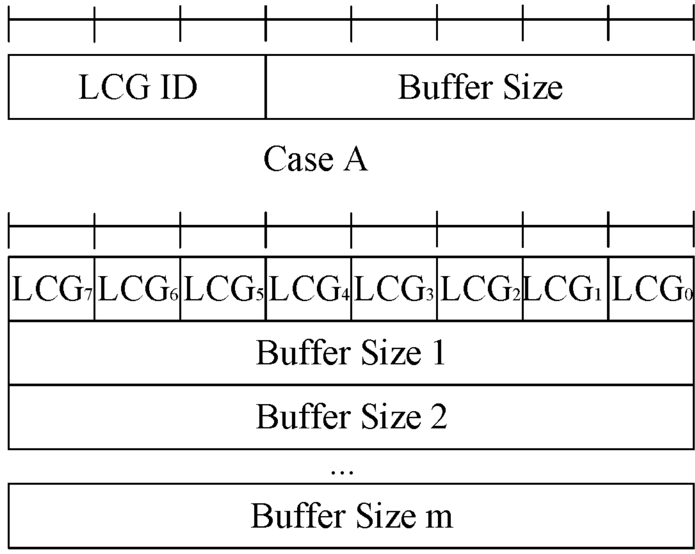
FIG. 7A illustrates a format schematic diagram of a BSR MAC CE generated by a first node according to one embodiment of the present application.

Embodiment 7A illustrates a format schematic diagram of a BSR MAC CE generated by a first node according to one embodiment of the present application, as shown in FIG. 7A.

In one embodiment, a BSR MAC CE comprises a logical channel group identity and a buffer size for the logical channel group.

In one embodiment, the logical channel group identity indicates at least one logical channel.

In one embodiment, a buffer size for the logical channel group is determined by a MAC entity.

In one embodiment, a buffer size for the logical channel group indicates a sum of data volume of available data comprised for each logical channel in the logical channel group.

In one embodiment, a sum of data volume of available data comprised for each logical channel in the logical channel group is not greater than a maximum value indicated by the buffer size for the logical channel group, and a sum of data volume of available data comprised for each logical channel in the logical channel group is not less than a minimum value indicated by the buffer size for the logical channel group.

In one embodiment, available data volume comprised for each logical channel in the logical channel group is provided by a PDCP entity corresponding to each logical channel to a MAC entity.

In one embodiment, available data volume comprised for each logical channel in the logical channel group is provided by an RLC entity corresponding to each logical channel to a MAC entity.

In one subembodiment of the above embodiment, the RLC entity comprises an RLC entity corresponding an ingress RLC channel.

In one subembodiment of the above embodiment, the RLC entity comprises an RLC entity corresponding an egress RLC channel.

In one embodiment, available data volume comprised for each logical channel in the logical channel group is provided by an SLAP entity to a MAC entity.

In one embodiment, a buffer size of a logical channel group comprised in a BSR MAC CE indicates data volume determined after a MAC PDU is established.

In one embodiment, a buffer size of a logical channel group comprised in a BSR MAC CE indicates data volume determined after a MAC PDU is established; the MAC PDU comprises a BSR MAC CE.

In one embodiment, a buffer size of a logical channel group comprised in a BSR MAC CE does not comprise an RLC header and a MAC subheader.

In one embodiment, for the calculation of the data volume, refer to TS38.322 and TS38.323 of 3GPP specification.

In case A in embodiment 7A, a BSR MAC CE is a short BSR MAC CE format or a truncated BSR MAC CE format, where 3-bit LCG ID field indicates a logical channel group identity, and 5-bit Buffer Size field indicates a buffer size for the logical channel group.

In case B in embodiment 7A, a BSR MAC CE is a long BSR MAC CE format or a long truncated BSR MAC CE format, where 1-bit $LCG_i$ indicates an i-th logical channel group, i is a non-negative integer from 0-7; in a long BSR MAC CE format, $LCG_i$ indicates whether a buffer size field corresponding to $LCG_i$ exists, $LCG_i$ setting to 1 indicates reporting a buffer size for an i-th logical channel group, and $LCG_i$ setting to 0 indicates not reporting a buffer size for an i-th logical channel group; in a long truncated BSR MAC CE format, $LCG_i$ indicates whether there is available data in a logical channel group corresponding to $LCG_i$, $LCG_i$ setting to 1 indicates that there is available data in an i-th logical channel group, and $LCG_i$ setting to 0 indicates that there is no available data in an i-th logical channel group; 8-bit Buffer Size field indicates a buffer size for the logical channel group.

Embodiment 7B

Figure 7B:
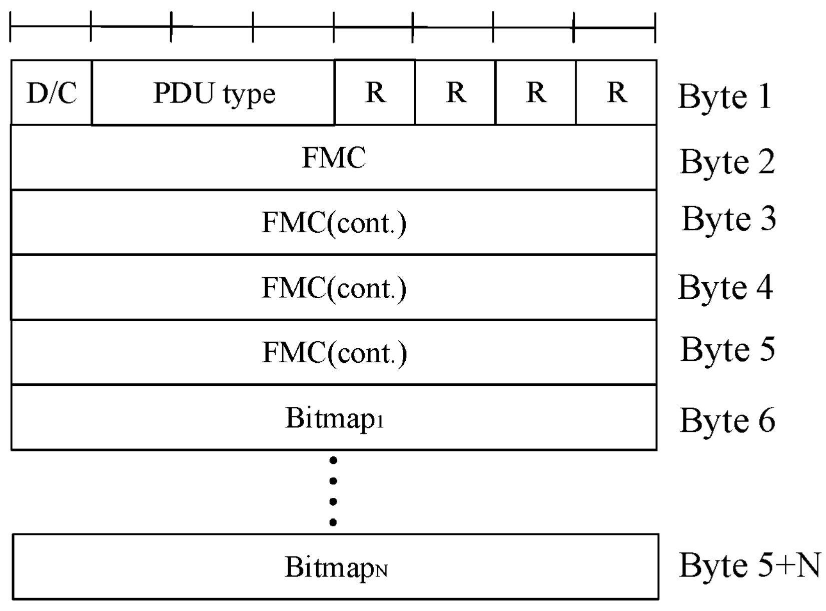
FIG. 7B illustrates a schematic diagram of a second signaling format according to one embodiment of the present application.

Embodiment 7B illustrates a schematic diagram of a second signaling format according to one embodiment of the present application, as shown in FIG. 7B.

In one embodiment, the second signaling comprises a second PDCP control PDU; the second PDCP control PDU comprises a PDCP status report.

In one embodiment, as shown in FIG. 7B, a data/control (D/C) field comprised in the second PDCP control PDU is 0; a PDU type field is 000; an R field is reserve; First Missing Count (FMC) comprises 32 bits, which indicates a Count of a first lost PDCP SDU within the first window, and the Count is determined by a sequence number of a PDCP SDU; a position of any bit from Bitmap1 to BitmapN indicates an offset value of a sequence number of a PDCP SDU and a sequence number of the first lost PDCP SDU; when a value of any bit is 0, it indicates that a PDCP SDU corresponding to a sequence number indicated by a position of the any bit is not received from a sequence number of the first lost PDCP SDU starts shifting, when a value of the any bit is 1, it indicates that a PDCP SDU corresponding to a sequence number indicated by a position of the any bit is received from a sequence number of the first lost PDCP SDU starts shifting; herein, a value of the Count can be acquired by the first window size and a sequence number of a PDCP SDU according to the method described in section 5.2.2 of the protocol 38.323 of the 3GPP standard; when a value of (FMC+bit position) mod $2^{32}$ is the same as a value of the Count, a bit position indicated by the bit position indicates a sequence number of the PDCP SDU, and the FMC can be acquired according to the method described in section 5.4.1 of the protocol 38.323 of 3GPP standard. It will not be repeated here, and the mod is modular operation.

In one embodiment, the second PDCP control PDU does not comprise the Bitmap field.

In one embodiment, the Bitmap field comprised in the second PDCP control PDU at least comprises a bit position of 0.

In one embodiment, at least a former of the FMC field in the second PDCP control PDU and a bit position of the Bitmap being 0 indicates a lost data unit set; the first data unit set comprises the lost data unit set.

In one embodiment, at least a former of the FMC field in the second PDCP control PDU, a bit position being 0 in the Bitmap and a last bit position being 1 in the Bitmap indicates the second data unit set; herein, at least a former of the FMC field and a bit position being 0 in the Bitmap indicates the lost data unit set; at least a former of the FMC field and a last bit position being 1 in the Bitmap is used to implicitly indicate a sequence number of a next data unit to be received; the second data unit set comprises the lost data unit set and the next data unit to be received as well as a data unit after the next data unit to be received.

In one subembodiment of the above embodiment, at least a former of the FMC field and a last bit position being 1 in the Bitmap is used to indicate a first sequence number, and a sequence number of the next data unit to be received is the first sequence number plus 1; the first sequence number indicates a maximum value in the sequence number set corresponding to a received data unit set.

Embodiment 7C

Figure 7C:
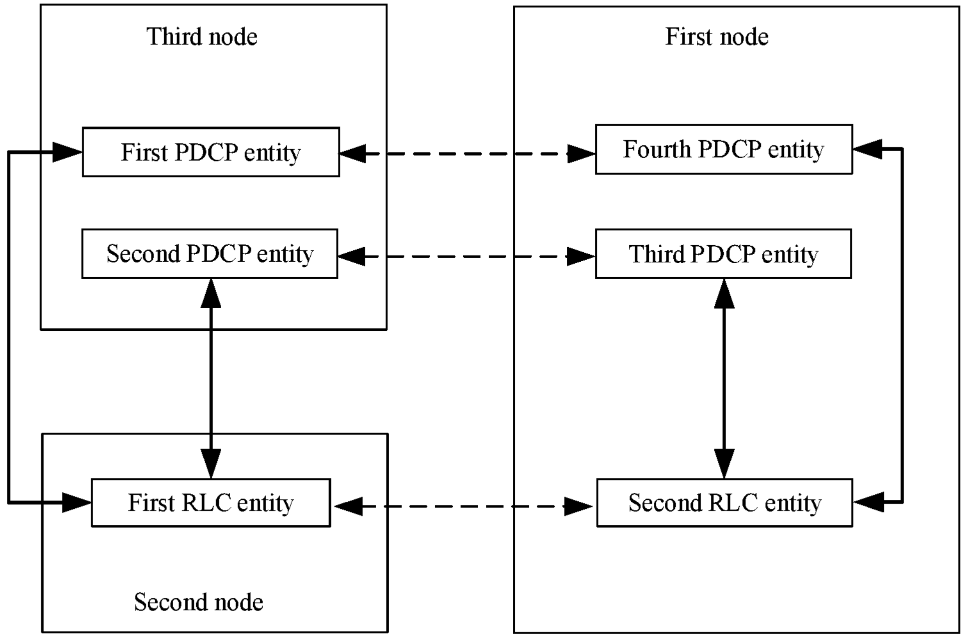
FIG. 7C illustrates a schematic diagram of a first PDCP entity, a second PDCP entity and a first RLC entity as well as relations among their corresponding peer entities according to one embodiment of the present application.

Embodiment 7C illustrates a schematic diagram of relations among a first PDCP entity, a second PDCP entity and a first RLC entity as well as their corresponding peer entities according to one embodiment of the present application, as shown in FIG. 7C.

In one embodiment, the third node maintains the first PDCP entity and the second PDCP entity.

In one embodiment, the second node maintains the first RLC entity, and the first RLC entity belongs to the first RLC bearer.

In one embodiment, the first node maintains a fourth PDCP entity, and the fourth PDCP entity is a peer PDCP entity of the first PDCP entity at the first node maintained by the third node.

In one embodiment, the first node maintains the third PDCP entity, and the third PDCP entity is a peer PDCP entity of the second PDCP entity at the first node maintained by the third node.

In one embodiment, the first node maintains the second RLC entity, and the second RLC entity is a peer RLC entity of the first RLC entity at the first node maintained by the second node.

In one embodiment, the first radio bearer comprises at the first node the fourth PDCP entity and the second RLC entity.

In one embodiment, the second radio bearer comprises at the first node the third PDCP entity.

In one embodiment, as a response to the behavior of transmitting the second data unit set via the air interface, a peer RLC entity of the first RLC entity maintained by the first node is associated with a peer PDCP entity of the first PDCP entity maintained by the first node and a peer PDCP entity of the second PDCP entity maintained by the first node at the same time.

Embodiment 8A

Figures 8A, 8B:
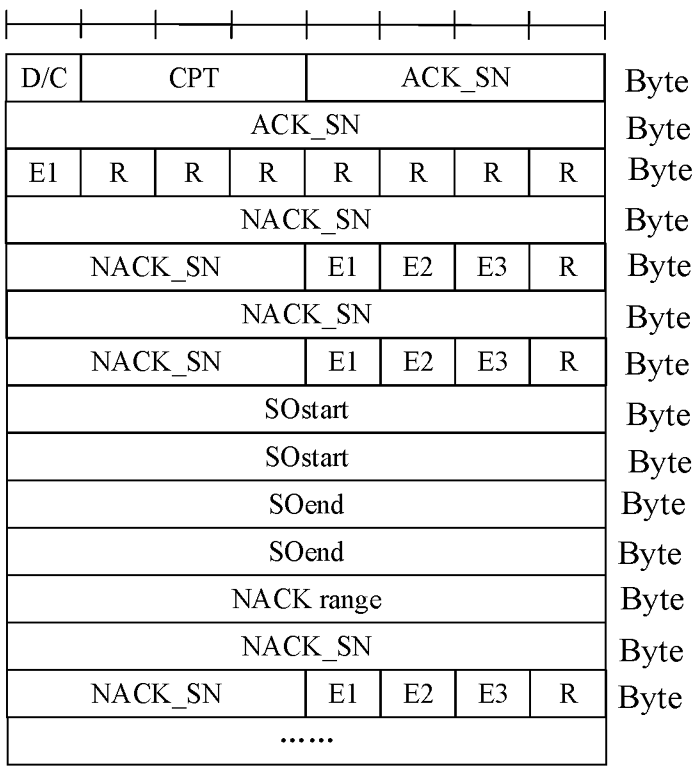
FIG. 8A illustrates a schematic diagram of Buffer Size according to one embodiment of the present application.
FIG. 8B illustrates a schematic diagram of another second signaling format according to one embodiment of the present application.

Embodiment 8A illustrates a schematic diagram of Buffer Size according to one embodiment of the present application, as shown in FIG. 8A.

In one embodiment, a Buffer Size field is Index value in FIG. 8A.

In one embodiment, a Buffer Size field indicates a maximum value of a buffer value and a minimum value of a buffer value.

In one embodiment, a buffer value indicated by a Buffer Size field is represented by byte.

In one embodiment, for a buffer value indicated by a Buffer Size field, refer to TS36.321 and TS38.321 in 3GPP specification.

In FIG. 8A, the table describes a buffer value indicated by a 5-bit Buffer Size field; if the Buffer Size field is 1, it is indicated that a maximum value of a buffer value is 10 bytes, and a minimum value of a buffer value is 1 byte.

In one embodiment, for buffer value indicated by an 8-bit Buffer Size field, refer to TS36.321 and TS38.321 in 3GPP specification.

Embodiment 8B

Embodiment 8B illustrates a schematic diagram of another second signaling format according to one embodiment of the present application, as shown in FIG. 8B.

In one embodiment, the second signaling comprises a second RLC control PDU; the second RLC control PDU comprises a STATUS PDU.

In one embodiment, as shown in FIG. 8B, a D/C field comprised in the second RLC control PDU is 0; a Control PDU Type (CPT) field is 000; an Acknowledgement (ACK) sequence number (ACK_SN) field explicitly indicates a sequence number of a next RLC SDU to be received; Extension 1 (E1) field indicates whether there are more NACK_SNs, E1s, E2s and E3s; an R field is reserved; a Negative Acknowledgement (NACK) sequence number (NACK_SN) field indicates a lost RLC SDU or a sequence number of a lost RLC SDU segment; an E2 field indicates whether there are SOstart and SOend after the NACK_SN field, and the NACK_SN field is respectively associated with the SOstart and the SOend; an E3 field indicates whether there is a NACK range field after the NACK_SN field, and the NACK_SN field is associated with the NACK range field; the SOstart and the SOend respectively indicate a start byte and an end byte of an RLC SDU segment indicated by the NACK_SN in an original RLC SDU; the NACK range field indicates a number of continuous lost RLC SDUs from NACK_SN; herein, as shown in FIG. 8B, the ACK_SN field and the NACK_SN field respectively comprise 12 bits, and the ACK_SN field and the NACK_SN field can respectively comprise 18 bits.

In one embodiment, the second RLC control PDU at least comprises a NACK_SN field.

In one embodiment, at least a former of the NACK_SN field, the SOstart field, the SOend field, and the NACK range field in the second RLC control PDU is used to indicate a lost data unit set; the first data unit set comprises the lost data unit set.

In one embodiment, at least the former of the NACK_SN field, the SOstart field, the SOend field, and the NACK range field in the second RLC control PDU indicates a lost data unit set; the ACK_SN field in the STATUS PDU explicitly indicates a next data unit to be received; the second data unit set comprises the lost data unit set and the next data unit to be received and a data unit after the next data unit to be received.

Embodiment 8C

Figures 8C, 9A, 9B:
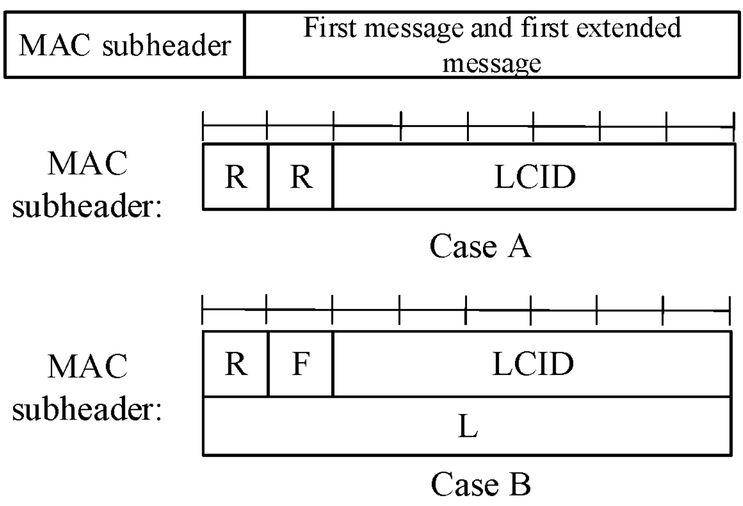
FIG. 8C illustrates a schematic diagram of a MAC subPDU according to one embodiment of the present application.
FIG. 9A illustrates a schematic diagram of a radio protocol architecture of relay transmission according to one embodiment of the present application.
FIG. 9B illustrates a schematic diagram of a first signaling format according to one embodiment of the present application.

Embodiment 8C illustrates a schematic diagram of a MAC subPDU according to one embodiment of the present application, as shown in FIG. 8C.

In one embodiment, a MAC subPDU comprises a MAC subheader and a MAC CE.

In one embodiment, a MAC subPDU comprises a MAC subheader and a MAC SDU.

In one embodiment, a MAC PDU comprises at least one MAC subPDU.

In one embodiment, the MAC CE comprised in the second data unit set comprises the first message and the first extended message.

In one embodiment, an LCID comprised in a MAC subheader of the MAC CE comprised in the second data unit set is 35.

In one embodiment, an LCID comprised in a MAC subheader of the MAC CE comprised in the second data unit set is 36.

In one embodiment, an LCID comprised in a MAC subheader of the MAC CE comprised in the second data unit set is 37.

In one embodiment, an LCID comprised in a MAC subheader of the MAC CE comprised in the second data unit set is 38.

In one embodiment, an LCID comprised in a MAC subheader of the MAC CE comprised in the second data unit set is 39.

In one embodiment, if an LCID comprised in a MAC subheader of a received MAC CE is 35, it is judged that the received MAC CE carries the first message.

In one embodiment, if an LCID comprised in a MAC subheader of a received MAC CE is 36, it is judged that the received MAC CE carries the first message.

In one embodiment, if an LCID comprised in a MAC subheader of a received MAC CE is 37, it is judged that the received MAC CE carries the first message.

In one embodiment, if an LCID comprised in a MAC subheader of a received MAC CE is 38, it is judged that the received MAC CE carries the first message.

In one embodiment, if an LCID comprised in a MAC subheader of a received MAC CE is 39, it is judged that the received MAC CE carries the first message.

In one embodiment, the MAC SDU comprised in the second data unit set comprises the first message and the first extended message.

In one embodiment, a MAC SDU segment comprised in each data unit in the second data unit set consists of the first message and the first extended message.

In one embodiment, 1-bit reserve bit in a MAC subheader of the MAC SDU comprised in the second data unit set is used to indicate the first message.

In one embodiment, 1-bit reserve bit R in a MAC subheader of a MAC SDU segment comprised in each data unit in the second data unit set is used to indicate the first message.

In one embodiment, the 1-bit reserve bit R being 0 in the MAC subheader of the MAC SDU indicates that the MAC SDU belongs to the first radio bearer; the 1-bit reserve bit R being 1 in the MAC subheader of the MAC SDU indicates that the MAC SDU belongs to the first message.

In one embodiment, the 1-bit reserve bit R being 0 in the MAC subheader of the MAC SDU indicates that the MAC SDU belongs to the first message; the 1-bit reserve bit R being 1 in the MAC subheader of the MAC SDU indicates that the MAC SDU belongs to the first radio bearer.

In one embodiment, if a reserve bit comprised in a MAC subheader of a received MAC SDU is 1, it is judged that the received MAC SDU carries the first message.

In one embodiment, if a reserve bit comprised in a MAC subheader of a received MAC SDU is 0, it is judged that the received MAC SDU carries the first message.

In one embodiment, if a reserve bit comprised in a MAC subheader of a received MAC SDU segment is 1, it is judged that the received MAC SDU segment carries at least partial information the first message.

In one embodiment, if a reserve bit comprised in a MAC subheader of a received MAC SDU segment is 0, it is judged that the received MAC SDU segment carries at least partial information the first message.

In one embodiment, when a MAC subheader of a received MAC SDU indicates that the MAC SDU belongs to the first message, the MAC SDU is not transferred to the first RLC entity.

In one embodiment, an LCID of the MAC SDU comprised in the second data unit set is not used to transfer the MAC SDU to the first RLC entity.

In one embodiment, an LCID of the MAC SDU segment comprised in each data unit in the second data unit set is not used to transfer the MAC SDU segment to the first RLC entity.

In case A of embodiment 8C, a MAC subheader comprises 1 byte, 2 reserve bit R fields respectively occupy 1 bit, where a most significant reserve bit R is used to indicate that a MAC subPDU belongs to the first radio bearer or the first message; an LCID field occupies 6 bits; the most significant reserve bit is a leftmost bit in case A of embodiment 8C.

In case A of embodiment 8C, a MAC subheader comprises 1 byte, 2 reserve bit R fields respectively occupy 1 bit, where a second most significant reserve bit R is used to indicate that a MAC subPDU belongs to the first radio bearer or the first message; an LCID field occupies 6 bits; the second most significant reserve bit is a second leftmost bit in case A of embodiment 8C.

In case B of embodiment 8C, a MAC subheader comprises 2 bits, where 1 reserve bit R field occupies 1 bit, an F field indicates a length of an L field, the F field being 0 indicates that the L field comprises 8 bits, and the F field being 1 indicates that the L field comprises 16 bits; an LCID field occupies 6 bits; an L field indicates a length of a MAC SDU or a MAC CE indicated by the MAC subheader, that is, a number of byte(s) comprised in the MAC SDU or the MAC CE.

Embodiment 9A

Embodiment 9A illustrates a schematic diagram of a radio protocol architecture of relay transmission according to one embodiment of the present application, as shown in FIG. 9A.

In FIG. 9A, in relay transmission, taking data being respectively transmitted by a third node and a fourth node to a second node through a first node as an example: first target data is processed by the lower layer after sequentially being processed by the PDCP sublayer 901A and RLC sublayer 903A at the third node side, and then is transmitted to a first node via an air interface; second target data is processed by the lower layer after sequentially being processed by PDCP sublayer 911A and RLC sublayer 913A at the fourth node side, and then is transmitted to a first node via an air interface; after being respectively processed at the lower layer of the first node, first RLC data is recovered through the processing of RLC sublayer 923A, and second RLC data is recovered through the processing of RLC sublayer 933A; the first RLC data and the second RLC data are processed by the SLAP sub-layer 942A for generating third RLC data and fourth RLC data at the RLC sub-layer 943A, which are then transmitted to a second node via an air interface after being processed by the lower layer of the first node; after being processed at the lower layer of the second node, the third RLC data and the fourth RLC data are recovered at RLC sub-layer 953A, which are then processed by SLAP sub-layer 952A to recover the first RLC data and the second RLC data, and the RLC data are processed respectively by PDCP sub-layer 951A and PDCP sub-layer 961A to recover the first target data and the second target data.

In one embodiment, the first node maintains a first RLC entity set and a second RLC entity set; any RLC entity in the first RLC entity set corresponds to an RLC channel in a first RLC channel set; any RLC entity in the second RLC entity set corresponds to an RLC channel in a second RLC channel set; the first RLC entity set comprises at least one RLC entity; the second RLC entity set comprises at least one RLC entity.

In one embodiment, the first RLC entity set comprises at least two RLC entities; the at least two RLC entities respectively correspond to at least two RLC entities of a same node, or, the at least two RLC entities respectively correspond to at least two RLC entities in at least two nodes.

In one embodiment, the second RLC entity set comprises at least two RLC entities; the at least two RLC entities respectively correspond to at least two RLC entities of a same node, or, the at least two RLC entities respectively correspond to at least two RLC entities in at least two nodes.

In one embodiment, the first channel set comprises the first RLC channel set; the first RLC channel set comprises an ingress-RLC channel set.

In one embodiment, the second channel set is the second RLC channel set; the second RLC channel set comprises an egress-RLC channel set.

In one embodiment, any RLC channel in the first RLC channel set is mapped to an RLC channel in the second RLC channel.

In one embodiment, the SLAP sublayer implements bearer mapping function.

In one embodiment, the bearer mapping function maps a first RLC bearer to a second RLC bearer; herein, the first RLC bearer corresponds to a first RLC channel, and the first RLC channel belongs to the first RLC channel set; the second RLC bearer corresponds to a second RLC channel, the second RLC channel belongs to the second RLC channel set.

In FIG. 9A, at the first node, an RLC channel comprised by the RLC sublayer 923A and an RLC channel comprised by the RLC sublayer 933A are mapped to an RLC channel comprised in the RLC sublayer 943A; at the second node, RLC channels comprised in the RLC sublayer 953A are respectively mapped to a bearer comprised in the PDCP sublayer 951A and a bearer comprised in the PDCP sublayer 961A.

FIG. 9A is also applicable to a transmission from the second node to the third node and the fourth node; at the second node at this time, a bearer comprised in the PDCP sublayer 951A and a bearer comprised in the PDCP sublayer 961A are respectively mapped to an RLC channel comprised in the RLC sublayer 953A; at the first node, RLC channels comprised in the RLC sub-layer 943A are respectively mapped to an RLC channel comprised in the RLC sub-layer 923A and an RLC channel comprised in the RLC sub-layer 933A.

In one embodiment, the SLAP sublayer implements routing function.

In FIG. 9A, the routing function forwards a data unit received from the third node or the fourth node to the second node.

In one embodiment, each data unit in the first data unit set generates an SLAP PDU in the SLAP sublayer; the SLAP PDU comprises an SLAP header and an SLAP SDU indicated by the SLAP header; the SLAP SDU is an RLC SDU; the RLC SDU is acquired from an RLC channel in the first RLC channel set.

In one embodiment, the SLAP header comprises a transmitter of an SLAP SDU indicated by the SLAP header.

In one embodiment, the SLAP header comprises a receiver of an SLAP SDU indicated by the SLAP header.

In one embodiment, the SLAP header comprises a logical channel identity of an SLAP SDU indicated by the SLAP header; a logical channel identity of the SLAP SDU is a logical channel identity of an RLC SDU corresponding to the SLAP SDU.

In one embodiment, the SLAP header comprises a sequence number of an SLAP SDU indicated by the SLAP header.

Embodiment 9B

Embodiment 9B illustrates a schematic diagram of a first signaling format according to one embodiment of the present application, as shown in FIG. 9B.

In one embodiment, the first signaling comprises a first MAC subPDU, and the first MAC subPDU indicates an End Marker message.

In one embodiment, when the first MAC subPDU comprises Private Extension, as shown in case A in FIG. 9B, the first MAC subPDU comprises a first MAC subheader and a first MAC SDU; an R field comprised in the first MAC subheader is reserve; an F field comprised in the first MAC subheader indicates a length of an L field comprised in the MAC subheader; an L field comprised in the first MAC subheader indicates a number of byte(s) comprised in the first MAC SDU; the first MAC SDU comprises the Private Extension.

In one embodiment, when the first MAC subPDU does not comprise Private Extension, as shown in case B in FIG. 9B, the first MAC subPDU only comprises a first MAC subheader and necessary padding; an R field comprised in the first MAC subheader is reserve.

In one embodiment, an LCID field in the first MAC subheader comprises a positive integer between 20 and 61 with an index between 20 and 61.

In one embodiment, the Private Extension field comprises an IE format defined in section 8.6 in protocol 29.281 of 3GPP standard.

Embodiment 9C

Figure 9C:
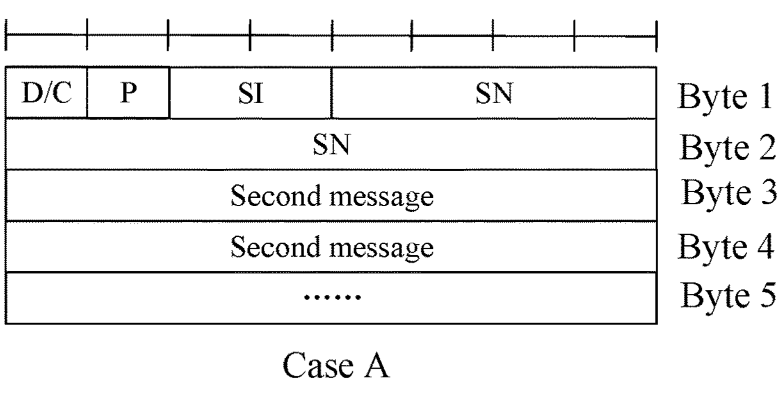
FIG. 9C illustrates a schematic diagram of an RLC PDU format according to one embodiment of the present application.
Figure 9C:
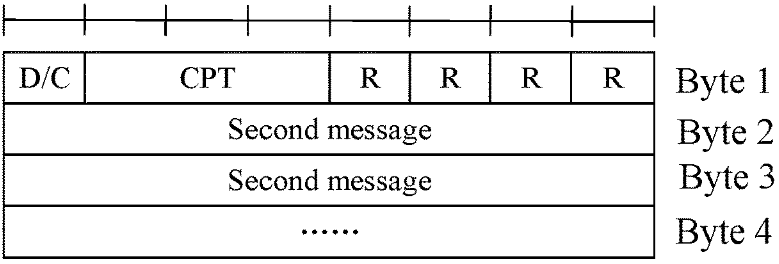

Embodiment 9C illustrates a schematic diagram of an RLC PDU format according to one embodiment of the present application, as shown in FIG. 9C.

In one embodiment, the second message is carried in a user-plane RLC PDU, and the second message is indicated by an RLC sequence number; the RLC sequence number is indicated by the second data unit set.

In one embodiment, the second message is carried in a control-plane RLC PDU, and the second message is indicated by a control PDU type (CPT); the control PDU type is indicated by the second data unit set.

In one embodiment, an RLC PDU format defined in 3GPP standard 38.322 protocol is used to carry the second message or at least partial information of the second message.

In case A of embodiment 9C, a user-plane RLC PDU comprises the second message, where the D/C field indicates that an RLC PDU carries data; a Polling field is not resolved; a Segmentation Info (SI) field indicates whether the RLC PDU comprises a complete RLC SDU or an RLC SDU segment; an SN field indicates a sequence number of an RLC SDU comprised in the RLC PDU; herein, P field indicates whether a transmitting node requests a peer RLC entity of an RLC entity to transmit a STATUS report.

In case B of embodiment 9C, a user-plane RLC PDU comprises partial information of the second message, where the resolution of D/C field, P field, SI field and SN field is the same as that in case A of embodiment 9C, and the new inserted Segmentation Offset (SO) indicates a byte offset of an RLC SDU segment comprised in the RLC PDU in an RLC SDU.

In case C of embodiment 9C, a control-plane RLC PDU comprises the second message, where a D/C field indicates that an RLC PDU carries a control message, and a CPT indicates a control message type; R field is a reserve bit.

Embodiment 10A

Figure 10A:
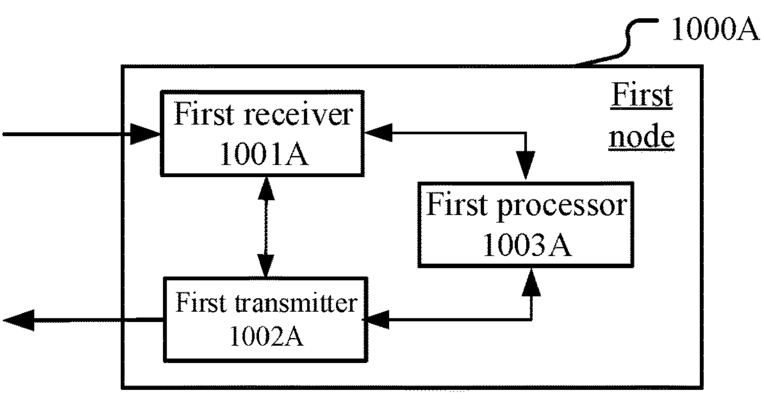
FIG. 10A illustrates a structure block diagram of a processor in a first node according to one embodiment of the present application.

Embodiment 10A illustrates a structure block diagram of a processor in a first node according to one embodiment of the present application, as shown in FIG. 10A. In FIG. 10A, a processor 1000A of a first node comprises a first receiver 1001A, a first transmitter 1002A and a first processor 1003A. The first receiver 1001A comprises at least one of the transmitter/receiver 454 (including the antenna 452), the receiving processor 456, the multi-antenna receiving processor 458 or the controller/processor 459 in FIG. 4 of the present application; the first transmitter 1002A comprises at least one of the transmitter/receiver 454 (including the antenna 452), the transmitting processor 468, the multi-antenna transmitting processor 457, or the controller/processor 459 in FIG. 4 of the present application; the first processor 1003A comprises the data source 467 in FIG. 4 of the present application.

In embodiment 10A, the first processor 1003A, as a response to a first condition being satisfied, generates a first BSR; the first transmitter 1002A, transmits a first radio signal, the first radio signal carries the first BSR; herein, the first condition is that a difference value between a buffer size for a first logical channel set and a first reference buffer size exceeds a first threshold, the first logical channel set comprises at least one logical channel, the first reference buffer size is related to a second BSR, the second BSR is a latest reported BSR generated for the first logical channel set, or, the second BSR is a latest BSR triggered for the first logical channel set.

In one embodiment, the first receiver 1001A, receives a first data unit set through a first channel set, and the first data unit set comprises at least one data unit; the first transmitter 1002A, transmits a second data unit set through a second channel set, and the second data unit set comprises at least one data unit; herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s)

comprised in the first data unit set, and the second reference data volume is related to a number of byte(s) comprised in the second data unit set.

In one embodiment, the first receiver 1001A, receives a first data unit set through a first channel set, and the first data unit set comprises at least one data unit; the first transmitter 1002A, transmits a second data unit set through a second channel set, and the second data unit set comprises at least one data unit; herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s) comprised in the first data unit set, and the second reference data volume is related to a number of byte(s) comprised in the second data unit set; the first reference data volume is related to a buffer size for a second logical channel set and in the first data unit set; herein, any logical channel in the second logical channel set is mapped into a logical channel in the first logical channel set.

In one embodiment, the first receiver 1001A, receives a first data unit set through a first channel set, and the first data unit set comprises at least one data unit; the first transmitter 1002A, transmits a second data unit set through a second channel set, and the second data unit set comprises at least one data unit; herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s) comprised in the first data unit set, and the second reference data volume is related to a number of byte(s) comprised in the second data unit set; the first reference data volume is related to a number of byte(s) comprised in a third data unit set; herein, the third data unit set comprises a data unit in the first data unit set and also comprised in a first buffer set; any data unit in the third data unit set is mapped into a logical channel in the first logical channel set.

In one embodiment, the first reference buffer size is related to a number of byte(s) comprised in a fourth data unit set, and the fourth data unit set comprises a part being transmitted after triggering the second BSR in the second data unit set.

In one embodiment, the first processor 1003A determines a first link failure; as a response to the behavior of determining the first link failure, clearing a fifth data unit set, the fifth data unit set comprising at least one data unit; herein, any bit in the fifth data unit set belongs to the first data unit set and does not belong to the second data unit set; the first reference buffer size is related to a number of byte(s) comprised in the fifth data unit set.

Embodiment 10B

Embodiment 10B illustrates a schematic diagram of another first signaling format according to one embodiment of the present application, as shown in FIG. 10B.

In one embodiment, the first signaling comprises a first RLC control PDU; the first RLC control PDU comprises an End Marker message.

In one embodiment, as shown in FIG. 10B, a D/C field comprised in the first RLC control PDU is 0; an R field comprised in the first RLC control PDU is reserve; Private Extension comprised in the first RLC control PDU is optional.

In one embodiment, a CPT field comprised in the first RLC control PDU is 001.

In one embodiment, a CPT field comprised in the first RLC control PDU is 010.

In one embodiment, a CPT field comprised in the first RLC control PDU is 011.

In one embodiment, a CPT field comprised in the first RLC control PDU is 100.

In one embodiment, a CPT field comprised in the first RLC control PDU is 101.

In one embodiment, a CPT field comprised in the first RLC control PDU is 110.

In one embodiment, a CPT field comprised in the first RLC control PDU is 111.

Embodiment 10C

Embodiment 10C illustrates a structure block diagram of a processor in a first node according to one embodiment of the present application, as shown in FIG. 10C. In FIG. 10C, a processor 1000C of a first node comprises a first receiver 1001C and a first transmitter 1002C. The first receiver 1001C comprises at least one of the transmitter/receiver 454 (including the antenna 452), the receiving processor 456, the multi-antenna receiving processor 458 or the controller/processor 459 in FIG. 4 of the present application; the first transmitter 1002C comprises at least one of the transmitter/receiver 454 (including the antenna 452), the transmitting processor 468, the multi-antenna transmitting processor 457, or the controller/processor 459 in FIG. 4 of the present application.

In embodiment 10C, the first receiver 1001C receives a first data unit set through a first radio bearer; determines a first connection failure; monitors a third data unit set via an air interface, and the third data unit set carries a second message; the first transmitter 1002C, as a response to the behavior of determining a first connection failure, transmits a second data unit set via an air interface, the second data unit set carries a first message; herein, the first message is used to trigger the second message; the first radio bearer comprises a first PDCP entity and a first RLC bearer; a transmission of the second message is through a second PDCP entity and the first RLC bearer; the first message is used to trigger associating the first RLC bearer to the second PDCP entity; the second message comprises an RRC signaling, the first data unit set comprises at least one data unit, the second data unit set comprises at least one data unit, and the third data unit set comprises at least one data unit.

In one embodiment, the second data unit set indicating a first reference value set, and the first reference value set being used to indicate the second message.

In one embodiment, the first receiver 1001C, after transmitting the first message and before the second message is received, receives at least one data unit through the first radio bearer; herein, a transmission of the at least one data unit is through the first RLC bearer.

In one embodiment, the first receiver 1001C, as a response to the behavior of determining a first link failure, starts a first timer; when the second message is received, stops the first timer; when the first timer expires, stops monitoring the third data unit set.

In one embodiment, the first receiver 1001C, after receiving the second message, establishes a second connection according to the second message; herein, the second connection is used to transmit control-plane information.

Embodiment 11A

Embodiment 11A illustrates a structure block diagram of a processor in a second node according to one embodiment of the present application, as shown in FIG. 11A. In FIG. 11A, a processor 1100A in a second node comprises a second receiver 1101A. The second receiver 1101A comprises at least one of the transmitter/receiver 418 (including the antenna 420), the receiving processor 470, the multi-antenna receiving processor 472 or the controller/processor 475 in FIG. 4 of the present application.

In embodiment 11A, the second receiver 1101A, receives a first radio signal, the first radio signal carries a first BSR; herein, as a response to a first condition being satisfied, the first BSR is generated; the first condition is that a difference value between a buffer size for a first logical channel set and a first reference buffer size exceeds a first threshold, the first logical channel set comprises at least one logical channel, the first reference buffer size is related to a second BSR, the second BSR is a latest BSR reported for the first logical channel set, or, the second BSR is a latest BSR triggered for the first logical channel set.

In one embodiment, a first data unit set is received through a first channel set, and the first data unit set comprises at least one data unit; a second data unit set is transmitted through a second channel set, and the second data unit set comprises at least one data unit; herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s) comprised in the first data unit set, and the second reference data volume is related to a number of byte(s) comprised in the second data unit set.

In one embodiment, a first data unit set is received through a first channel set, and the first data unit set comprises at least one data unit; a second data unit set is transmitted through a second channel set, and the second data unit set comprises at least one data unit; herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s) comprised in the first data unit set, and the second reference data volume is related to a number of byte(s) comprised in the second data unit set; the first reference data volume is related to a buffer size for a second logical channel set and in the first data unit set; herein, any logical channel in the second logical channel set is mapped into a logical channel in the first logical channel set.

In one embodiment, a first data unit set is received through a first channel set, and the first data unit set comprises at least one data unit; a second data unit set is transmitted through a second channel set, and the second data unit set comprises at least one data unit; herein, any bit in the second data unit set belongs to the first data unit set, any data unit in the second data unit set is mapped into a logical channel in the first logical channel set; a first reference data volume and a second reference data volume are used together to determine the buffer size for the first logical channel set; the first reference data volume is related to a number of byte(s) comprised in the first data unit set, and the second reference data volume is related to a number of byte(s) comprised in the second data unit set; the first reference data volume is related to a number of byte(s) comprised in a third data unit set; herein, the third data unit set comprises a data unit in the first data unit set and also comprised in a first buffer set; any data unit in the third data unit set is mapped into a logical channel in the first logical channel set.

In one embodiment, the first reference buffer size is related to a number of byte(s) comprised in a fourth data unit set, and the fourth data unit set comprises a part being transmitted after triggering the second BSR in the second data unit set.

In one embodiment, a first link is determined failed; as a response to the behavior of the first link being determined failed, a fifth data unit set is cleared, the fifth data unit set comprises at least one data unit; herein, any bit in the fifth data unit set belongs to the first data unit set and does not belong to the second data unit set; the first reference buffer size is related to a number of byte(s) comprised in the fifth data unit set.

Embodiment 11B

Embodiment 11B illustrates a schematic diagram of a radio protocol architecture of relay transmission according to one embodiment of the present application, as shown in FIG. 11. In FIG. 11B, RLC sublayer 1113B and RLC sublayer 1123B are optional.

In FIG. 11B, in relay transmission, taking data transmitted by a first node to a third node as an example (data transmitted by the third node to the first node is the same): first target data is sequentially processed by PDCP sublayer 1104B and RLC sublayer 1103B at the first node side to generate a first target MAC PDU at MAC sublayer 1102B, then is transferred to PHY layer 1101B, then is transmitted to PHY layer 1111B of a second node via an air interface, and then first RLC data is recovered after sequentially through the processing of MAC sublayer 1112B and RLC sublayer 1113B; the first RLC data is re-merged into second RLC data (optional) at the RLC sub-layer 1123B, and then is processed by the MAC sub-layer 1122B to generate a second target MAC PDU to be transferred to the PHY layer 1121B; then it is transmitted to PHY layer 1131B of a third node via an air interface, and then a second target MAC PDU is recovered sequentially through MAC sub-layer 1132B, and then second target data is recovered after sequentially through the processing of RLC sub-layer 1133B and PDCP sub-layer 1134B.

In one embodiment, the first RLC data and the second RLC data are respectively RLC SDUs.

In one embodiment, the first RLC data and the second RLC data are respectively RLC SDU segments.

In one embodiment, the RLC sublayer 1123B cannot perform data segment on RLC data.

In one embodiment, the RLC sublayer 1123B can perform data merging on RLC data.

In one embodiment, the RLC sublayer 1123B does not perform data merging or data segment on RLC data, and only performs storage, forwarding and retransmission when necessary; the second RLC data is the same as the first RLC data.

In one embodiment, the first target data is generated at the RRC/SDAP 1105B, and the second target data is transmitted to the RRC/SDAP 1135B.

In one embodiment, the first target data and the second target data respectively carry the second signaling.

In one embodiment, the first target data and the second target data respectively carry the second information.

In one embodiment, the first target data and the second target data respectively carry the third information.

In one embodiment, the first target data and the second target data respectively carry the second data unit set.

In one embodiment, the first target data carries the fifth data unit set.

In one embodiment, the second target data carries the third data unit set.

In one embodiment, the first radio bearer comprises entities corresponding to the following sublayers: the PDCP sublayer 1104B, the RLC sublayer 1103B, the RLC sublayer 1133B and the PDCP sublayer 1134B.

In one embodiment, the first radio bearer comprises entities corresponding to the following sublayers: the RLC sublayer 1113B and the RLC sublayer 1123B.

In one embodiment, the first radio bearer comprises entities corresponding to the following sublayers: the RRC/SDAP 1105B and the RRC/SDAP 1135B.

In one embodiment, the first radio bearer is multiplexed to a MAC entity corresponding to the MAC sublayer 1102B and a MAC entity corresponding to the MAC sublayer 1132B.

In one embodiment, the first information indicates that a node identified by the first identity releases the RLC sublayer 1123B corresponding to the first radio bearer.

In one embodiment, as a response to transmitting the first signaling, release the RLC sublayer 1113B corresponding to the first radio bearer.

In one embodiment, although not illustrated in figure, the second node comprises an adaptation sub-layer (optional); the adaptation sublayer implements the relay-related control-plane function.

In one embodiment, if the RLC sublayer 1113B and the RLC sublayer 1123B do not exist, the adaptation sublayer is located above the MAC sublayer 1112B and the MAC sublayer 1122B.

In one embodiment, if the RLC sublayer 1113B and the RLC sublayer 1123B exist, the adaptation sublayer is located above the RLC sublayer 1113B and the RLC sublayer 1123B.

Embodiment 11C

Figure 11C:
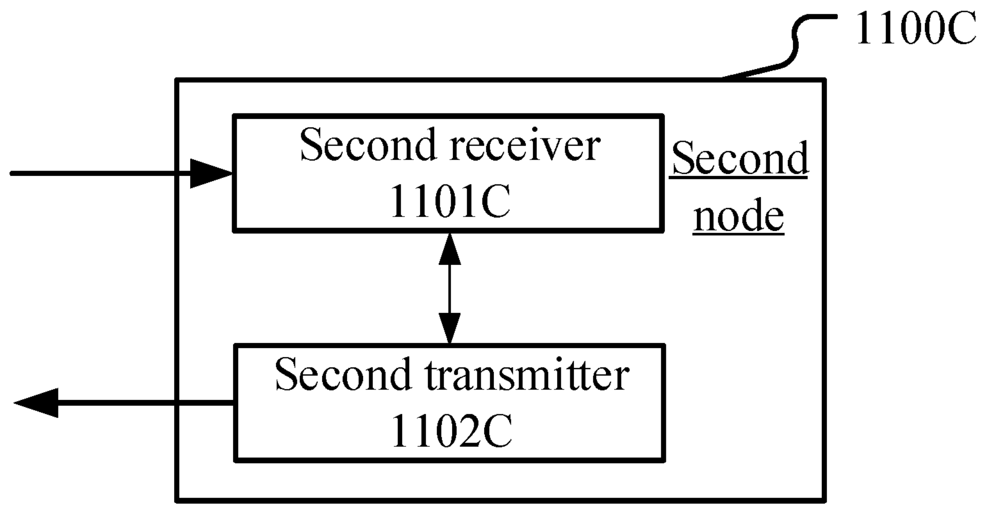
FIG. 11C illustrates a structure block diagram of a processor in a second node according to one embodiment of the present application.

Embodiment 11C illustrates a structure block diagram of a processor in a second node according to one embodiment of the present application, as shown in FIG. 11C. In FIG. 11C, a processor 1100C of a second node comprises a second receiver 1101C and a second transmitter 1102C. The second receiver 1101C comprises at least one of the transmitter/receiver 418 (including the antenna 420), the receiving processor 470, the multi-antenna receiving processor 472 or the controller/processor 475 in FIG. 4 of the present application; the second transmitter 1102C comprises at least one of the transmitter/receiver 418 (including the antenna 420), the transmitting processor 416, the multi-antenna transmitting processor 471 or the controller/processor 475 in FIG. 4 of the present application.

In embodiment 11C, the second receiver 1101C, receives a first data unit set via a backhaul link; receives a second data unit set via an air interface, the second data unit set carries a first message; the second transmitter 1102C, transmits the first data unit set through a first RLC bearer; transmits a third data unit set via the air interface, and the third data unit set carries a second message; herein, the first message is used to trigger the second message; the first RLC bearer belongs to a first radio bearer, and the first radio bearer comprises a first PD CP entity; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

In one embodiment, the second receiver 1101C receives the second message through the backhaul link.

In one embodiment, the second transmitter 1102C transmits the first message through a backhaul link.

In one embodiment, the second data unit set indicating a first reference value set, and the first reference value set being used to indicate the second message.

In one embodiment, the second transmitter 1102C, after the first message is received and before transmitting the second message, transmits at least one data unit through the first RLC bearer.

In one embodiment, determine a first connection failure being used to start a first timer; when the second message is received, the first timer is stopped; when the first timer expires, the third data unit set is stopped to be monitored.

In one embodiment, after the second message is received, the second message is used to establish a second connection; herein, the second connection is used to transmit control-plane information.

Embodiment 12B

Figure 12A:
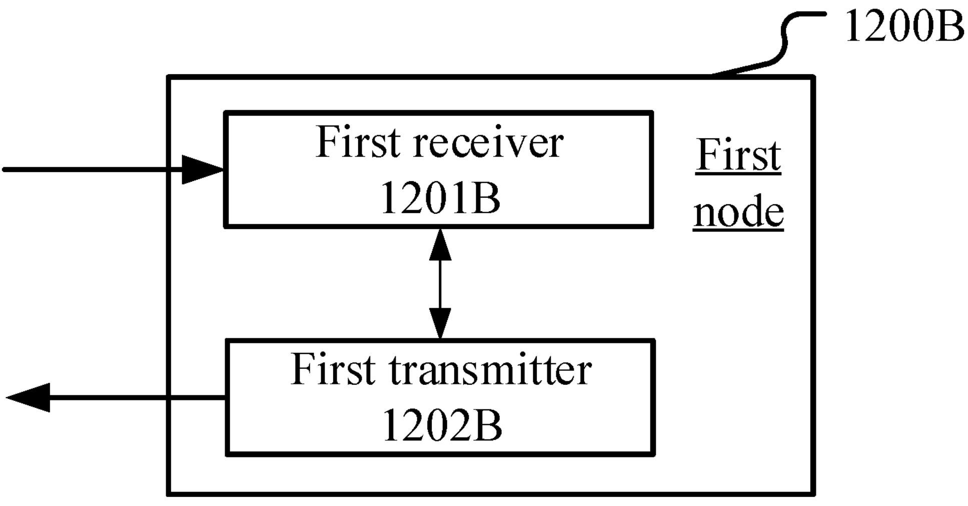
FIG. 12A illustrates a structure block diagram of a processor in a first node according to one embodiment of the present application.
Figure 12B:
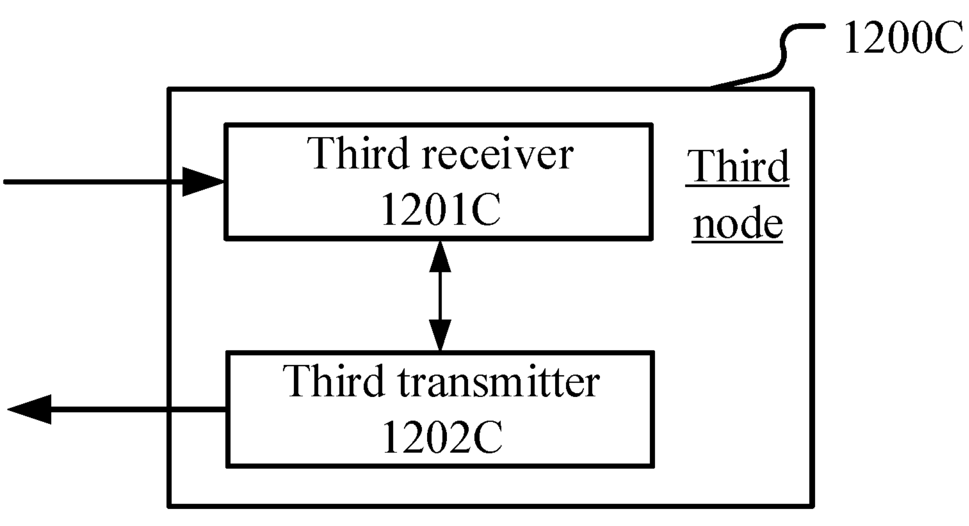
FIG. 12B illustrates a structure block diagram of a processor in a third node according to one embodiment of the present application.

Embodiment 12B illustrates a structure block diagram of a processor in a first node according to one embodiment of the present application, as shown in FIG. 12B. In FIG. 12B, a processor 1200B of a first node comprises a first receiver 1201B and a first transmitter 1202B. The first receiver 1201B comprises at least one of the transmitter/receiver 454 (including the antenna 452), the receiving processor 456, the multi-antenna receiving processor 458 or the controller/processor 459 in FIG. 4 of the present application; the first transmitter 1202B comprises at least one of the transmitter/receiver 454 (including the antenna 452), the transmitting processor 468, the multi-antenna transmitting processor 457, or the controller/processor 459 in FIG. 4 of the present application.

In embodiment 12B, the first receiver 1201B receives a first signaling via an air interface; the first transmitter 1202B, as a response to receiving the first signaling, transmits a first radio signal, the first radio signal comprises a second signaling; the first receiver 1201B, receives a second data unit set via an air interface; herein, the second signaling indicates that a first data unit set is not received, and both the first data unit set and the second data unit set are transmitted through a first radio bearer; the second signaling is used to determine the second data unit set; a transmitter of the first signaling is non-co-located with a receiver of the first radio signal; the first data unit set comprises at least one data unit; the second data unit set comprises the first data unit set.

In one embodiment, the first receiver 1201B, as a response to receiving the first signaling, clears a first identity from a first identity list; monitors a physical-layer signaling through sidelink, when a detected physical-layer signaling comprises partial bits in any identity in the first identity list, performs channel decoding on a physical-layer channel scheduled by the detected physical-layer signaling, when the detected physical-layer signaling does not comprise partial bits in any identity in the first identity list, drops performing channel decoding on a physical-layer channel scheduled by the detected physical-layer signaling; herein, the first identity identifies a transmitter of the first signaling; a number of bit(s) comprised in the partial bits is a positive integral multiple of 8.

In one embodiment, the first receiver 1201B, as a response to receiving the first signaling, clears a first identity from a first identity list; monitors a physical-layer signaling through sidelink, when a detected physical-layer signaling comprises partial bits in any identity in the first identity list, performs channel decoding on a physical-layer channel scheduled by the detected physical-layer signaling, when the detected physical-layer signaling does not comprise partial bits in any identity in the first identity list, drops performing channel decoding on a physical-layer channel scheduled by the detected physical-layer signaling; herein, the first identity identifies a transmitter of the first signaling; a number of bit(s) comprised in the partial bits is a positive integral multiple of 8; the first transmitter 1202B, transmits first information via an air interface; herein, the first information indicates first radio link failure; a receiver of the first information comprises a node identified by the first identity.

In one embodiment, the first receiver 1201B, receives a third data unit set via an air interface; herein, the third data unit set is used to determine the first data unit set; a time for receiving the first signaling is not earlier than a time for receiving any data unit in the third data unit set.

In one embodiment, the first receiver 1201B, as a response to receiving the first signaling, clears a first identity from a first identity list; monitors a physical-layer signaling through sidelink, when a detected physical-layer signaling comprises partial bits in any identity in the first identity list, performs channel decoding on a physical-layer channel scheduled by the detected physical-layer signaling, when the detected physical-layer signaling does not comprise partial bits in any identity in the first identity list, drops performing channel decoding on a physical-layer channel scheduled by the detected physical-layer signaling; herein, the first identity identifies a transmitter of the first signaling; a number of bit(s) comprised in the partial bits is a positive integral multiple of 8; the first receiver 1201B, receives second information via an air interface; herein, the second information comprises the first identity list and a first configuration; the first identity list comprises Q identity(identities), Q being a positive integer; the first configuration comprises a first parameter set, and the first parameter set is used to configure the first radio bearer; the first parameter set is applicable to the first data unit set and the second data unit set.

In one embodiment, the first receiver 1201B, as a response to receiving the first signaling, clears a first identity from a first identity list; monitors a physical-layer signaling through sidelink, when a detected physical-layer signaling comprises partial bits in any identity in the first identity list, performs channel decoding on a physical-layer channel scheduled by the detected physical-layer signaling, when the detected physical-layer signaling does not comprise partial bits in any identity in the first identity list, drops performing channel decoding on a physical-layer channel scheduled by the detected physical-layer signaling; herein, the first identity identifies a transmitter of the first signaling; a number of bit(s) comprised in the partial bits is a positive integral multiple of 8; the first receiver 1201B, receives third information via an air interface; herein, the third information indicates a second identity list; the second identity list does not comprise the first identity; an identity in the second identity list is used to identify the receiver of the first radio signal.

Embodiment 12C

Embodiment 12C illustrates a structure block diagram of a processor in a third node according to one embodiment of the present application, as shown in FIG. 12C. In FIG. 12C, a processor 1200C in a third node comprises a third receiver 1201C and a third transmitter 1202C. The third receiver 1201C comprises at least one of the transmitter/receiver 418 (including the antenna 420), the receiving processor 470, the multi-antenna receiving processor 472 or the controller/processor 475 in FIG. 4 of the present application; the third transmitter 1202C comprises at least one of the transmitter/receiver 418 (including the antenna 420), the transmitting processor 416, the multi-antenna transmitting processor 471 or the controller/processor 475 in FIG. 4 of the present application.

In embodiment 12C, the third transmitter 1202C transmits a first data unit set via a backhaul link; transmits a second message through the backhaul link; the third receiver 1201C, receives a first message through the backhaul link; herein, the first data unit set is transmitted through a first radio bearer, and the first radio bearer comprises a first PDCP entity and a first RLC bearer; the first message is used to trigger the second message; a transmission of the second message is through a second PDCP entity and the first RLC bearer; the first message is used to trigger associating the first RLC bearer to the second PDCP entity; the second message comprises an RRC signaling; determining a first connection failure is used to trigger the first message.

In one embodiment, a second data unit set indicating a first reference value set, and the first reference value set being used to indicate the second message; herein, the second data unit set carries the first message.

In one embodiment, after the first message is transmitted and before the second message is received, at least one data unit is received through the first radio bearer; herein, a transmission of the at least one data unit is through the first RLC bearer.

In one embodiment, determine a first connection failure being used to start a first timer; when the second message is received, the first timer is stopped; when the first timer expires, the third data unit set is stopped to be monitored.

In one embodiment, after the second message is received, the second message is used to establish a second connection; herein, the second connection is used to transmit control-plane information.

Embodiment 13

Figure 13:
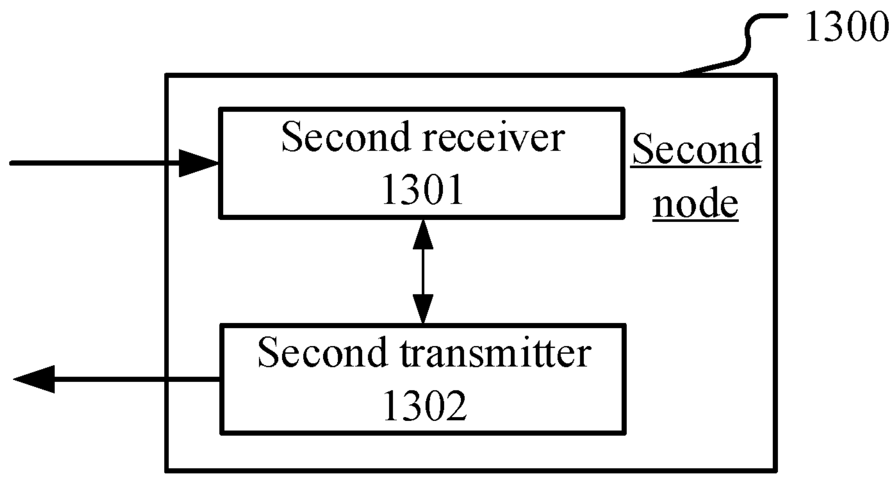
FIG. 13 illustrates a structure block diagram of a processor in second node according to one embodiment of the present application.

Embodiment 13 illustrates a structure block diagram of a processor in a second node according to one embodiment of the present application, as shown in FIG. 13. In FIG. 13, a processor 1300 in a second node comprises a second receiver 1301 and a second transmitter 1302. The second receiver 1301 comprises at least one of the transmitter/receiver 418 (including the antenna 420), the receiving processor 470, the multi-antenna receiving processor 472 or the controller/processor 475 in FIG. 4 of the present application; the second transmitter 1302 comprises at least one of the transmitter/receiver 418 (including the antenna 420), the transmitting processor 416, the multi-antenna transmitting processor 471 or the controller/processor 475 in FIG. 4 of the present application.

In embodiment 13, the second transmitter 1302 transmits a first signaling via an air interface; herein, a first radio signal is received, the first signaling is used to trigger transmitting the first radio signal, the first radio signal comprises a second signaling, and the second signaling is used to generate a second radio signal; the second radio signal is transmitted; a second data unit set is received via an air interface; the second signaling indicates that a first data unit set is not received, and both the first data unit set and the second data unit set are transmitted through a first radio bearer; the second signaling is used to determine the second data unit set; the second node is non-co-located with a receiver of the first radio signal; the first data unit set comprises at least one data unit; the second data unit set comprises the first data unit set.

In one embodiment, the first signaling is used to trigger a first identity being cleared from a first identity list; a physical-layer signaling is monitored through sidelink, when a detected physical-layer signaling comprises partial bits in any identity in the first identity list, channel decoding is executed on a physical-layer channel scheduled by the detected physical-layer signaling, when the detected physical-layer signaling does not comprise partial bits in any identity in the first identity list, channel decoding is dropped to be executed on a physical-layer channel scheduled by the detected physical-layer signaling; herein, the first identity identifies the second node; a number of bit(s) comprised in the partial bits is a positive integral multiple of 8.

In one embodiment, the second receiver 1301 receives first information via an air interface; herein, the first information indicates first radio link failure.

In one embodiment, the second receiver 1301 receives a third radio signal set; the second transmitter 1302 transmits a fourth radio signal set; herein, a fourth data unit set is recovered from the third radio signal set, and the fourth data unit set is used to generate the fourth radio signal set; the fourth data unit set comprises a third data unit set; the third data unit set is used to determine the first data unit set; a time for transmitting the first signaling is not earlier than a time for transmitting any radio signal in the fourth radio signal set.

In one embodiment, the first signaling is used to trigger a first identity being cleared from a first identity list; a physical-layer signaling is monitored through sidelink, when a detected physical-layer signaling comprises partial bits in any identity in the first identity list, channel decoding is executed on a physical-layer channel scheduled by the detected physical-layer signaling, when the detected physical-layer signaling does not comprise partial bits in any identity in the first identity list, channel decoding is dropped to be executed on a physical-layer channel scheduled by the detected physical-layer signaling; herein, the first identity identifies the second node; a number of bit(s) comprised in the partial bits is a positive integral multiple of 8; the second receiver 1301 receives a fifth radio signal; the second transmitter 1302 transmits a sixth radio signal; herein, second information is recovered from the fifth radio signal, and the second information is used to generate the sixth radio signal; the second information comprises a first identity list and a first configuration; the first identity list comprises Q identity(identities), Q being a positive integer; the first configuration comprises a first parameter set, and the first parameter set is used to configure the first radio bearer; the first parameter set is applicable to the first data unit set and the second data unit set.

In one embodiment, the first signaling is used to trigger a first identity being cleared from a first identity list; a physical-layer signaling is monitored through sidelink, when a detected physical-layer signaling comprises partial bits in any identity in the first identity list, channel decoding is executed on a physical-layer channel scheduled by the detected physical-layer signaling, when the detected physical-layer signaling does not comprise partial bits in any identity in the first identity list, channel decoding is dropped to be executed on a physical-layer channel scheduled by the detected physical-layer signaling; herein, the first identity identifies the second node; a number of bit(s) comprised in the partial bits is a positive integral multiple of 8; third information is received; the third information indicates a second identity list; the second identity list does not comprise the first identity; an identity in the second identity list is used to identify the receiver of the first radio signal.

Embodiment 14

Figure 14:
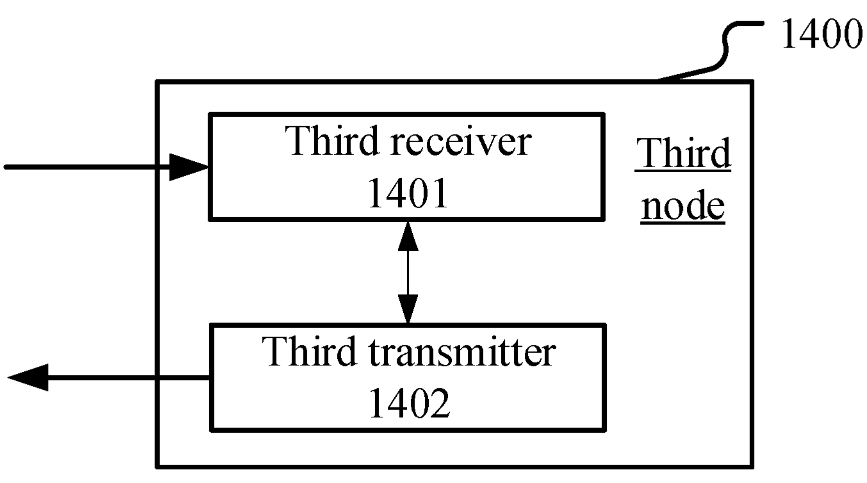
FIG. 14 illustrates a structure block diagram of a processor in a third node according to one embodiment of the present application.

Embodiment 14 illustrates a structure block diagram of a processor in a third node according to one embodiment of the present application, as shown in FIG. 14. In FIG. 14, a processor 1400 in a third node comprises a third receiver 1401 and a third transmitter 1402. The third receiver 1401 comprises at least one of the transmitter/receiver 418 (including the antenna 420), the receiving processor 470, the multi-antenna receiving processor 472 or the controller/processor 475 in FIG. 4 of the present application; the second transmitter 1402 comprises at least one of the transmitter/receiver 418 (including the antenna 420), the transmitting processor 416, the multi-antenna transmitting processor 471 or the controller/processor 475 in FIG. 4 of the present application.

In embodiment 14, the third receiver 1401, receives a second radio signal, the second radio signal comprises a second signaling; the third transmitter 1402, transmits a second data unit set via an air interface; herein, the second signaling indicates that a first data unit set is not received, and both the first data unit set and the second data unit set are transmitted through a first radio bearer; the second signaling is used to determine the second data unit set; a first signaling is transmitted, the first signaling is used to trigger transmitting the second radio signal; a transmitter of the first signaling is non-co-located with a transmitter of the second radio signal; the first data unit set comprises at least one data unit; the second data unit set comprises the first data unit set.

In one embodiment, the first signaling being used to trigger a first identity being cleared from a first identity list; a physical-layer signaling is monitored through sidelink, when a detected physical-layer signaling comprises partial bits in any identity in the first identity list, channel decoding is executed on a physical-layer channel scheduled by the detected physical-layer signaling, when the detected physical-layer signaling does not comprise partial bits in any identity in the first identity list, channel decoding is dropped to be executed on a physical-layer channel scheduled by the detected physical-layer signaling; herein, the first identity identifies a transmitter of the first signaling; a number of bit(s) comprised in the partial bits is a positive integral multiple of 8.

In one embodiment, the first signaling being used to trigger a first identity being cleared from a first identity list; a physical-layer signaling is monitored through sidelink, when a detected physical-layer signaling comprises partial bits in any identity in the first identity list, channel decoding is executed on a physical-layer channel scheduled by the detected physical-layer signaling, when the detected physical-layer signaling does not comprise partial bits in any identity in the first identity list, channel decoding is dropped to be executed on a physical-layer channel scheduled by the detected physical-layer signaling; herein, the first identity identifies a transmitter of the first signaling; a number of bit(s) comprised in the partial bits is a positive integral multiple of 8; first information being transmitted; herein, the first information indicates first radio link failure; a receiver of the first information comprises a node identified by the first identity.

In one embodiment, the third transmitter 1402 transmits a fifth data unit set via an air interface; the fifth data unit set comprises a third data unit set; herein, the third data unit set is used to determine the first data unit set; a time for receiving the first signaling is not earlier than a time for receiving any data unit in the third data unit set.

In one embodiment, the first signaling being used to trigger a first identity being cleared from a first identity list; a physical-layer signaling is monitored through sidelink, when a detected physical-layer signaling comprises partial bits in any identity in the first identity list, channel decoding is executed on a physical-layer channel scheduled by the detected physical-layer signaling, when the detected physical-layer signaling does not comprise partial bits in any identity in the first identity list, channel decoding is dropped to be executed on a physical-layer channel scheduled by the detected physical-layer signaling; herein, the first identity identifies a transmitter of the first signaling; a number of bit(s) comprised in the partial bits is a positive integral multiple of 8; the third transmitter 1402 transmits second information via an air interface; herein, the second information comprises the first identity list and a first configuration; the first identity list comprises Q identity(identities), Q being a positive integer; the first configuration comprises a first parameter set, and the first parameter set is used to configure the first radio bearer; the first parameter set is applicable to the first data unit set and the second data unit set.

In one embodiment, the first signaling being used to trigger a first identity being cleared from a first identity list; a physical-layer signaling is monitored through sidelink, when a detected physical-layer signaling comprises partial bits in any identity in the first identity list, channel decoding is executed on a physical-layer channel scheduled by the detected physical-layer signaling, when the detected physical-layer signaling does not comprise partial bits in any identity in the first identity list, channel decoding is dropped to be executed on a physical-layer channel scheduled by the detected physical-layer signaling; herein, the first identity identifies a transmitter of the first signaling; a number of bit(s) comprised in the partial bits is a positive integral multiple of 8; the third transmitter 1402 transmits third information via an air interface; herein, the third information indicates a second identity list; the second identity list does not comprise the first identity; an identity in the second identity list is used to identify the transmitter of the first radio signal.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present application includes but not limited to mobile phones, tablet computers, laptops, network cards, low-power devices, enhanced Machine Type Communication (eMTC) devices, NB-IOT devices, vehicle-mounted communication equipments, aircrafts, airplanes, unmanned aerial vehicles (UAV), telecontrolled aircrafts and other wireless communication devices. The second-type communication node or the base station or the network side device in the present application includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:

a transceiver; and a processor, wherein the transceiver and the processor are configured to:

receive a first signaling via an air interface, transmit a first radio signal comprising a second signaling indicating that a first data unit set is not received, clear a first identity from a first identity list, monitor a physical-layer signaling through sidelink, on a condition that the detected physical-layer signaling comprises one or more bits in any identity in the first identity list, perform channel decoding on a physical-layer channel scheduled by the detected physical-layer signaling, on a condition that the detected physical-layer signaling does not comprise the one or more bits in any identity in the first identity list, channel decoding is not performed on the physical-layer channel scheduled by the detected physical-layer signaling, and receive, via the air interface through a radio bearer, a second data unit set comprising the first data unit set, wherein a transmitter of the first signaling is non-co-located with a receiver of the first radio signal.

2. The UE according to claim 1, wherein the first identity identifies a transmitter of the first signaling, and wherein a number of bits comprised in the one or more bits is a positive integral multiple of 8.

3. The UE according to claim 2, wherein the transceiver and the processor are configured to:

transmitting via the air interface, a first radio link failure indication wherein a receiver of the first radio link failure indication comprises a node identified by the first identity.

4. The UE according to claim 2, wherein the transceiver and the processor are configured to:

receive, via the air interface, the first identity list comprising a plurality of identities, and receiving, via the air interface, a first configuration comprising a first parameter set used to configure the radio bearer, wherein the first parameter set is applicable to the first data unit set and the second data unit set.

5. The UE according to claim 2, wherein the transceiver and the processor are configured to:

receive, via the air interface, third information indicating a second identity list, wherein the second identity list does not comprise the first identity, and wherein an identity in the second identity list is used to identify the receiver of the first radio signal.

6. The UE according to claim 1, wherein the transceiver and the processor are configured to:

receive, via the air interface, a third data unit set used to determine the first data unit set wherein a time for receiving the first signaling is not earlier than a time for receiving any data unit in the third data unit set.

7. A user equipment (UE) for wireless communications, the UE comprising:

a transceiver; and a processor, wherein the transceiver and the processor are configured to:

transmit, via an air interface, first signaling to trigger a first radio signal, receive the first radio signal comprising a second signaling indicating that a first data unit set is not received, generate a second radio signal based on the second signaling, transmit the second radio signal via the air interface, receive, via the air interface through a radio bearer, a second data unit set comprising the first data unit set, wherein the UE is non-co-located with a receiver of the first radio signal, clear a first identity from a first identity list, monitor a physical-layer signaling through sidelink, on a condition that a detected physical-layer signaling comprises one or more bits in any identity in the first identity list, perform channel decoding on a physical-layer channel scheduled by the detected physical-layer signaling, and on a condition that the detected physical-layer signaling does not comprise one or more bits in any identity in the first identity list, channel decoding is not performed on the physical-layer channel scheduled by the detected physical-layer signaling.

8. The UE according to claim 7, wherein the first identity identifies a second UE, and wherein a number of bits comprised in the one or more bits is a positive integral multiple of 8.

9. The UE according to claim 8, wherein the transceiver and the processor are configured to:

receive a fifth radio signal, recover second information from the fifth radio signal, wherein the second information comprises the first identity list and a first configuration, and wherein the first identity list comprises a plurality of identities, generate sixth radio signal based on the second information, transmit the sixth radio signal wherein the first configuration comprises a first parameter set, wherein the first parameter set is used to configure the radio bearer, and wherein the first parameter set is applicable to the first data unit set and the second data unit set.

10. The UE according to claim 7, wherein the transceiver and the processor are configured to:

receive a third radio signal set, recover a fourth data unit set from the third radio signal set, wherein the fourth data unit set comprises a third data unit set, and wherein the third data unit set is used to determine the first data unit set, generate a fourth radio signal set based on the fourth data unit set, and transmit the fourth radio signal set, wherein a time for transmitting the first signaling is not earlier than a time for transmitting any radio signal in the fourth radio signal set.

11. A user equipment (UE) for wireless communications, the UE comprising:

a transceiver; and a processor, wherein the transceiver and the processor are configured to:

receive a second radio signal comprising a second signaling indicating that a first data unit set is not received, transmit, via an air interface, a second data unit set comprising a first data unit set, and transmit a first signaling to trigger transmitting the second radio signal, wherein a transmitter of the first signaling is non-co-located with a transmitter of the second radio signal, clear a first identity from a first identity list, monitor a physical-layer signaling through sidelink, on a condition that a detected physical-layer signaling comprises one or more bits in any identity in the first identity list, perform channel decoding on a physical-layer channel scheduled by the detected physical-layer signaling, on a condition that the detected physical-layer signaling does not comprise one or more bits in any identity in the first identity list, channel decoding is not performed on the physical-layer channel scheduled by the detected physical-layer signaling.

12. The UE according to claim 11, wherein the first identity identifies a transmitter of the first signaling, and wherein a number of bits comprised in the one or more bits is a positive integral multiple of 8.

13. The UE according to claim 12, wherein the transceiver and the processor are configured to:

transmit, via the air interface, a second information comprising the first identity list and a first configuration, wherein the first identity list comprises a plurality of identities, and wherein the first configuration comprises a first parameter set, and the first parameter set is used to configure the radio bearer, and wherein the first parameter set is applicable to the first data unit set and the second data unit set.

14. The UE according to claim 12, wherein the transceiver and the processor are configured to:

transmitting, via the air interface, third information indicating a second identity list, wherein the second identity list does not comprise the first identity, and wherein an identity in the second identity list is used to identify the transmitter of the first radio signal.

15. A method in a user equipment (UE) for wireless communications, the method comprising:

receiving a first signaling via an air interface;

transmitting a first radio signal comprising a second signaling indicating that a first data unit set is not received;

clearing a first identity from a first identity list;

monitoring a physical-layer signaling through sidelink;

on a condition that the detected physical-layer signaling comprises one or more bits in any identity in the first identity list, performing channel decoding on a physical-layer channel scheduled by the detected physical-layer signaling;

on a condition that the detected physical-layer signaling does not comprise the one or more bits in any identity in the first identity list, channel decoding is not performed on the physical-layer channel scheduled by the detected physical-layer signaling; and receiving, via the air interface through a radio bearer, a second data unit set comprising the first data unit set, wherein a transmitter of the first signaling is non-co-located with a receiver of the first radio signal.

16. The method in the UE according to claim 15, wherein the first identity identifies a transmitter of the first signaling, and wherein a number of bits comprised in the one or more bits is a positive integral multiple of 8.

17. The method in the UE according to claim 16, further comprising:

transmitting, via an air interface, first radio link failure indication, wherein a receiver of the first radio link failure indication comprises a node identified by the first identity.

18. The method in the UE according to claim 16, comprising:

receiving, via the air interface, the first identity list comprising a plurality identities; and receiving, via the air interface, a first configuration comprising a first parameter set used to configure the radio bearer, wherein the first parameter set is applicable to the first data unit set and the second data unit set.

19. The method in the UE according to claim 16, further comprising:

receiving, via the air interface, a third information indicating a second identity list, and wherein the second identity list does not comprise the first identity, and wherein an identity in the second identity list is used to identify the receiver of the first radio signal.

20. The method in the UE according to claim 15, comprising:

receiving, via the air interface, a third data unit set used to determine the first data unit set, wherein a time for receiving the first signaling is not earlier than a time for receiving the third data unit set.

* * * * *